(12) United States Patent
Darling, III

(10) Patent No.: US 7,017,939 B2
(45) Date of Patent: Mar. 28, 2006

(54) VERSATILE PORTABLE CART

(76) Inventor: Charles W. Darling, III, 6 Wells La., Hampton Bays, NY (US) 11946

( * ) Notice: Subject to any disclaimer, the term of this patent is extended or adjusted under 35 U.S.C. 154(b) by 45 days.

(21) Appl. No.: 10/431,839

(22) Filed: May 7, 2003

(65) Prior Publication Data

US 2003/0209886 A1    Nov. 13, 2003

Related U.S. Application Data

(63) Continuation-in-part of application No. 09/939,376, filed on Aug. 24, 2001, now Pat. No. 6,561,529.

(60) Provisional application No. 60/233,138, filed on Sep. 18, 2000, provisional application No. 60/246,014, filed on Nov. 6, 2000.

(51) Int. Cl.
  *B62B 1/12*    (2006.01)

(52) U.S. Cl. .................. 280/652; 280/640; 280/646; 280/47.331; 280/47.18; 5/626

(58) Field of Classification Search ............ 280/640, 280/40, 645, 646, 652, 47.18, 47.331, 63, 280/651; 5/626, 627
See application file for complete search history.

(56) References Cited

U.S. PATENT DOCUMENTS

| | | | | |
|---|---|---|---|---|
| 806,097 A | 12/1905 | Baumann | ................ | 280/47 |
| 910,728 A | 1/1909 | Russell | ................ | 280/47 |
| 2,467,075 A | 4/1949 | Birnberg | ................ | 280/47 |
| 2,657,069 A * | 10/1953 | Quist | ................ | 280/40 |
| 2,868,559 A | 1/1959 | Vincelette | ................ | 280/47 |
| 2,918,296 A | 12/1959 | Goodale | ................ | 280/47 |
| 2,979,338 A | 4/1961 | Dwyer | ................ | 280/47 |
| 3,034,801 A | 5/1962 | Huston | ................ | 280/47 |
| 3,054,622 A | 9/1962 | Davis et al. | ................ | 280/47 |
| 3,073,614 A * | 1/1963 | Zinneman | ................ | 280/30 |
| 3,159,410 A | 12/1964 | Raymond | ................ | 280/414 |
| 3,188,108 A | 6/1965 | Davis | ................ | 280/47 |
| 3,222,100 A | 12/1965 | Lindzy | ................ | 296/2 |
| 3,236,537 A | 2/1966 | Eckman | ................ | 280/47 |
| 3,403,924 A | 10/1968 | Oliveira | ................ | 280/63 |
| 3,464,607 A * | 9/1969 | Grace et al. | ................ | 224/156 |
| 3,580,592 A | 5/1971 | Schrecengost | ................ | 280/8 |
| 3,860,254 A | 1/1975 | Wegener | ................ | 280/36 R |
| 4,055,354 A | 10/1977 | Sharpe | ................ | 280/47 |
| 4,063,744 A | 12/1977 | Fraser | ................ | 280/42 |
| 4,114,914 A | 9/1978 | Cohen | ................ | 280/30 |
| 4,214,774 A | 7/1980 | Kluge | ................ | 280/47 |

(Continued)

*Primary Examiner*—Jeff Restifo
(74) *Attorney, Agent, or Firm*—Alfred M. Walker

(57) ABSTRACT

A multi-purpose, collapsible portable cart, for use in camping, hunting and other outdoors activities carries medical rescue carts, canoes, small boats, game, or hauled cargo by hand. The portable cart can be converted to a various uses and the portable cart can be folded down and transported within a backpack, hand carried bag, canoe or boat. It transports injured persons or cargo over long, rough terrain and it can broken down into a carrying position, by hand or by back. Its width can be varied to accommodate cargo of varying widths. Two or four wheeled versions can be assembled with axles and wheels. The cart has optional removable clamps for clamping a conventional transportable carrier, such as a stretcher or stokes-type rescue carrier bed, thereto. The objects being carried can be held by clamps, by fasteners, or through the use of insertions with longitudinally extending channels. An optional pivotable kickstand and/or tie rods can stabilize the cart in a position of rest. It is collapsible, so that it can be disassembled and carried, and then reassembled at another destination along a wilderness journey.

35 Claims, 55 Drawing Sheets

U.S. PATENT DOCUMENTS

| | | | | |
|---|---|---|---|---|
| 4,316,615 A | | 2/1982 | Willette | 280/47.26 |
| 4,444,405 A | | 4/1984 | Barrus | 280/47 |
| 4,460,188 A | | 7/1984 | Maloaf | 280/30 |
| 4,550,925 A | | 11/1985 | McDonough | 280/47 |
| 4,712,803 A | * | 12/1987 | Garcia | 280/47.331 |
| 4,789,180 A | | 12/1988 | Bell | 280/47 |
| 4,822,065 A | * | 4/1989 | Enders | 280/47.331 |
| 4,826,187 A | | 5/1989 | Abbott et al. | 280/47 |
| 5,090,368 A | * | 2/1992 | Berghoefer | 119/843 |
| 5,187,821 A | | 2/1993 | Nieminen et al. | 5/83 |
| 5,295,556 A | | 3/1994 | Mullin | 182/187 |
| 5,320,371 A | | 6/1994 | Levad | 280/414 |
| 5,330,212 A | * | 7/1994 | Gardner | 280/40 |
| 5,460,307 A | | 10/1995 | Stevenson | 224/153 |
| 5,564,720 A | | 10/1996 | Stringer | 280/30 |
| 5,673,928 A | | 10/1997 | Jury | 280/645 |
| 5,687,978 A | | 11/1997 | Rhodes et al. | 280/30 |
| 5,695,208 A | | 12/1997 | Baechler et al. | 280/204 |
| 5,820,141 A | | 10/1998 | Wilkerson | 280/47 |
| 5,829,771 A | | 11/1998 | Hsu | 280/292 |
| 5,887,676 A | * | 3/1999 | Harbin | 182/20 |
| 5,887,879 A | * | 3/1999 | Chumley | 280/40 |
| 6,039,333 A | | 3/2000 | Hamblin | 280/47.18 |
| 6,142,491 A | | 11/2000 | Darling, III | 280/30 |
| 6,164,671 A | | 12/2000 | Darling, III | 280/30 |
| D488,161 S | | 1/2001 | Korpai | D3/217 |
| 6,175,977 B1 | | 1/2001 | Schumacher et al. | 5/626 |
| 6,270,092 B1 | | 8/2001 | Darling, III | 280/30 |
| 6,283,496 B1 | * | 9/2001 | Dickmann | 280/652 |
| 6,364,336 B1 | | 4/2002 | Jenkins | 280/414 |
| 6,375,200 B1 | * | 4/2002 | Harter | 280/30 |
| D459,564 S | | 6/2002 | Daniels | D34/25 |
| 6,550,791 B1 | | 4/2003 | Ramsey | 280/47.19 |
| 6,561,529 B1 | | 5/2003 | Darling, III | 280/79.2 |
| 6,575,482 B1 | | 6/2003 | Dombroskie | 280/47.24 |
| 6,688,635 B1 | | 2/2004 | Watts | 280/652 |
| 6,926,292 B1 | * | 8/2005 | Weeks | 280/47.331 |
| 2003/0127476 A1 | | 7/2003 | Lockard | 224/15 |
| 2004/0108688 A1 | * | 6/2004 | Holmes | 280/640 |

* cited by examiner

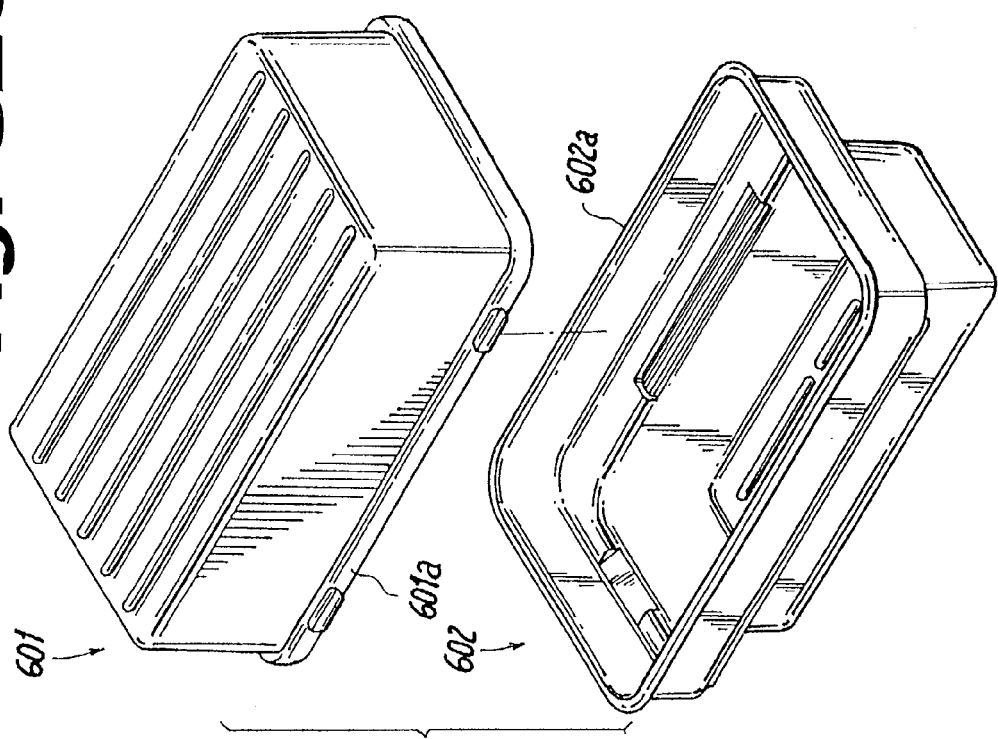
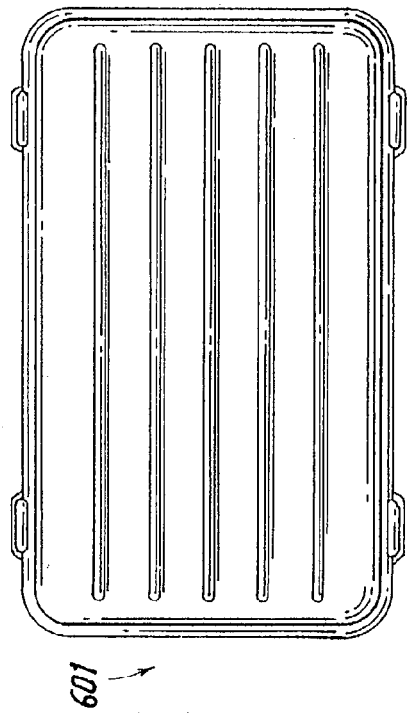
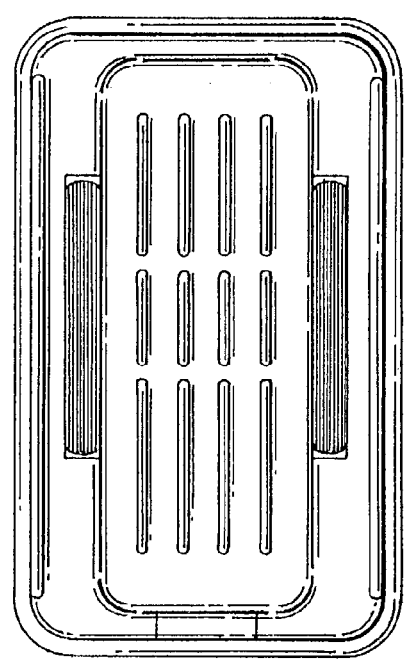

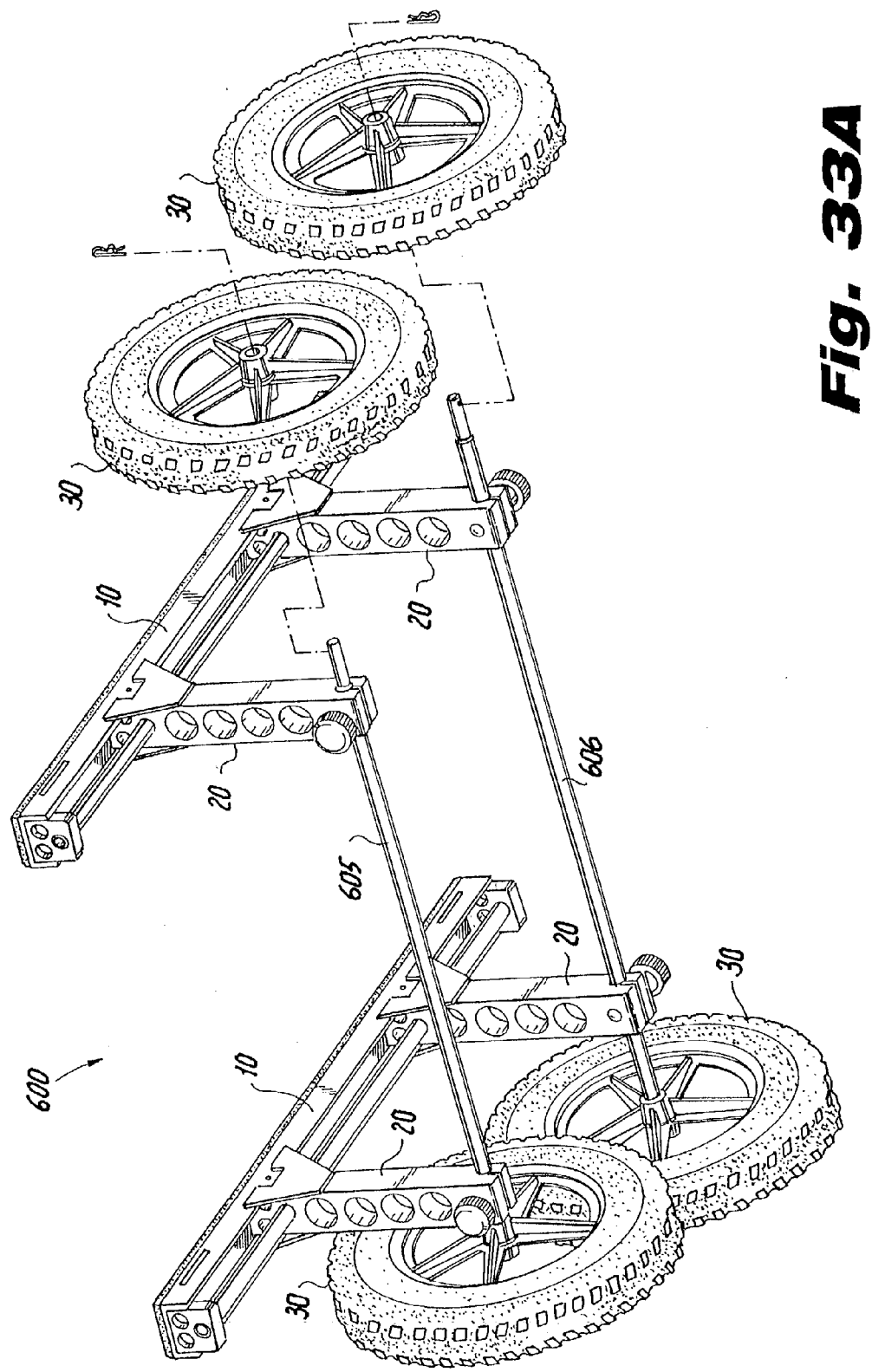

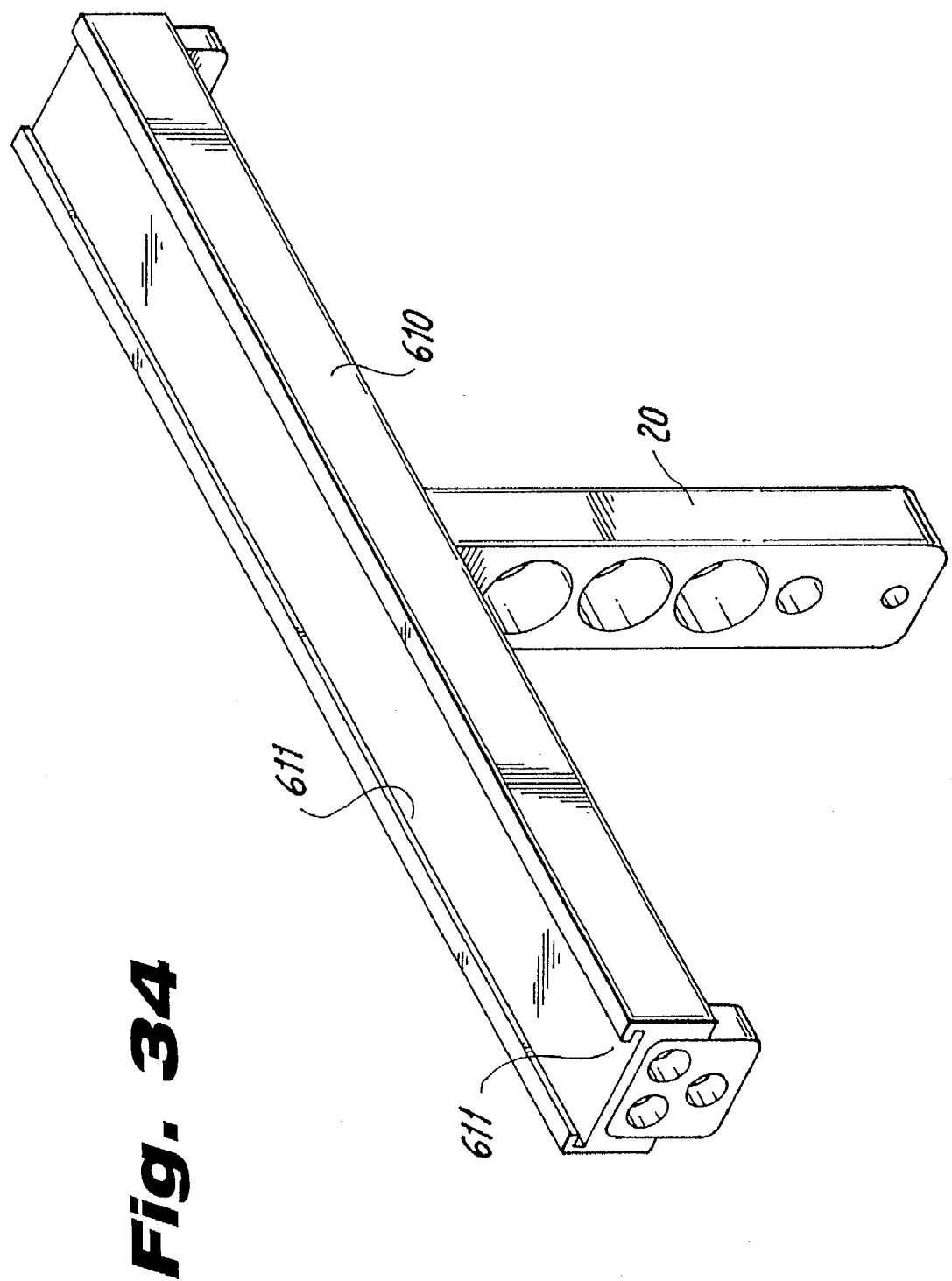

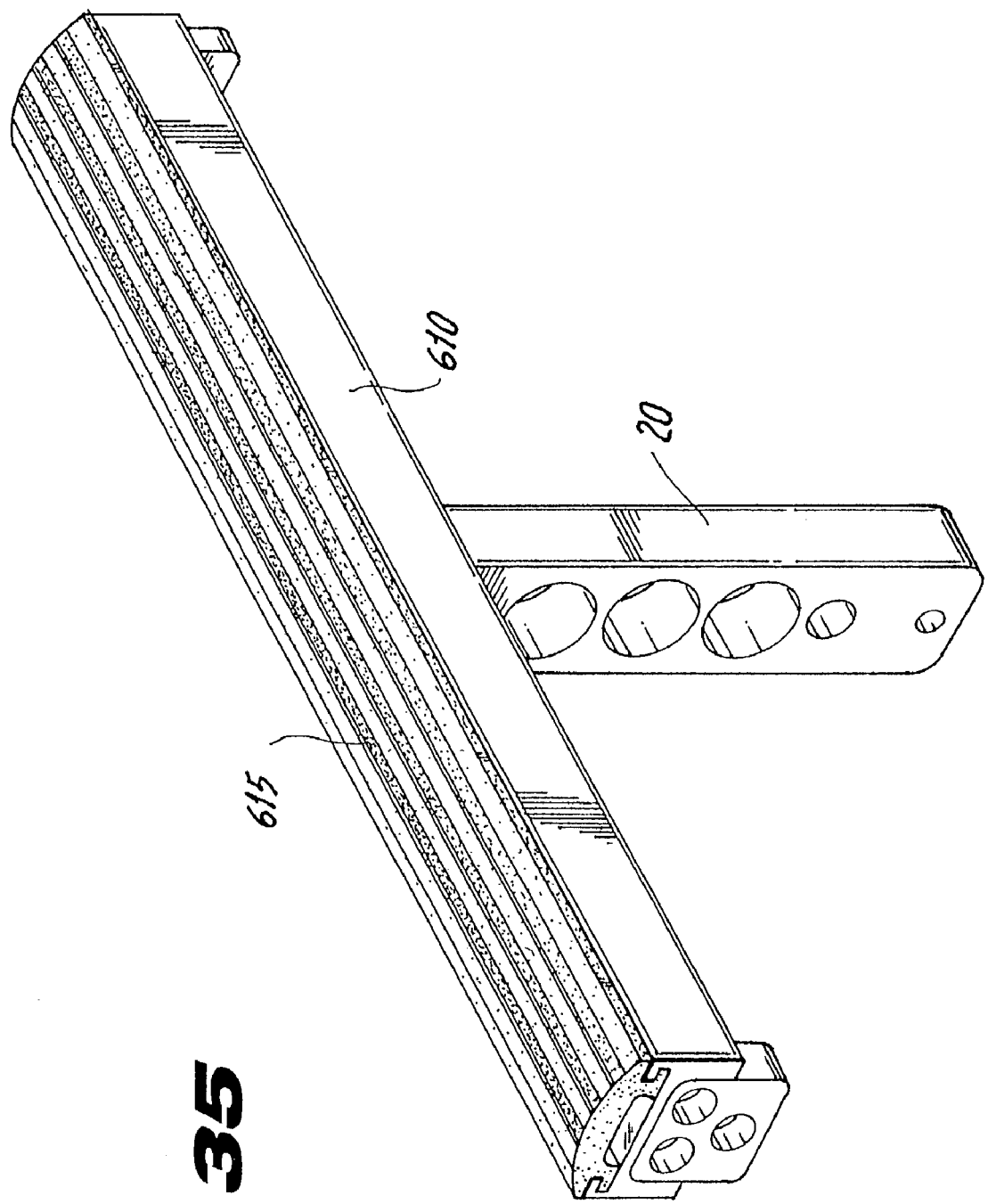

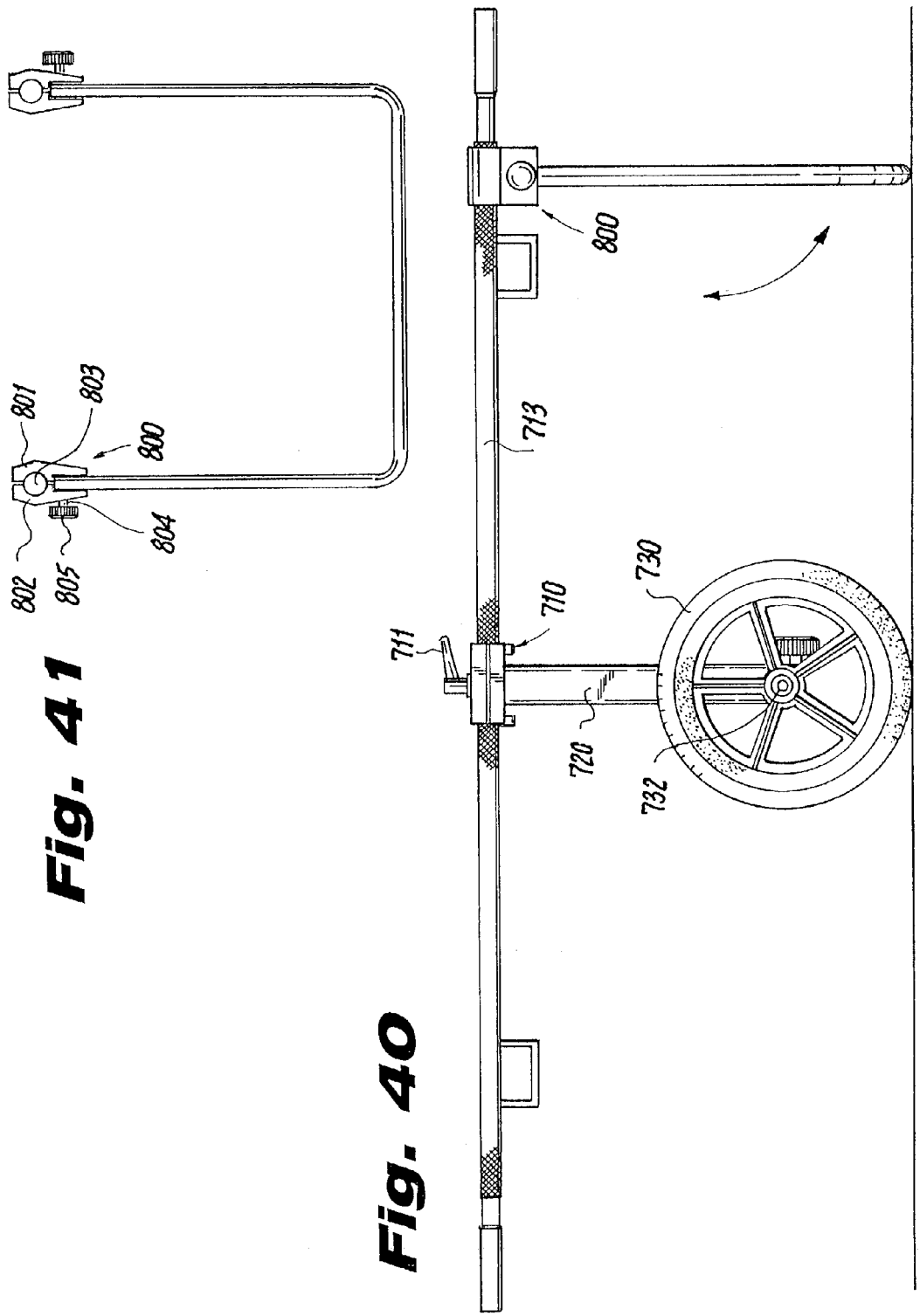

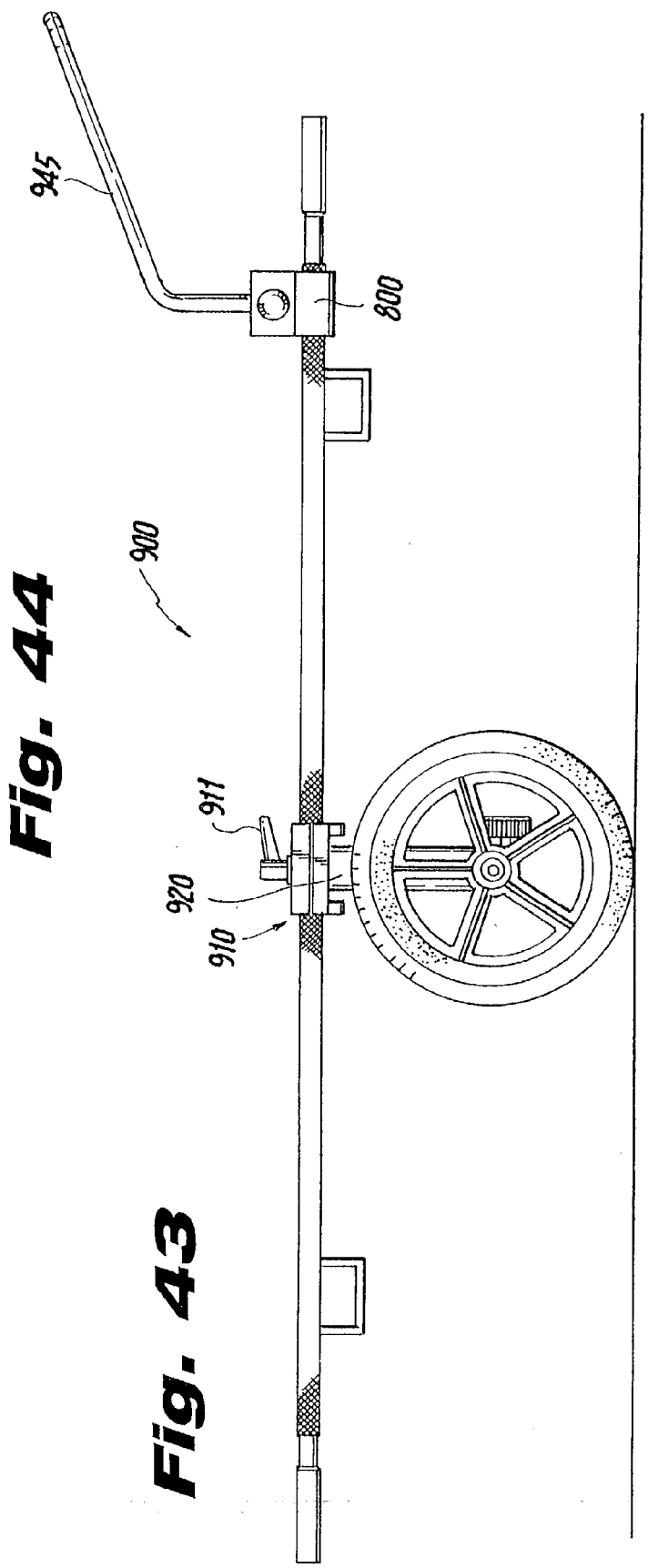

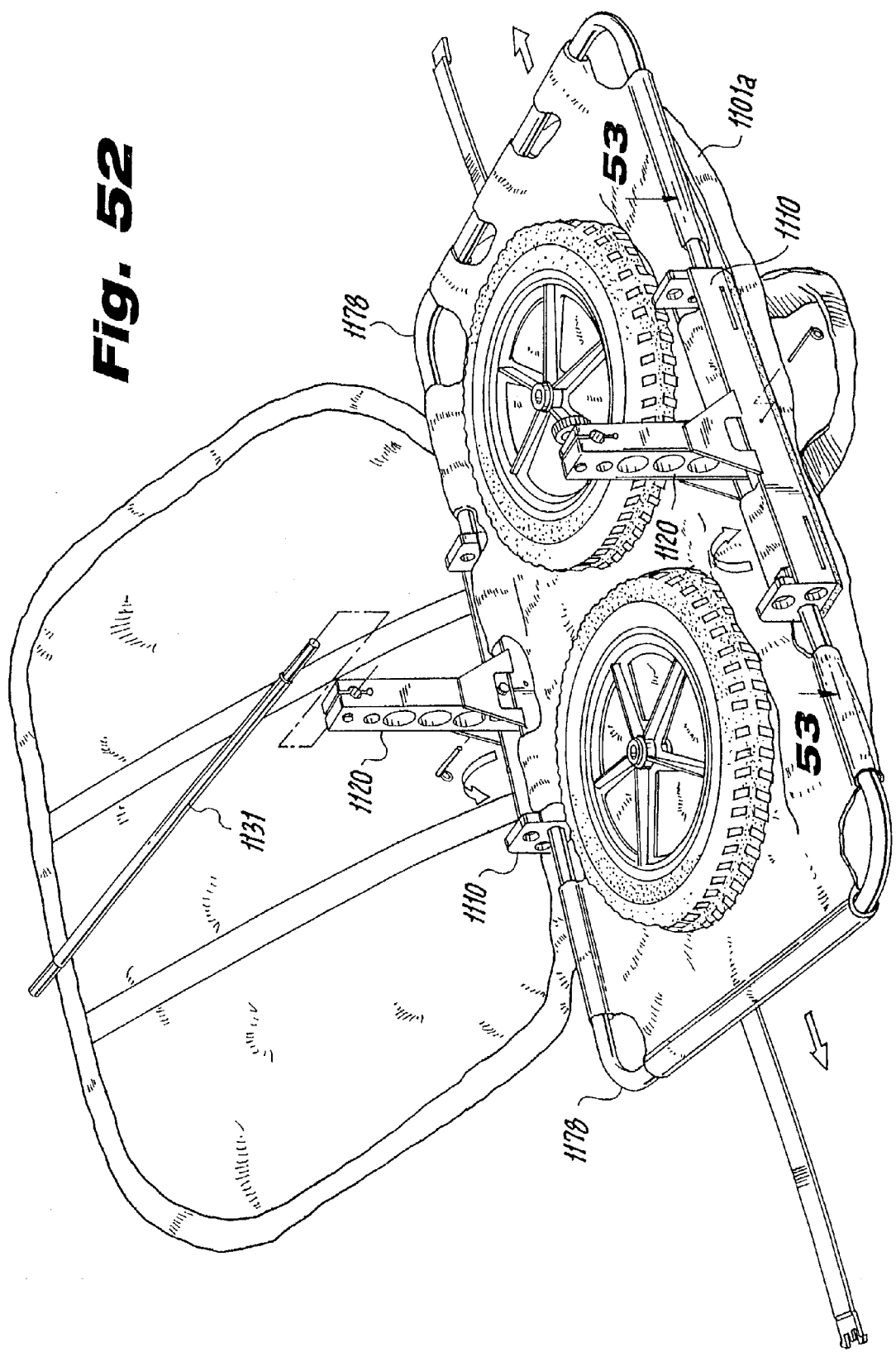

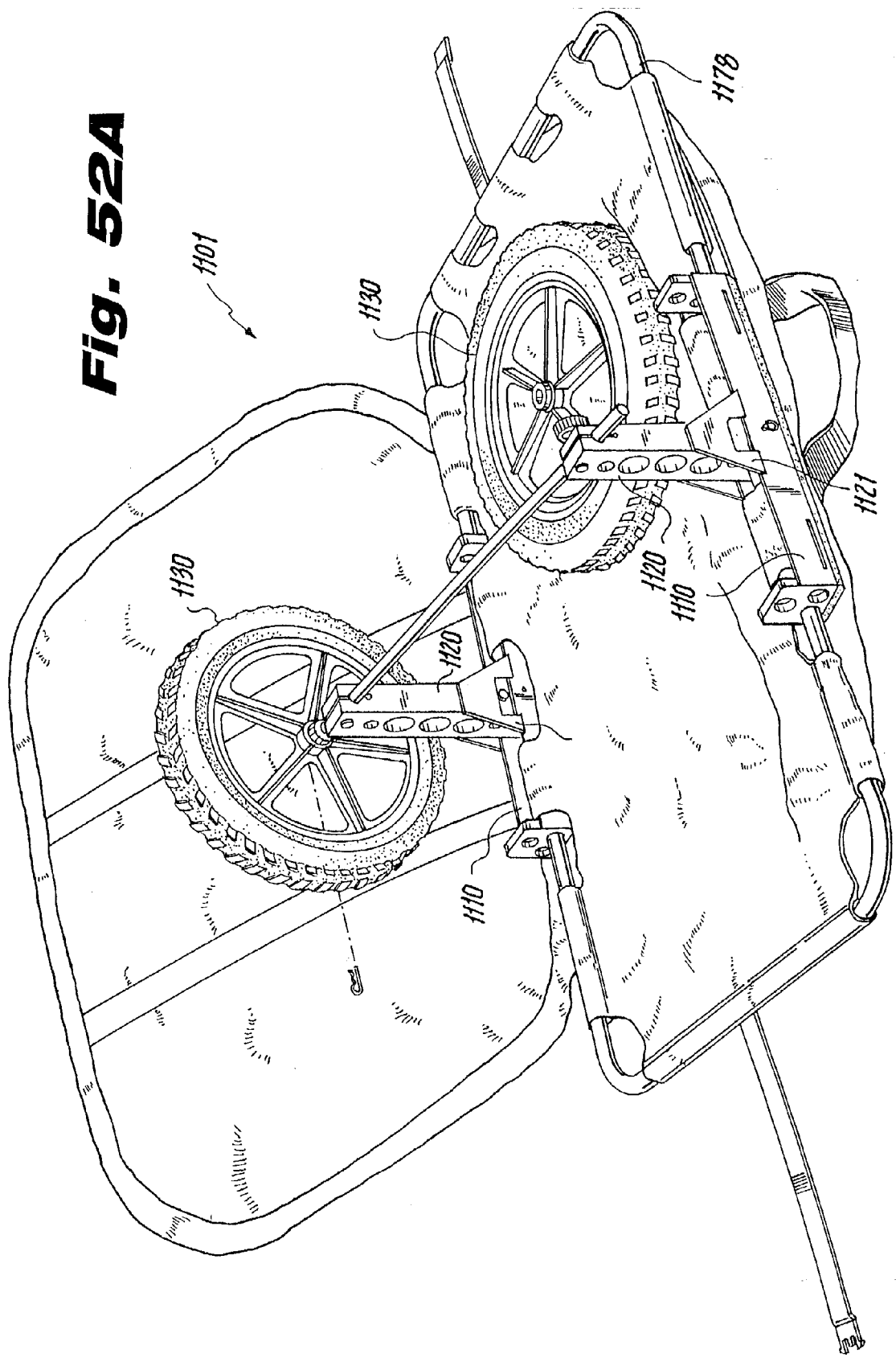

VERSATILE PORTABLE CART

RELATED APPLICATIONS

This application is a continuation-in-part of U.S. Ser. No. 09/939,376 filed Aug. 24, 2001, now U.S. Pat. No. 6,561, 529.

This application in part disclosed and claims subject matter disclosed in my earlier filed provisional patent applications, Ser. No. 60/233,138 filed Sep. 18, 2000 and 60/246, 014 filed Nov. 6, 2000 which both disclose in part subject matter disclosed in my earlier filed patent applications filed under Ser. No. 09/226,838 filed Jan. 7, 1999, Ser. No. 09/479,344 filed Jan. 7, 2000 and Ser. No. 09/745,116 filed Dec. 21, 2000.

FIELD OF THE INVENTION

The present invention relates to a multiple-purpose collapsible portable cart, for use in camping, hunting, search and rescue, and other outdoors activities. The cart can be easily assembled in a number of uses, and disassembled for easy transporting of the cart in a backpack or hand-carried bag.

BACKGROUND OF THE INVENTION

Various single use carts exist for carrying canoes and small boats by hand. Other outdoors-oriented carts exist for carrying game. In addition, wheelbarrows and small carts are used for transporting gear at outdoors locations. However, none of the existing carts can be converted to a versatile portable cart which can interchangeably function as a rescue cart with a carrier for injured persons, as a portable canoe or boat cart which can be folded down and transported within the canoe or boat, as a game cart for transporting game over long, rough terrain, or as a gear cart, all of which can broken down into a carrying position, by hand or by back.

OBJECTS OF THE INVENTION

It is therefore an object of the present invention to provide a versatile multi-purpose cart, which is quickly assembled or disassembled.

It is also an object to provide a multi-purpose cart, which quickly converts from one use to another.

It is further an object to provide a cart which as a stable, flat platform for supporting cooking devices, machinery, camera tripods and the like.

It is yet another object to provide a cart, which is stable during transport over rough terrain.

It is yet another object to provide a portable collapsible cart with minimal fasteners.

It is yet another object to provide a portable collapsible cart, which can be stabilized in a position of rest.

It is also an object of the present invention to provide a universally adaptable carrier cart.

It is yet another object of the present invention to provide a cart for carrying medical rescue stretchers, canoes and small boats by hand.

It is yet another object to provide a portable search and rescue cart adapted to carry a stretcher or other carrier for an injured person.

It is also an object of the present invention to provide an outdoors-oriented cart for carrying game or injured parties.

It is yet another object of the present invention to provide a small cart with a well for transporting gear at outdoor locations.

It is further an object to provide a collapsible, portable cart, which can be assembled with minimal fasteners.

It is also an object of the present invention to provide a versatile portable cart which can interchangeably function as a portable canoe or boat cart which can be folded down and transported within the canoe or boat, as a rescue cart for injured persons, as a game cart for transporting game over long, rough terrain, or as a gear cart, all of which can be broken down into a carrying position, by hand or by back.

It is yet another object to provide a portable cart which is either backpackable or which can be carried by hand.

It is yet another object to provide a carrier for transporting military equipment and ordnance.

It is yet another object to provide a cart-hauling clamp for pulling the portable cart behind a bicycle while resisting tipping over of the cart during directional change of the cart-hauling bicycle.

It is yet another object to provide a portable cart which can be used as a wheeled cart on terrain or as a ski cart on snow.

It is also an object of the present invention to improve over the disadvantages of the prior art.

SUMMARY OF THE INVENTION

In keeping with these objects and others, which may be apparent, the present invention relates to a convertible, multi-purpose portable cart, for use in camping, hunting, search and rescue operations and other outdoors activities, such as for carrying canoes and small boats by hand. It may also carry game, injured parties or be used for transporting gear at outdoors locations. It is a versatile portable cart which can interchangeably function as a medical rescue carrier, cargo carrier, portable canoe or boat cart, which can be assembled with interfitting parts and with minimal fasteners. It can be folded down and transported within the canoe or boat, as a carry cart for transporting game or injured parties over long, rough terrain or snow, or as a gear cart, all of which can be broken down into a carrying position, by hand or by back.

The cart is moved by manual pushing or pulling force applied to activate vehicle movement actuators, such as wheels upon terrain or skis upon snow or ice, wherein upon the exertion of force the wheels or skis cause forward or rearward movement of the portable cart.

The cart is easily assembled or disassembled by connecting its parts together, or optionally assembled from a pre-set storage configuration in a carry pack to an assembled structure.

The cart easily changes from one use to the other. For example, in one embodiment, a hollow cargo well may contain a second loose layer, which turns into a rescue stretcher when the second layer becomes taut when zipped up from a loose, relaxed state within the cargo well to a taut rescue stretcher for carrying injured persons thereon.

In an alternate rescue embodiment, clamps can be provided on shortened horizontal support members to hold medical rescue stretcher rails, and optional handles or pivotable kickstands can be attached by further clamps to the stretcher rails.

In military applications, the height of the vertical struts can be lowered to keep the injured person on the stretcher close to the ground, to avoid visible detection.

The portable cart is preferably under thirty (30) pounds, preferably twenty two (22) to twenty eight (28) pounds, so that it can be carried by hand or within a backpack over rough terrain. It is collapsible, so that it can be disassembled and carried in a canoe or small boat, and then reassembled with minimal assembly steps and parts, at another destination along the canoe or boat's journey.

To prevent flat tires, its wheels are preferably solid core tires, which cannot get flat, with stainless steel bearings, over which the wheels rotate. A typical wheel has two press fit bearings adjacent to an integrally molded hub. While the typical wheel is about 2–3 inches wide, for transporting cargo or game on sand or granular terrain, the wheels may be wider, such as 4–6 inches in width.

For maneuverability in snow-filled winter scenes, optional ski members, including skis, are attached to vertical braces having a length corresponding to the radius of the cart's wheels. The vertical ski braces are attached to the vertical struts where the wheel axles attach.

For hardiness, the material of the structural frame components is preferably a lightweight but resilient and strong material, such as, for example, 60–61 T6 fully anodized aluminum, or stainless steel. In a substantially pre-assembled optional embodiment, in a storage position within a carry bag, the vertical struts are connected to horizontal supports, which are further engaged with rails to hold a cargo well or rescue stretcher. Pivoting of the horizontal supports about each respective longitudinal axis to a position of rest biases the resiliently engaged rails to return to their natural position of use when released from the storage position.

These pivotable support and strut assemblies can be further strengthened by optional V-shaped braces, which are positioned where each vertical strut meets each corresponding horizontal support member.

The portable cart can hold up to 500 pounds, and for manual pulling easily pulls 300 pounds. The portable cart is durable to carry heavy weight over rough terrain, such as rock-strewn dirt trails or sloping riverbank surfaces.

To carry a canoe or boat, two horizontal load supports optionally include support cushions upon which the canoe or boat rests. The position of the horizontal load supports can be varied to accommodate various widths of the canoe or boat.

To function as a game or rescue cart, the frame, such as a pair of U-shaped rails which are joined end to end, is provided upon the horizontal load supports to form a rounded rectangular frame, over which a taunt, but slightly stretchable, bed of fabric is placed, such as canvas or other flexible material, i.e., plastic or netting. The bed includes sewn loops through which portions of the U-shaped rails of the frame are inserted. Other fabric fasteners such as clips, zippers or eyelets can be also used.

In an alternate embodiment, the boat support cushions are removable from the horizontal load supports and are replaced by a two-piece clamp, which attaches by at least one fastener, such as a pair of screws, to the horizontal load supports of the cart. Conventional stretchers or personal rescue carriers, such as Stokes-type baskets, are clamped to the cart within the clamps on each respective horizontal load support. In this embodiment, the boat support cushions are attached to a thin plate, such as of 1/8 inch aluminum or otherwise, which has at least one fastener such as a pair of threaded studs, insertable with the respective hole or holes in the horizontal load supports, so that the boat support cushions can be removed and replaced by the stretcher-bearing clamps.

To function as a wagon cart with a well for carrying gear, a hollow fabric well, such as of canvas, is draped between said horizontal load members and over and around the front and rear U-shaped brackets. A cover may be provided to cover the gear therein. The well and cover can also be made of other suitable flexible materials, such as plastic, netting or canvas. An optional removable hard bottom substrate floor layer may be provided within the cargo well. While this floor layer may be of any hard material, materials such as lightweight aluminum, wood or marine polymer plastics are preferred.

Furthermore, the cargo cart may have an optional handle from which may be draped a further optional accessory cargo bag. In the stretcher embodiment, where the upper layer is fastened taut, the handle may have a removable headrest pillow.

Kickstands may be optionally provided to stabilize the portable cart during rest or during loading of contents thereon.

In yet another embodiment, an anti-tipping bicycle attachment is provided to attach the cart to a bicycle while preventing the cart from turning over during transportation.

In one embodiment, the cart has two wheels for cargoes weighing from 300–500 pounds. However, for heavier loads, such as for 600–1,000 pounds, an optional double axle version includes two pairs of overlapping wheels for heavier cargo. In this embodiment, the portable cart uses four wheels in the overlapped configuration, with an optional hard molded canister. In this overlapping, wheeled version, a long axle attaches a pair of front wheels and a short axle attaches a pair of rear wheels through the respective vertical supports, although the length of the axles can be reversed. Using four wheels doubles the carrying capacity of the cart, and the overlapped positioning of the pairs of wheels maintains a short wheelbase for compactness, for maneuverability and for climbing slopes or ledges.

In the four-wheeled embodiment, double parallel rails may be provided for additional structural strength. The overlapping, dual axle, four-wheel version gives the user extra pivot points on rough terrain. For example, pushing down upon the optional handle enables the user to lift the further away distal wheels off the ground. Furthermore, pulling upon the handle enables the user to lift the nearer, proximal wheels off the ground.

The accessory which is placed upon the vertical supports of either the two wheeled or four wheeled carts, such as the rescue stretcher, the boat cushion, the cargo cart, etc., can be attached permanently or by fasteners to each horizontal load support member of the portable cart. However, in an alternate embodiment, the horizontal supports have longitudinally extending channels to slide the accessories in on top of the horizontal supports. Furthermore, the accessory, such as a railed rescue stretcher, can be carried by a clamp which itself is attached to the horizontal support by insertion in such a channel.

This clamp upon each horizontal support member may be a one piece clamp with a full width top section and short end pieces which mate with and slip into a T-shaped slot channel of the horizontal support member. Alternatively, the clamp may have a full width bottom member which mates with and slides into a T-slot of the horizontal support. In yet another embodiment, two short identical clamp members are inserted into the T-slots of the horizontal member at the two ends. Moreover, the clamping sections can have spring-like gripping action to be retained upon tubular members, such as medical rescue stretcher rails, or the clamps can use fasteners such as fasteners, such as thumbscrews or ball plungers for retention.

In yet another embodiment, a covered canister can be held in place over the rails of the frame of the cart, in a stable position, by virtue of its weight being held in place upon the rails of the cart, wherein a concave, downward facing channel engages the linear, upper convex support surface of each rail.

Furthermore, the cart of the present invention can be disassembled and broken down for hand held or backpack transport and it can easily be assembled for its varied uses. Moreover, when a boat or canoe is carried, the cart has a precision balance feature that rotates the wheels to maintain the cart in a horizontal stable position.

DESCRIPTION OF THE DRAWINGS

The present invention can best be described in connection with the accompanying drawings, in which:

FIG. 32A is a top plan view of the cover for a bin used with the cart as in FIG. 32;

FIG. 32B is a top plan view of the bin used with the cart as in FIG. 32;

FIG. 32C is an exploded view of the cover and bin as in FIG. 32;

FIG. 33A is a bottom perspective view of the chassis and wheel portions thereof;

FIG. 34 is a perspective view of an alternate embodiment of a channeled horizontal load support member with an integral T-slot;

FIG. 35 is a perspective view of the channeled horizontal load support member as in FIG. 34, shown with an extruded support cushion installed in a T-slot;

FIG. 40 is a side elevational view of an alternate embodiment for a rescue carrier cart with shortened horizontal supports and with a pivotable kickstand;

FIG. 41 is a front elevational view of the kickstand portion of the rescue carrier cart as in FIG. 40;

FIG. 43 is a side elevational view of a low profile military rescue carrier cart, shown with a handle;

FIG. 44 is a front elevational view of the handle as in FIG. 43;

FIG. 52 is an exploded perspective view of the cart as in FIG. 51, shown during assembly, wherein arrows indicate directional movement of rotation about the axis of the rails shown therein;

FIG. 52A is a perspective view thereof showing one wheel in place upon an axle;

DETAILED DESCRIPTION OF THE PREFERRED EMBODIMENTS

Figure 1:
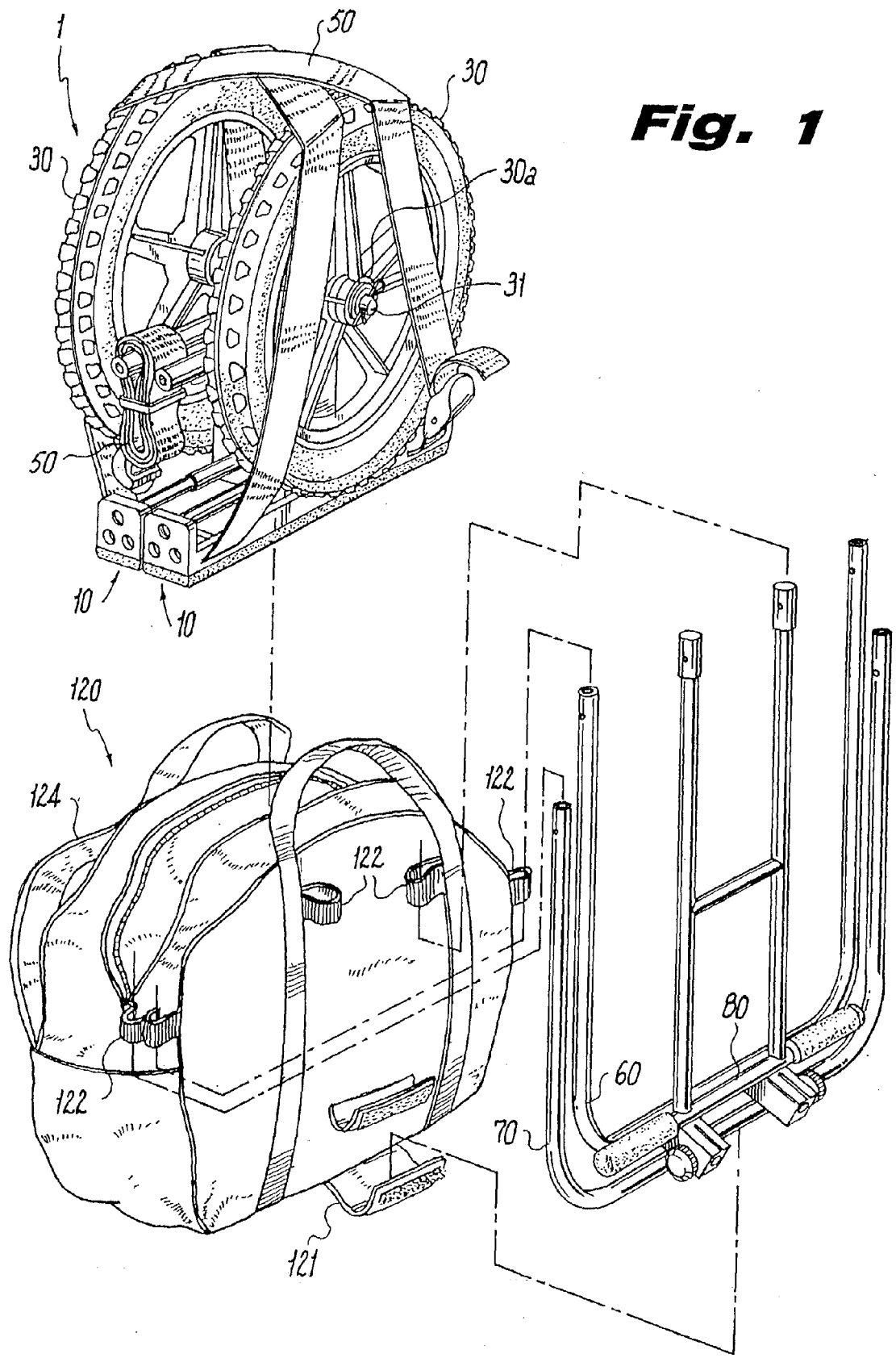
FIG. 1 is an exploded perspective view of the components of the basic cart embodiment broken down for transport within and on the storage backpack.
Figure 70:
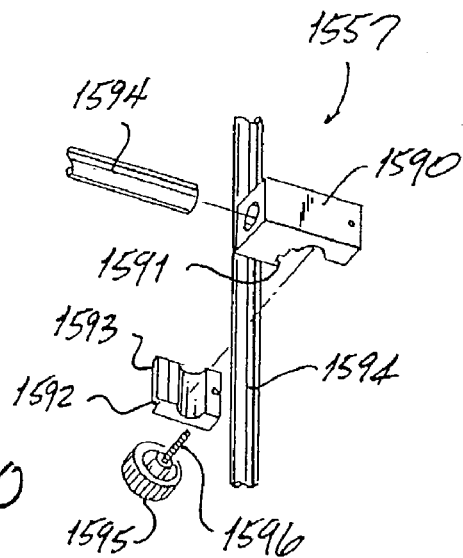
FIG. 70 is a perspective view of adjustable clamp assembly.

As shown in the drawing FIGS. 1–70, the present invention is directed to foldable cart 1, for carrying a boat, such as a canoe, which can also function as a game cart or a wagon for carrying gear in outdoor field applications.

FIG. 1 shows cart 1 in a disassembled storage position with a pair of horizontal load support members 10 laid parallel adjacent to each other, supporting wheels 30 thereon. Wheels 30 are secured in place by a transverse connecting rod 31 through wheel hubs 30a and by one or more load securing straps 50. Disassembled storage cart 1 is inserted within carry bag 120, which includes ledge 121 and fabric loops 122 for holding bracket members 60, 70 and handle 80 outside of carry bag 120.

Figure 2:
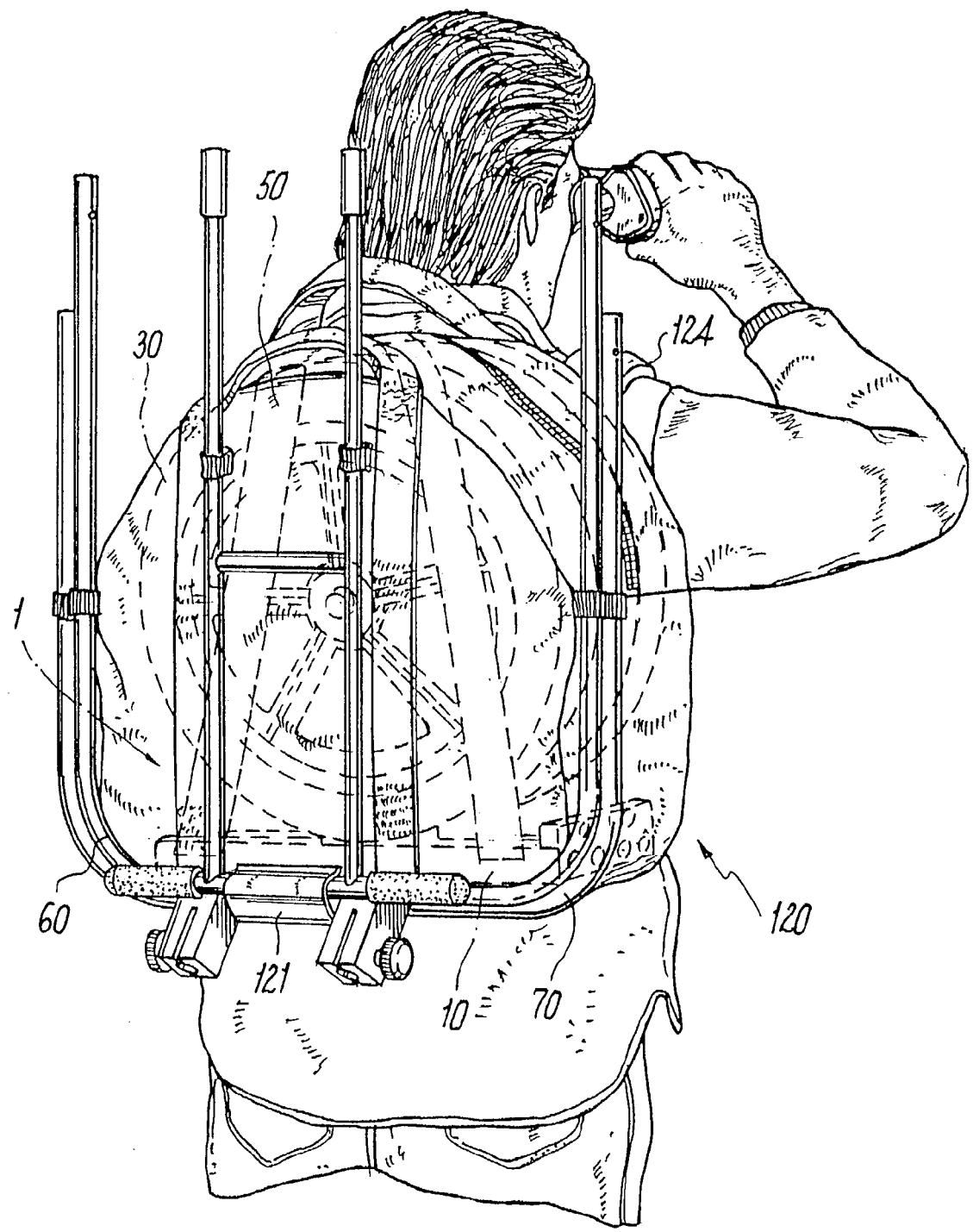
FIG. 2 is a perspective view of the backpack on a user, with the cart contained therein.

To transport portable cart 1 by hand carry straps 124 are attached to carry bag 120. Conversely as shown in FIG. 2, to transport portable cart 1 upon the back of a user, carry straps 124 are attached to carry bag 120, which supports portable cart 1 in a weight bearing manner, or else horizontal support members 10 are inverted to support portable cart 1 in a weight bearing manner, and carry bag 120 covers portable cart 1 in a non-weight bearing manner.

To be disassembled in a carry position, U-shaped bracket rails 60, 70, wheels 30 and axle members 32 are inversely attached to horizontal load supports 10 to comprise a folded manually transportable cart.

Figure 3:
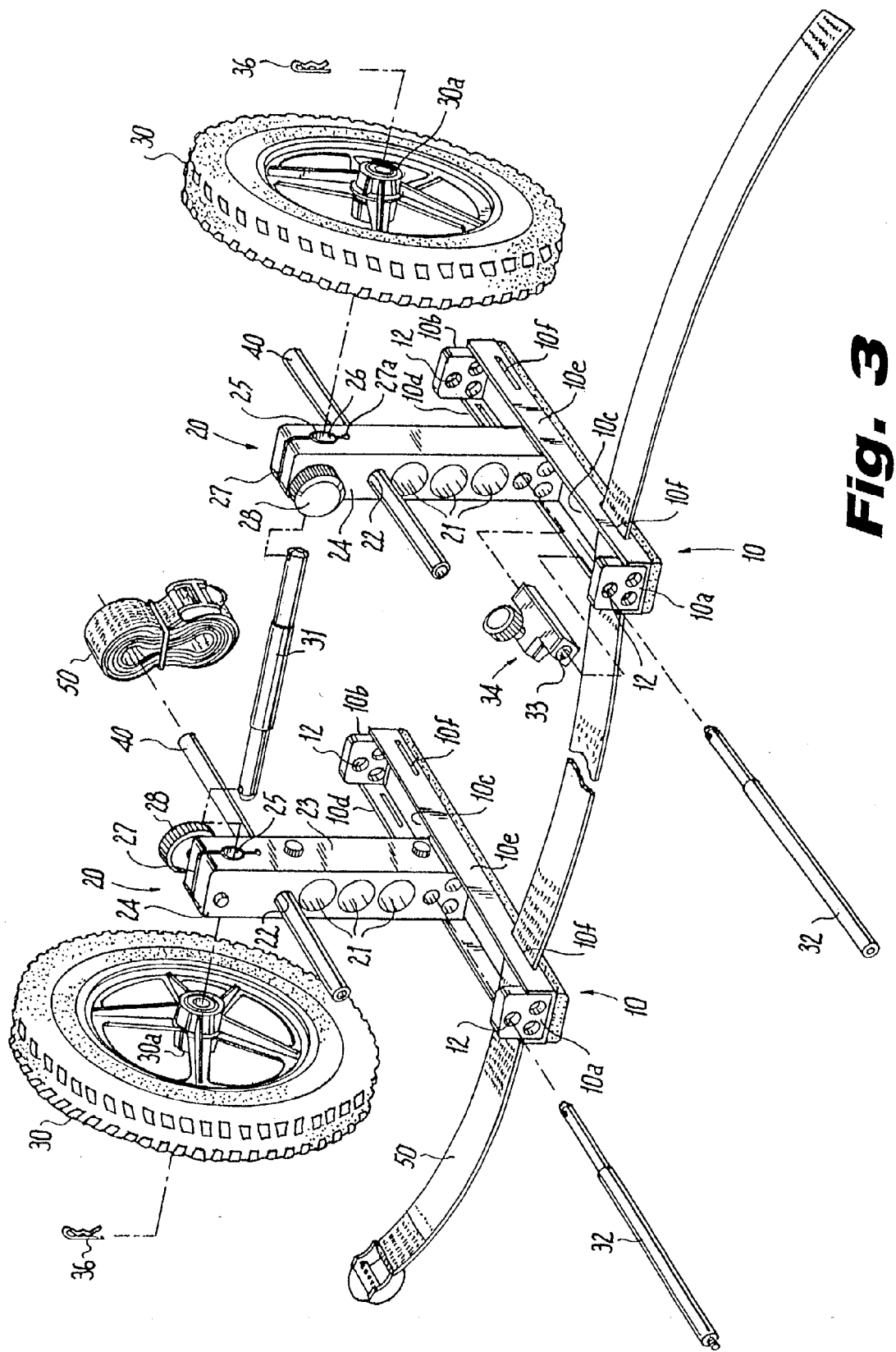
FIG. 3 is an exploded inverted perspective view of the basic cart embodiment components, disassembled from their original transport configuration.

As shown in the exploded view of FIG. 3, in the storage position, in a preferred embodiment, cart 1 includes a pair of parallel, spaced apart inverted horizontal load support members 10. Support members 10 each have a front-end 10a and a rear end 10b. The front and rear ends 10a, 10b each have at least one axially placed receptacle aperture 12 extending longitudinally within each load support member 10, for holding structural components therethrough in a storage position, such as axle members 32 for wheels 30. In this storage position, axle members 32 are also inserted within aperture of 33 of axle connector 34.

FIG. 3 also shows horizontal load support members 10 having preferably a generally upside down U-shaped configuration when viewed in cross-section, wherein a generally flat member 10c has downwardly extending flanges 10d, 10e including one or more linearly extending slots 10f for insertion of holding straps 50 therein.

Although apertures 12 are shown in the drawings, it is contemplated that other configurations may be applicable to horizontal load support members 10, so long as other members, such as rails 60, 70 and so forth, may be attached thereto by fasteners, preferably in an axis parallel to the axis of horizontal support members 10.

While size may vary, support member 10 is preferably sixteen (16) inches long and two and a quarter (2.25) inches wide. Each flange 10d, 10e extends down about one (1) inch from flat member 10c. Slots 10f are preferably 2.125 inches wide and 0.1875 inches high, to accommodate straps 50, such as, for example, standard 2-inch wide fabric straps.

FIG. 3 also shows vertical struts 20 optionally having at least one small hole 22, such as kickstand receptacle aperture 22, for insertion of optional kickstand 40 therein.

FIG. 3 also shows horizontal load support members 10 being respectively demountably attached to a pair of vertical struts 20, having apertures 21 and 22. In one embodiment, horizontal load support members 10 can be demountably attached to vertical struts 20, but in an alternate embodiment they can be permanently affixed to each other, such as in the alternate embodiments shown in FIGS. 3A and 3B.

Moreover, while preferably horizontal struts are U-shaped, as in FIG. 3, in alternate embodiments other configurations can be used, as long as vertical strut 20 can be attached to horizontal support member 10.

Figure 3A:
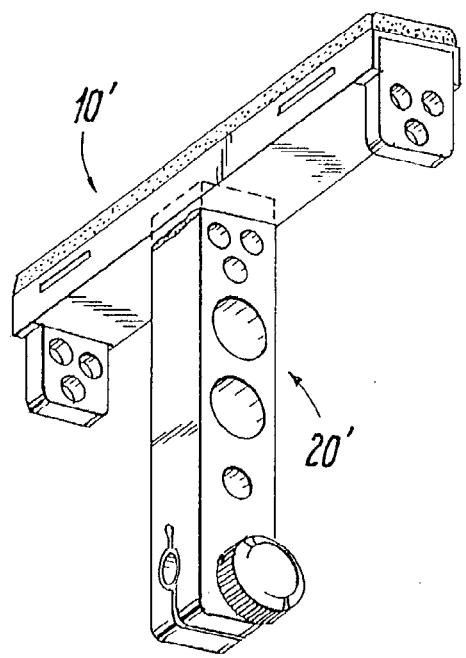
FIG. 3A is a perspective view of an alternate simplified embodiment where the vertical strut is permanently attached to a horizontal member in a "T" configuration.
Figure 3B:
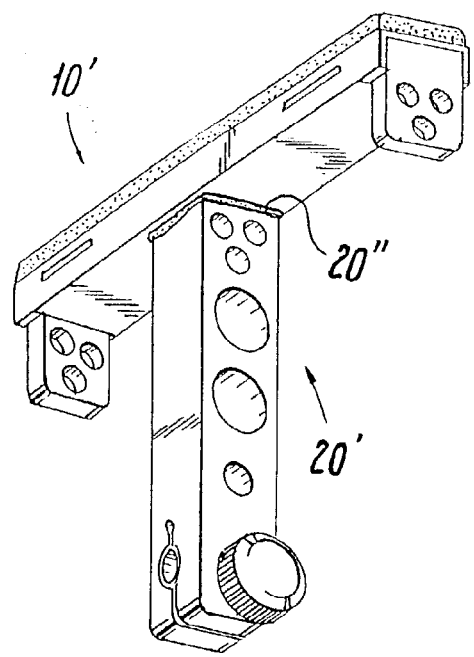
FIG. 3B is a perspective view of an embodiment where the horizontal support is permanently affixed to the vertical strut by welding or other means.
Figure 3C:
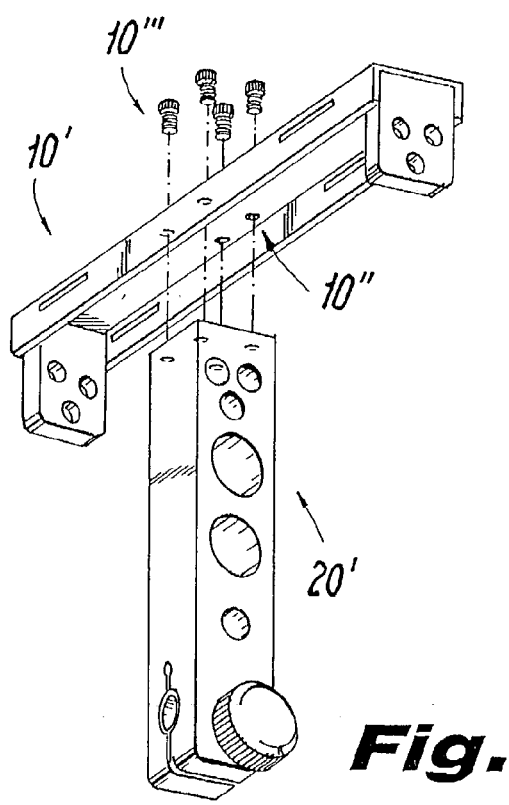
FIG. 3C is an alternate embodiment where the vertical strut fits within a hole in the horizontal support and is fastened by a fastener.

For example, in FIG. 3A vertical strut 20' is in a unified T-shaped member with horizontal support member 10'. In FIG. 3B, vertical struts 20' and horizontal support members 10' are attached by weldment 20''. In FIG. 3C, vertical strut 20' is inserted in hole 10''' of horizontal support member 10', and attached by fastener 10'''', such as a screw or other fastener. In these alternate embodiments shown in FIGS. 3A, 3B or 3C, horizontal load support members 10' may be solid in cross sectional configuration. One such configuration shown in FIGS. 3A, 3B and 3C is that of a parallelepiped, namely a solid form, all of whose sides are parallelograms, such as rectangles, and whose opposite sides are parallel to one another.

In another embodiment vertical strut 20 may be adjustable in length with a sleeve containing a telescopic shaft (not shown) and with a spring urging the shaft in and out of the sleeve, with a lock provided.

Figure 4:
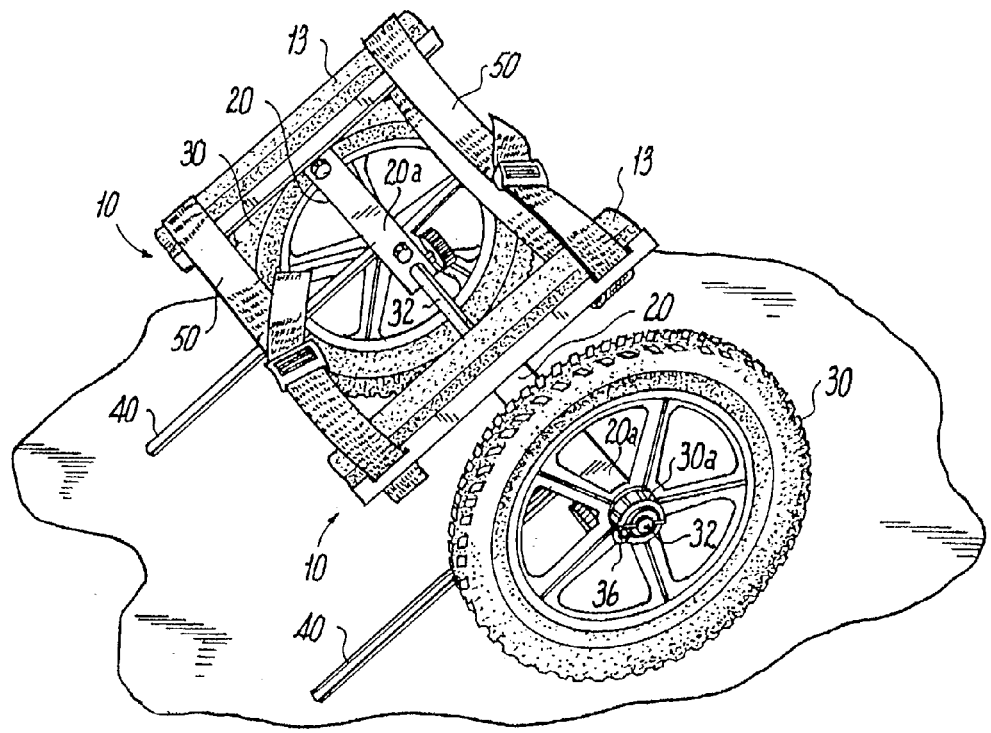
FIG. 4 is a perspective view of the assembled boat cart.

Kickstand 40 is shown deployed in FIG. 4. Kickstand 40 is secured in place by a fastener, such as nylon set screw 37. Setscrews 37 also hold axle members 32 in the storage position through vertical struts 20.

Vertical struts 20 are preferably made from 1 ½×2-inch solid bar stock anodized aluminum, or stainless steel. Vertical struts 20 are preferably about 10.25 inches long, 2 inches wide and 1 ½ inches in depth.

Also shown in FIG. 3, the plurality of optional larger holes 21, such as holes, which are 0.765 or 1.625 inches in diameter, are located on a front side of vertical strut 20. Smaller hole 22 on the bottom accommodates kickstand 40, which is preferably a hollow aluminum tube of 0.75-inch diameter and 16 inches in length.

Optional larger holes 21 within vertical strut 20 are provided for weight reduction of portable cart 1.

On a side 23 transverse to the front 24 of each vertical strut 20, at a lower portion 20a thereof, is provided a further hole 25 of about 1-inch in diameter for insertion of each axle member 32 therethrough. Hole 25 has a permanently affixed, bushing 26 therein, such as a PVC (polyvinyl chloride) bushing, to prevent wear and tear of each aluminum axle member 32 by the aluminum surface of hole 25.

Figure 6:
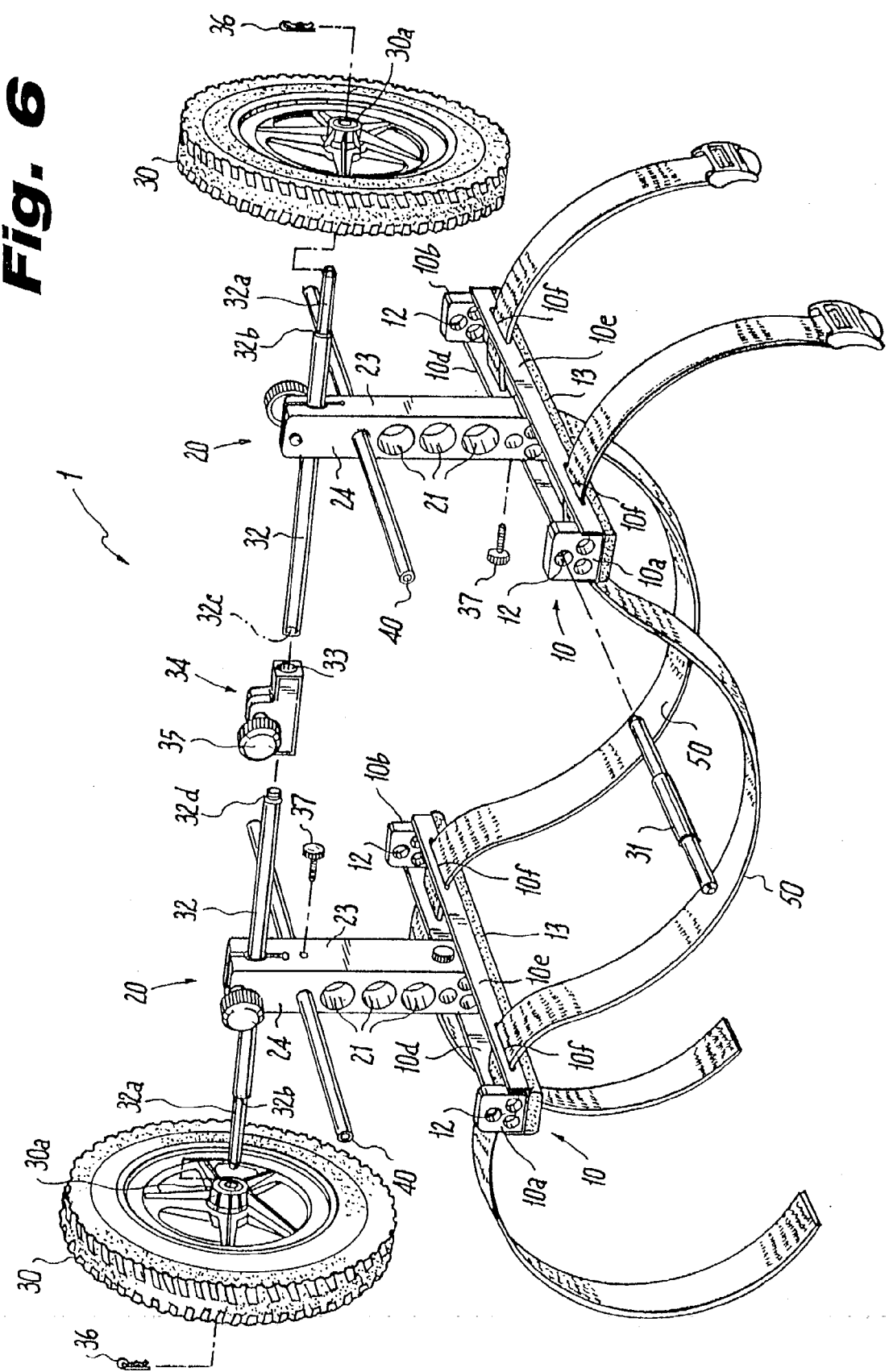
FIG. 6 is an exploded perspective view, inverted, of the components required to assemble the boat cart.

As also shown in FIGS. 3, 4 and 6, each wheel 30 is demountably attached at an end, respectively, to a pair of axle members 32, with axle members 32 extending inwardly from and demountably attached to lower portion 20a of said respective vertical struts 20, wherein axle members 32 are in a transverse relationship to horizontal load support members 10. Fasteners, 36, such as cotter pins, hold each wheel 30 upon each axle 32.

Each axle member 32 is received within each hole 25, of each lower portion 20a of each vertical strut 20. A compression groove 27 exists from the underside of vertical strut 20 to hole 25 and continues to further through hole 27a, providing for compression of lower portion 20a of vertical strut 20.

To accommodate narrow or wider cargo, such as watercraft of varying widths, the distance between vertical struts 20 can be varied along the axle length by loosening and tightening the tightening member 28 and moving vertical struts 20 laterally apart or towards each other along axle members 32.

Although optionally a one-piece axle may be used (not shown), preferably the pair of axle members 32 are held in opposite axial orientation by straight rigid axle connector 34. Axle connector 34 has tightening member 35, and a pair of receptacles 33 at the respective two ends of axle connector 34, so that axle members 32 respectively extend outwardly from, and are demountably attached within, said axle connector receptacle bore 33.

Figure 33:
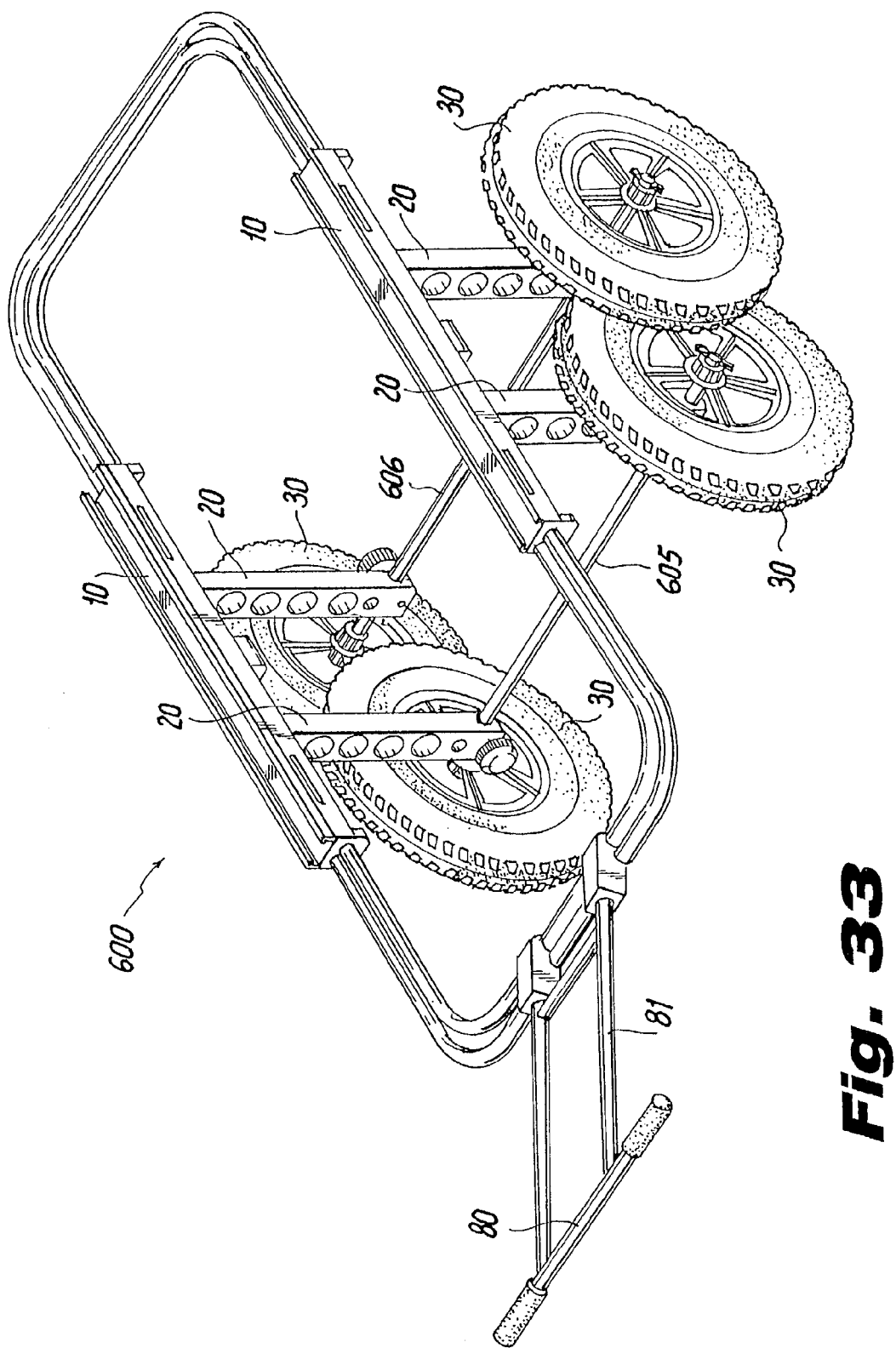
FIG. 33 is a perspective view of one embodiment for an assembled frame of a portable cart with four wheels.

While the axle may be optionally a one-piece axle, such as shown as reference numeral 606 in FIG. 33 herein, preferably the pair of connected oppositely extending axle members 32 form together an axle for wheels 30.

Each axle member 32 is made of solid round stock of anodized aluminum or stainless steel, approximately 0.75 inches in diameter. At the wheel-supporting end 32a, the diameter is about 0.59 inches in diameter with shoulders 32b of about 0.08 inches in height, transverse to the axis of axle member 32. These shoulders 32b provide a resting surface to prevent axial movement of wheel 30 upon axle member 32.

Figure 7:
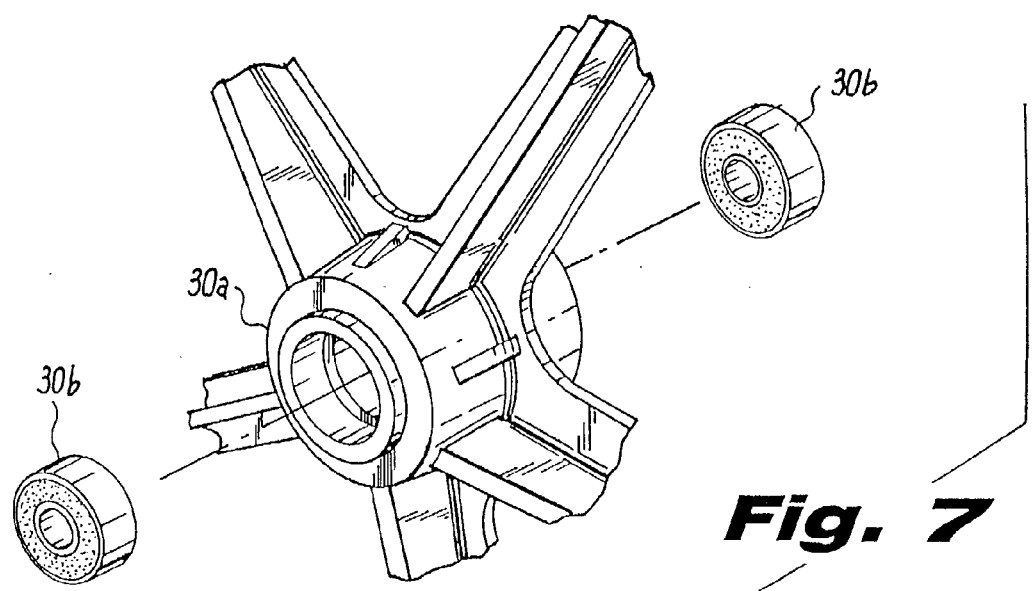
FIG. 7 is an exploded perspective of a typical wheel, showing two press fit bearings adjacent an integrally molded hub.
Figure 8:
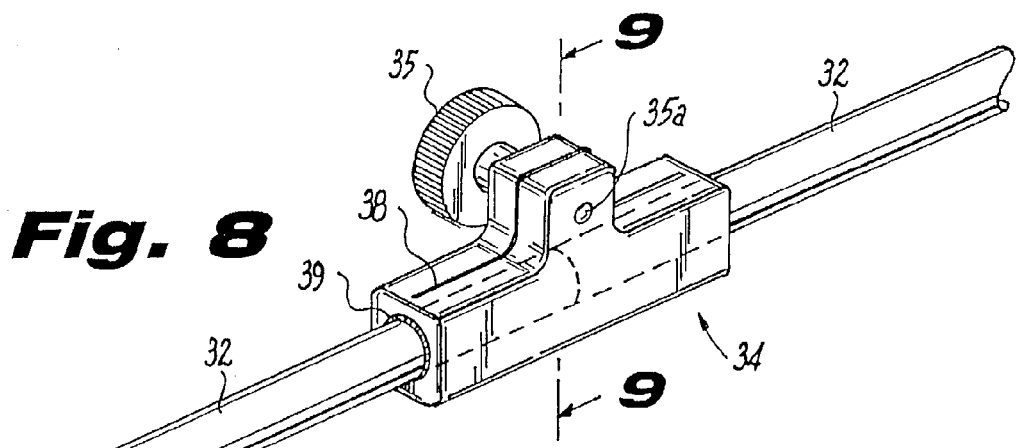
FIG. 8 is a perspective view of an axle-locking member, installed on the assembled axle.

As shown in FIG. 7, each wheel 30 rotates about press fit bearings 32b, while each wheel 30 is positioned upon each respective axle member 32 of FIG. 8. As shown in FIG. 6, at the opposite end of one axle member 32, there is provided a hollow, threaded recess 32c of about 0.75 inches deep, to accommodate a connecting threaded member 32d of other axle member 32, to axially connect both axle members 32 together within axle connector 34, with a wheel 30 at each end.

Figure 9:
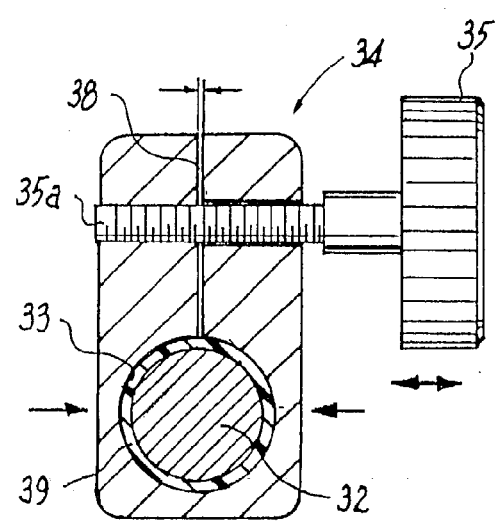
FIG. 9 is a sectional elevation view, taken through lines 9—9 of FIG. 8, showing the locking member compressing and locking the axle joint.

FIGS. 8 and 9 show how axle connector 34 is compensated along groove 38, thereby locking axle members 32 within bushing 39, which is within receptacle bore 33 of axle connector 34, by tightening of tightening bolt 35a of tightening member 35. Preferably bushing 39 is a PVC (polyvinyl chloride) bushing. Groove 38 is preferably ¹⁄₁₆ to ⅛ inch, in width, which allows for the compression of axle connector 34 around axle members 32. Tightening bolt 35a is inserted within a conventional receptacle which is a through hole at the proximal end and which is tapped with threaded grooves at the distal end, to allow for compression of axle connector 34.

FIGS. 4 and 6 also show at least one kickstand 40, preferably a pair, respectively extending horizontally rearward from each lower portion of vertical struts 20. Each kickstand member 40 extends rearwardly from the at least one kickstand receptacle aperture 22 of respective vertical struts 20 and each kickstand 40 is demountably attached within each respective kickstand receptacle aperture 22.

Each kickstand member 40 is preferably contoured so as to contact the ground to stabilize portable cart 1 is a parked position of rest.

Figure 5:
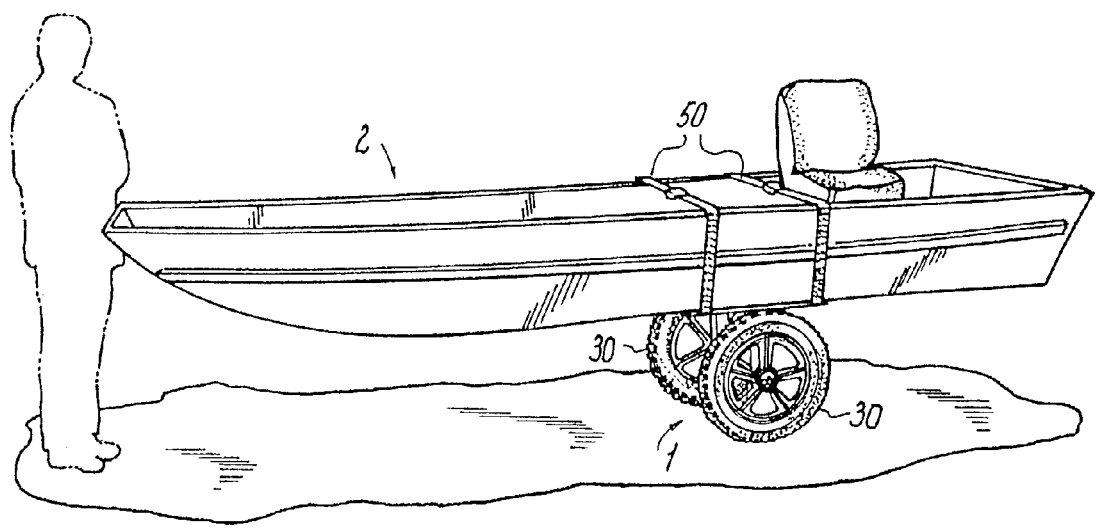
FIG. 5 is a perspective view of the assembled cart with a boat fastened for transport.

As shown in FIG. 5, to hold a canoe, game or cargo in place upon cart 1, one or more adjustable load-securing straps 50 are slidably attached to both respective horizontal load supports 10 in a transverse relationship to load supports 10. Straps 50 are preferably reinforced flexible canvas straps of about 2 inches in width.

To complete portable cart 1 as a canoe or boat cart, FIG. 4 shows support cushions 13 mounted upon respective horizontal load supports 10. Support cushions 13 are flexible, such as of rubber or foam, to support the weight of boat 2 thereon.

Figure 10:
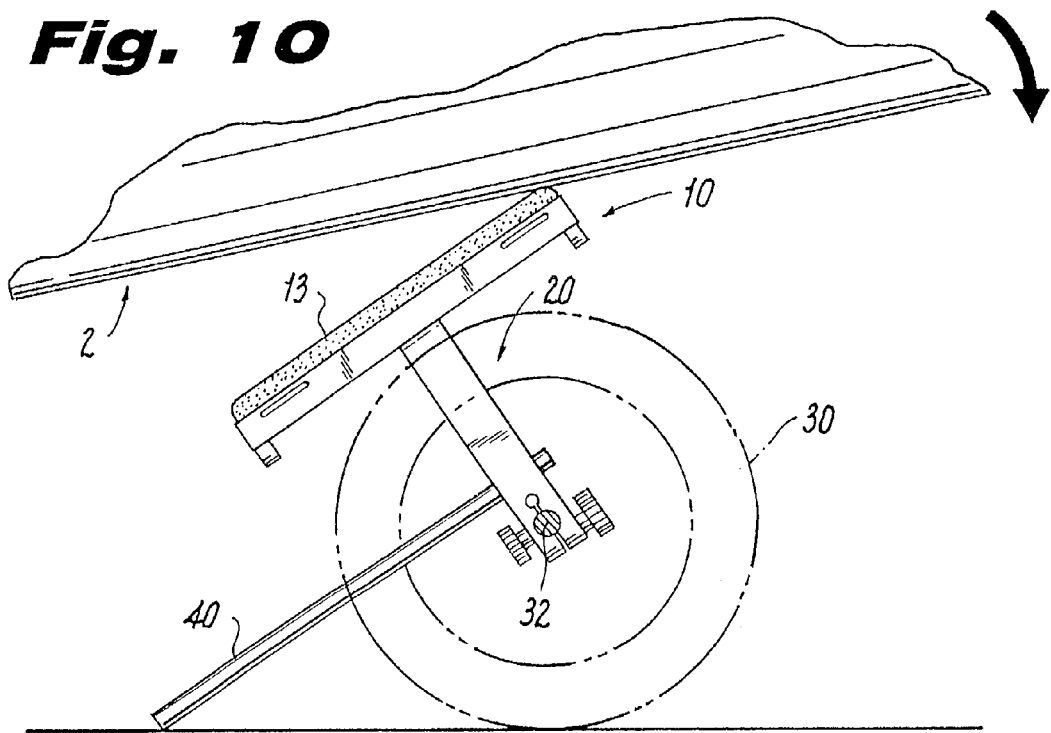
FIG. 10 is a diagrammatic side elevation view of the boat cart in its resting position, with a boat hull contacting the raised edge.
Figure 11:
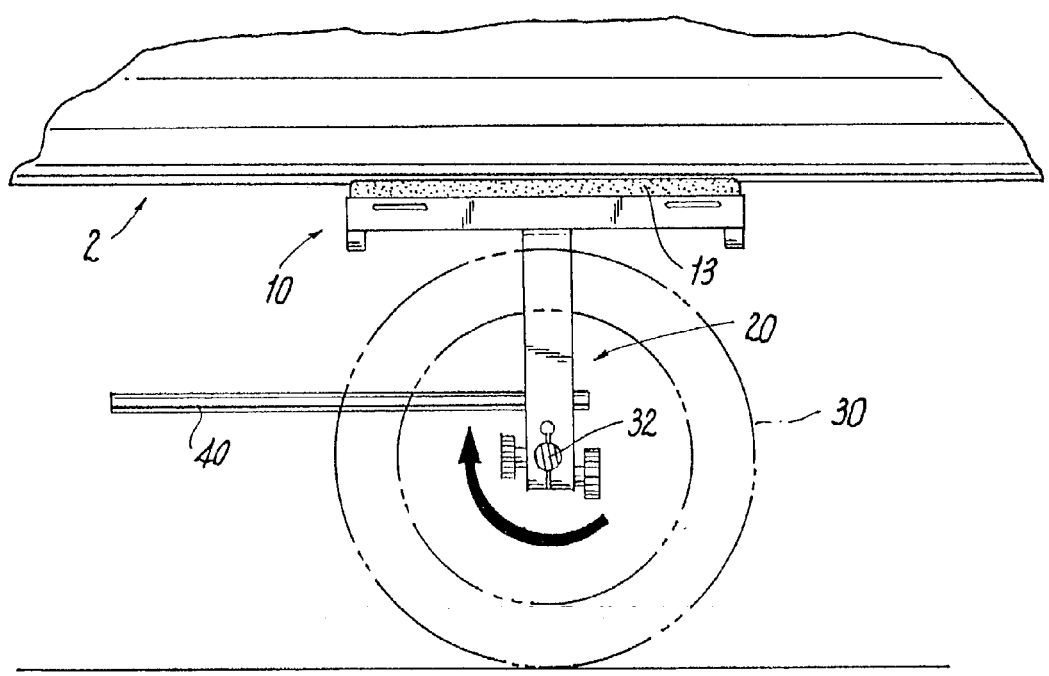
FIG. 11 is a diagrammatic side elevation view of the boat cart with the boat hull positioned and fully installed, illustrating the precision balancing feature of the cart.

FIGS. 10 and 11 show the precision balancing of boat 2 upon cart 1, wherein the placement of boat 2 upon cart 1 causes cart 1 to rotate from a position of rest in FIG. 10 to a horizontal load position of FIG. 11, in the direction of the arrow.

Figure 18:
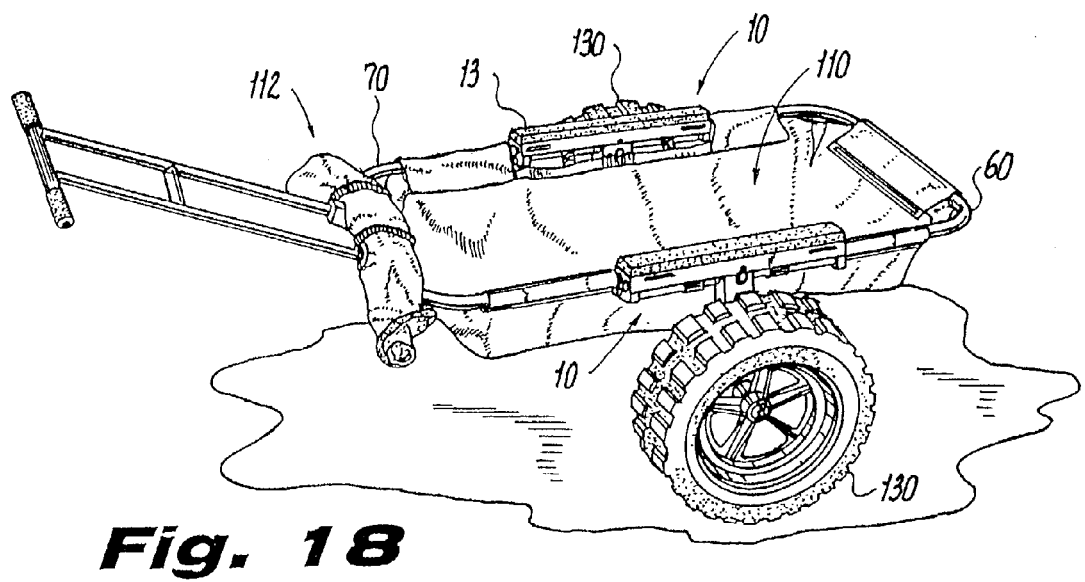
FIG. 18 is a perspective view of a further embodiment, a cart for transporting cargo, equipped with optional wide tires and axle for use on sand or granular terrain.
Figure 19:
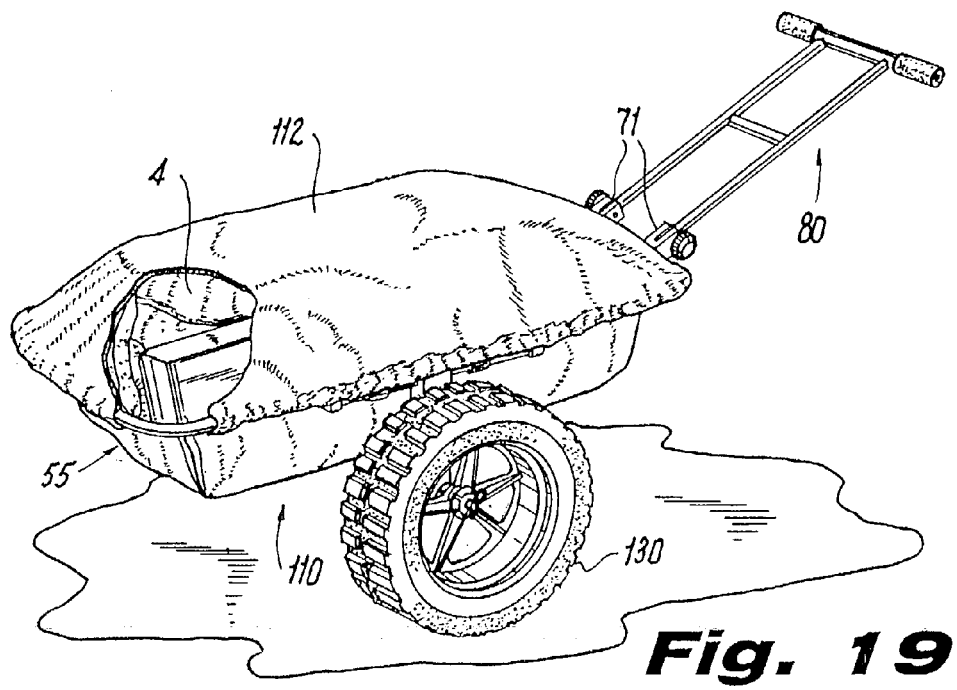
FIG. 19 is a perspective view of a fully loaded cargo cart, with the cover material partially cutaway to reveal its contents.
Figure 20:
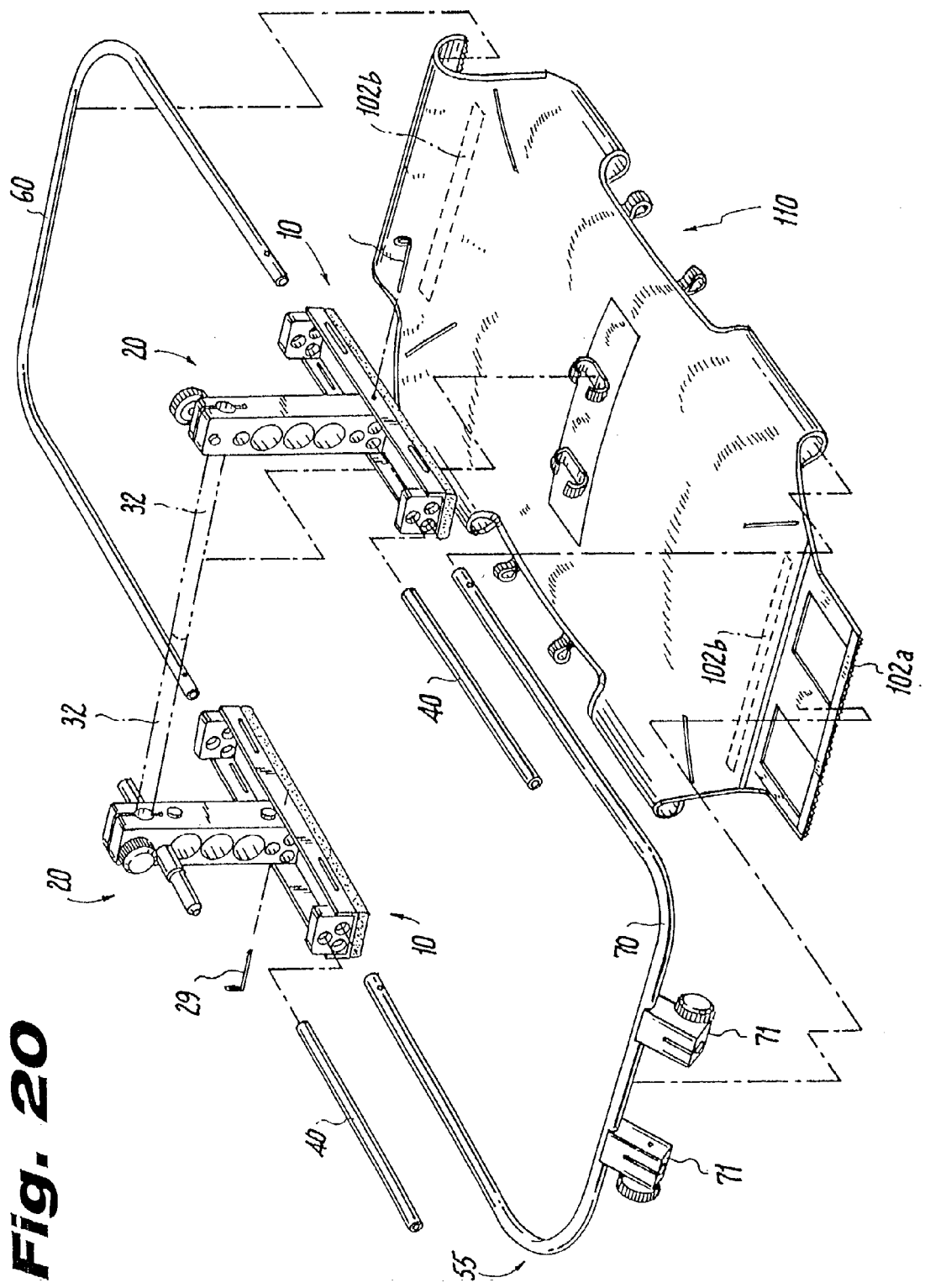
FIG. 20 is an exploded perspective view, inverted, of the cargo cart, illustrating the attachment of the canvas material to the framework components.
Figure 21:
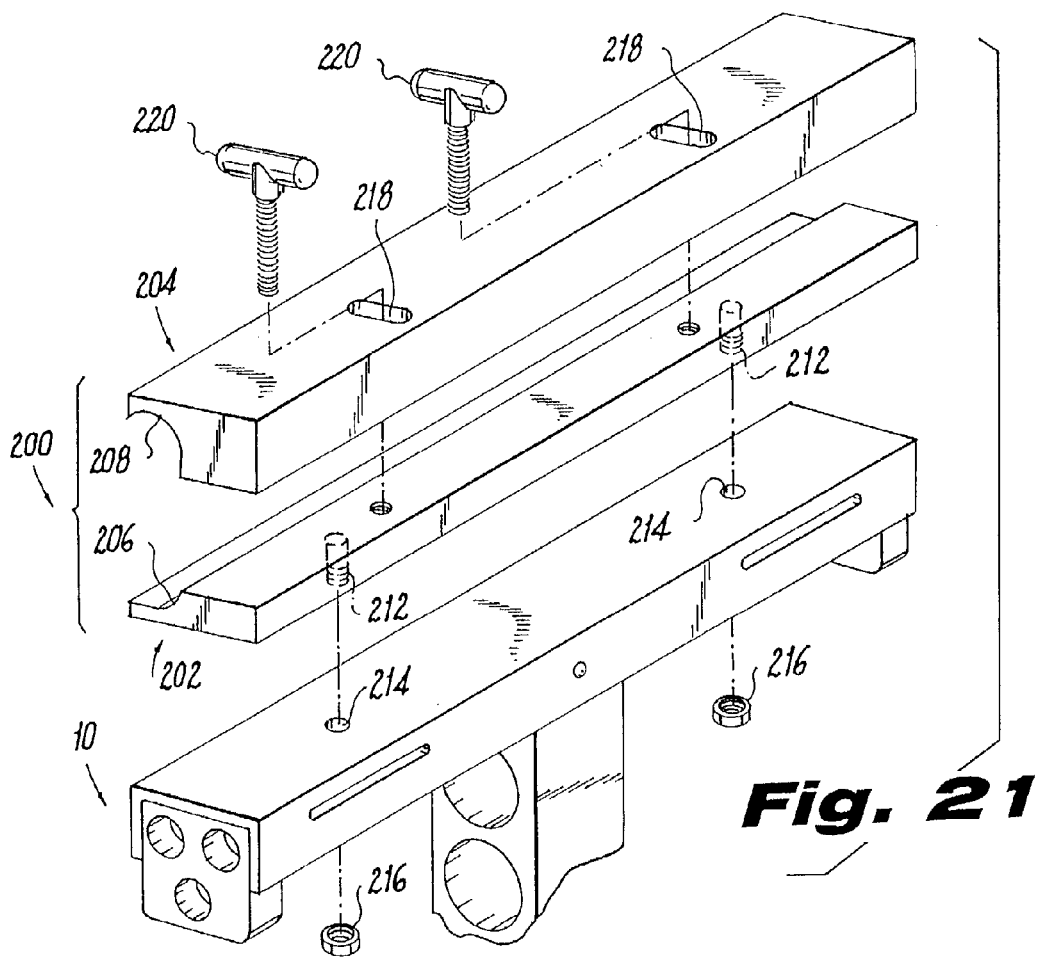
FIG. 21 is another exploded perspective detail view of the components for a stretcher-hauling clamp of an alternate embodiment for a search and rescue cart.
Figure 22:
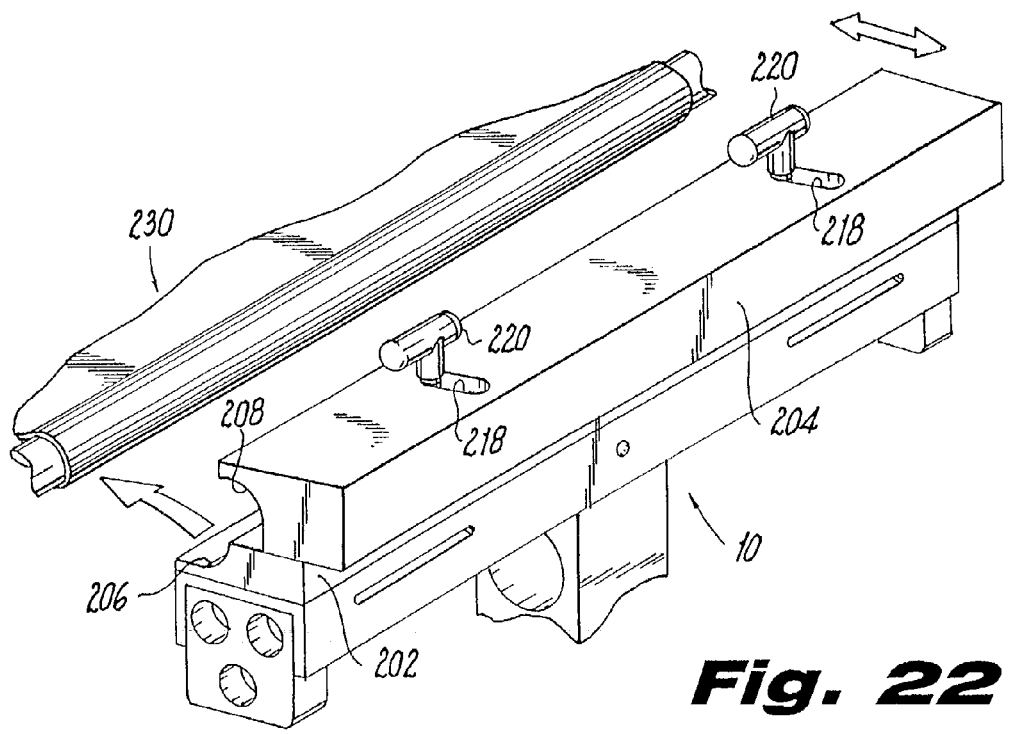
FIG. 22 is a perspective view of the clamp embodiment shown in FIG. 21, showing the sliding action of the clamp therein, for quick removal of the stretcher therefrom.

FIGS. 12–17 show another embodiment that converts portable cart 1 into a game cart. Alternatively, FIGS. 18–20 show how to convert cart 1 into a cargo wagon with a hollow well. First, in either situation, carry frame 55 is secured to horizontal load supports 10. Although a one piece, generally rectangular frame (not shown) may be used, preferably frame 55 includes a pair of U-shaped brackets 60, 70 joinable together to form frame 55.

Various fasteners may be provided to horizontal load supports 10 to carry objects, such as carriers, thereon.

Alternatively, for example, a clamp maybe provided to horizontal load supports 10 to carry a frame of a discrete transportable carrier directly thereon, as disclosed hereinafter with respect to FIGS. 21–24. In that case, instead of the frame being integrally part of the portable chart, as in FIGS. 12–17, in FIGS. 21–24, the frame is clamped to the horizontal load supports 10 of portable cart 1. Other fasteners may include longitudinally extending channel slots, such as in FIGS. 33–39 described further below.

Meanwhile, further with respect to FIGS. 12–17, U-shaped front bracket 60 extends horizontally forward from front-end receptacle apertures 12 of horizontal load supports 10, wherein front bracket 60 is demountably attached within front-end receptacle apertures 12 at one end of horizontal load supports 10.

U-shaped rear bracket 70 extends horizontally rearward from oppositely positioned rear end receptacle apertures 12 of horizontal load supports 10 and rear bracket 70 is demountably attached within each oppositely positioned rear end receptacle aperture 12 of horizontal load supports 10.

Figure 13:
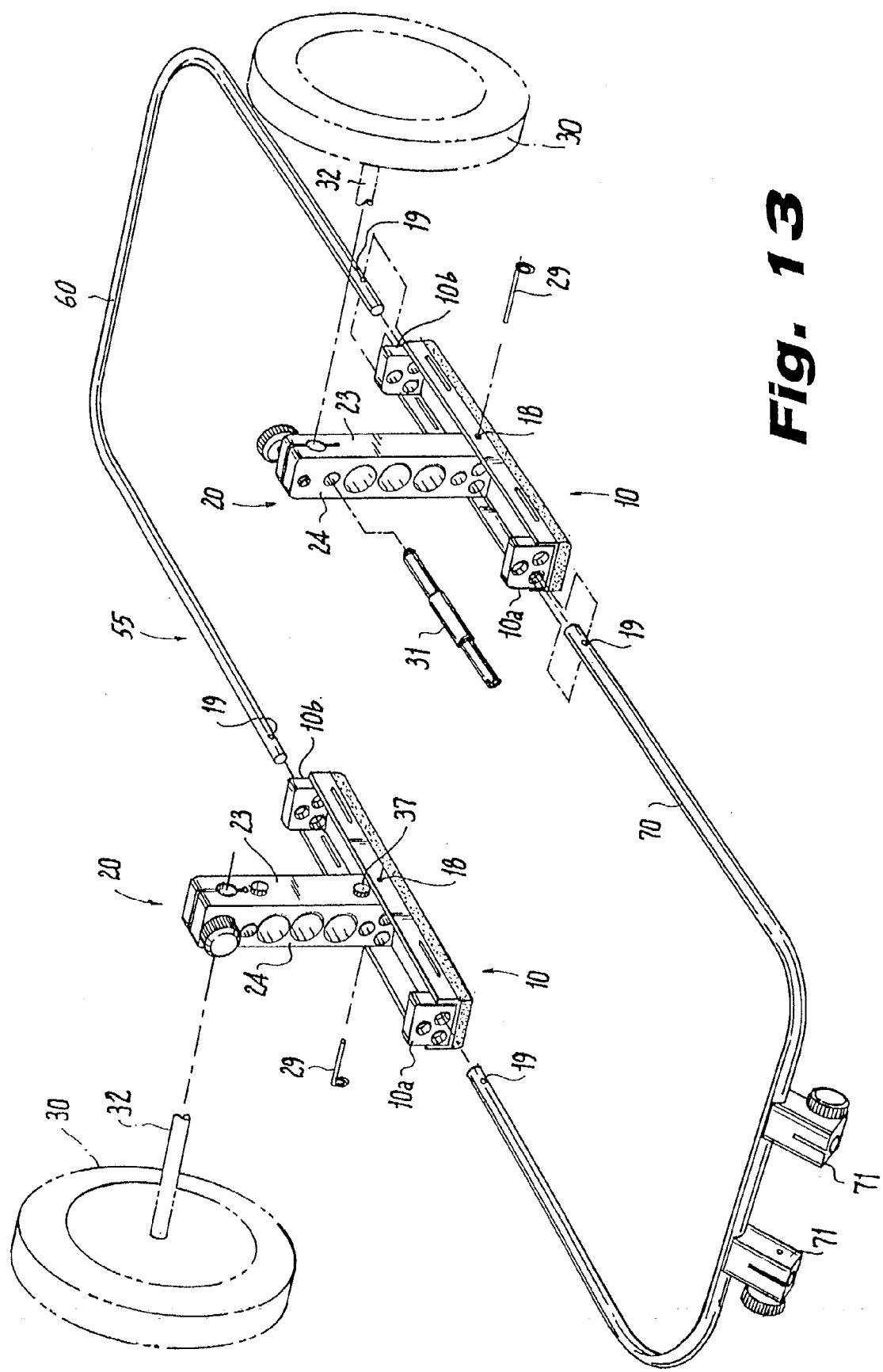
FIG. 13 is an exploded perspective view of the inverted gaming cart, illustrating the framework fastening method.

FIG. 13 shows how frame 55 is secured to cart 1. Each distal end of U-shaped front bracket 60 is inserted through apertures in respective ends 10b of horizontal supports 10 until each distal end engages a corresponding hole in each vertical support 20, where they are held in place by pins 29. Pins 29 engage lateral holes 18 in horizontal supports 10 and corresponding through holes 19 in distal ends of U shaped brackets 60. Likewise, each distal end of U-shaped rear bracket 70 is inserted through apertures in respective ends 10a of horizontal supports 10 until each distal end engages a corresponding hole in each vertical support 20, where it is also held in place by a pin 29. Pins 29 engage lateral holes 18 in horizontal supports 10 and corresponding through holes 19 in distal ends of U shaped brackets 60, 70 of frame 55.

U-shaped brackets 60, 70 are preferably of hollow, anodized aluminum tubing of about 0.75 inches in diameter. The length of each distally extending side member thereof is about 23.50 inches and the width of the cross bar connecting the distal side members is about 21.63 inches. About 0.75 inches from each distal end is a scoring, to accommodate a clamp thereon, to form frame 55.

Figure 12:
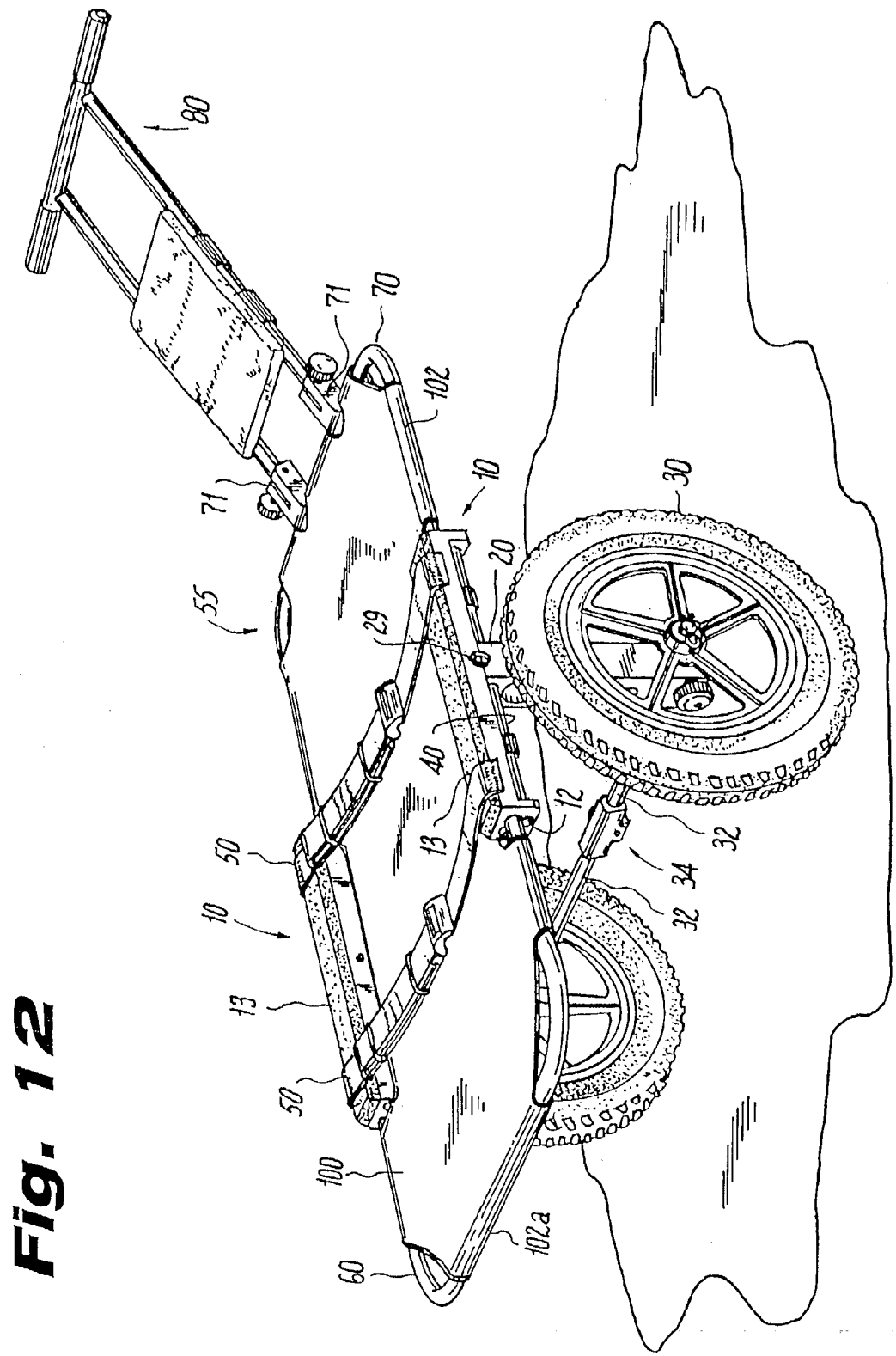
FIG. 12 is a perspective view of the assembled alternate embodiment cart, for hunting/gaming applications.
Figure 15:
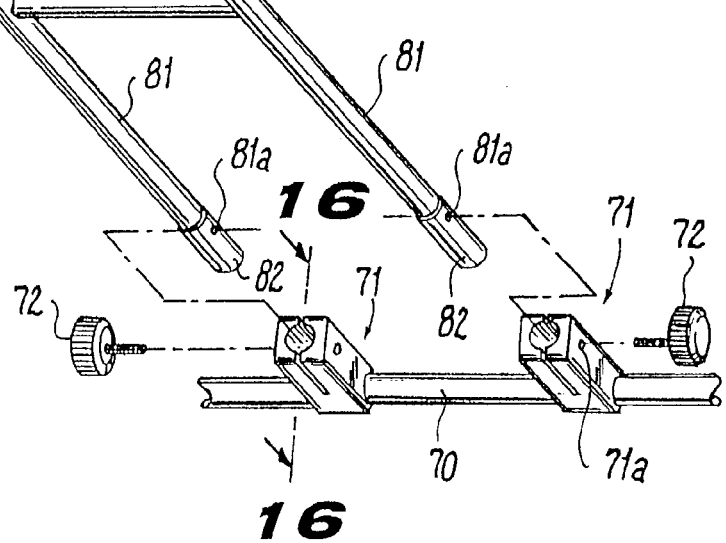
FIG. 15 is an exploded perspective view of the attachment of the handlebar component to the locking receptacles on the framework.
Figure 16:
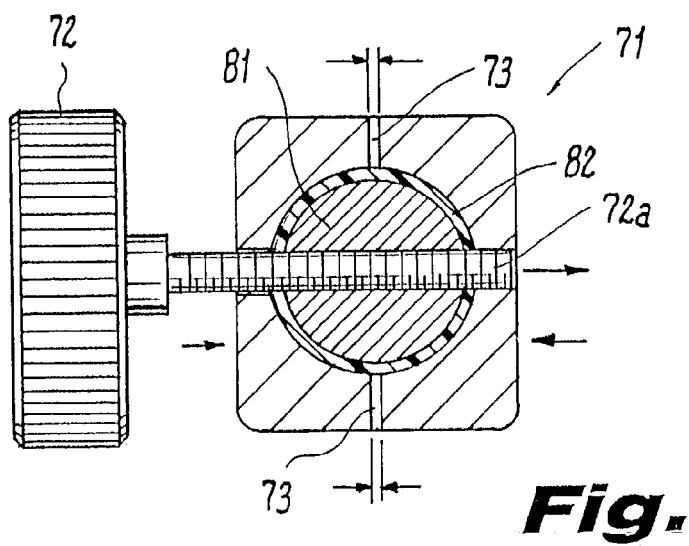
FIG. 16 is a sectional elevation view, taken through lines 16—16 of FIG. 15, showing the locking receptacles acting on the installed leg of the handlebar.

As shown in FIGS. 12 and 15 for pulling or pushing game or cargo upon portable cart 1, handle 80 extends rearwardly at an upward angle from joints 71 of either U-shaped rear bracket 70 for pushing portable cart 1, or from front U-shaped bracket 60 for pulling portable cart 1 (not shown). Furthermore, handle 80 may be permanently attached to either U-shaped bracket 60 or 70, or handle 80 may be removable and demountably attached to either front U-shaped bracket 60 or rear U-shaped bracket 70.

Handle 80 has preferably two aluminum tubing connecting members about 22.5 inches in length, connected by a hand accommodating transverse bar of solid aluminum, and is 17.5 inches in width. Handle 80 includes connectors 81, having distal sleeves, such as PVC (polyvinyl chloride) sleeves 82, permanently affixed thereto, which are insertable within joints 71 by locking member 72, having threaded member 72a which passes through bore 71a of joint 71 and bore 81a of handle 80. Compression groove 73 exists in joint 71, providing compression of joint 71.

Handle 80 may optionally have an auxiliary extension member and clamp (not shown), so that it can be attached to the rear frame of a bicycle (not shown), to pull portable cart 1.

Figure 14:
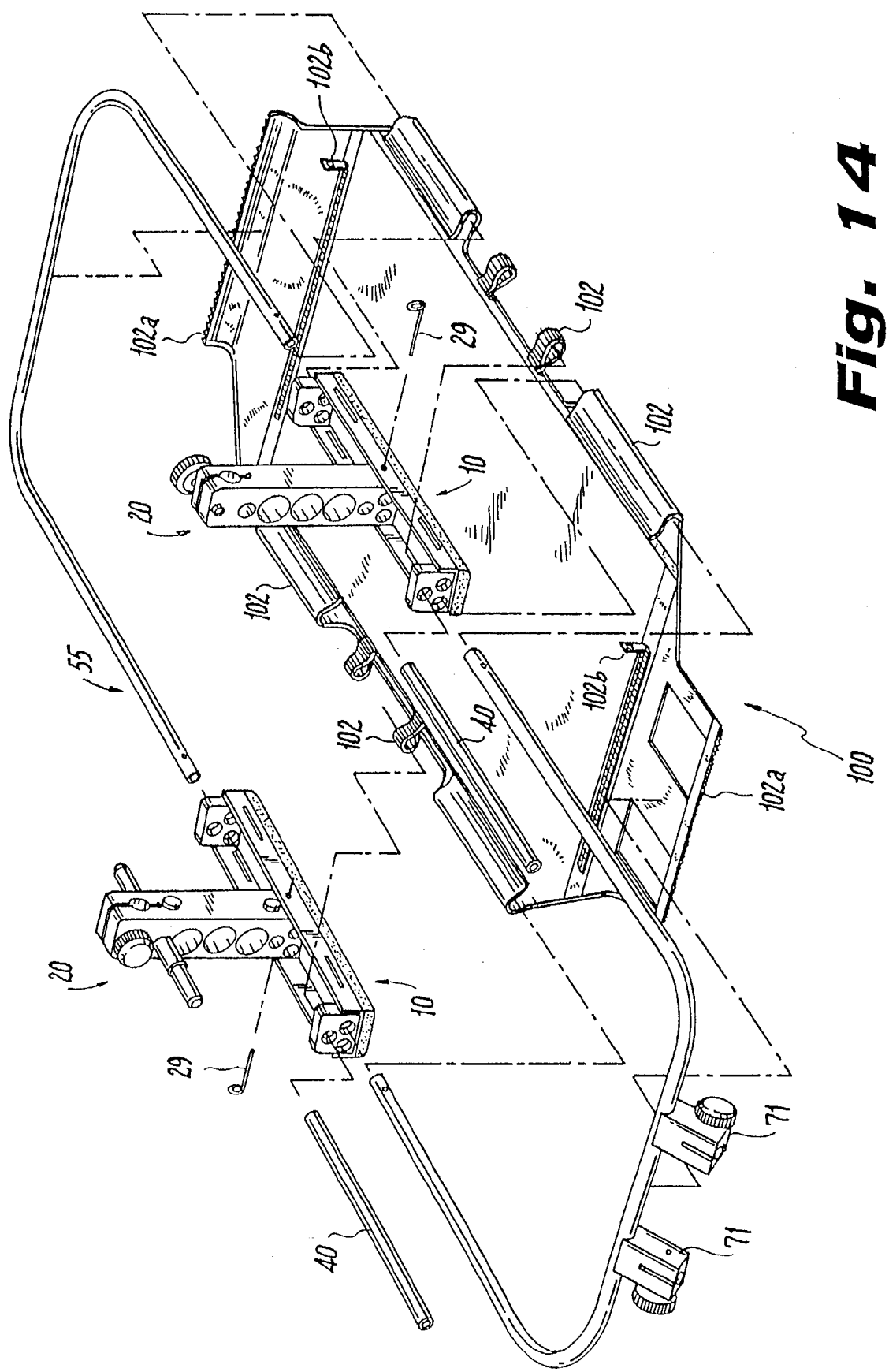
FIG. 14 is an exploded perspective view, inverted, of the gaming cart, illustrating the attachment of the stretcher canvas material to the framework components.
Figure 17:
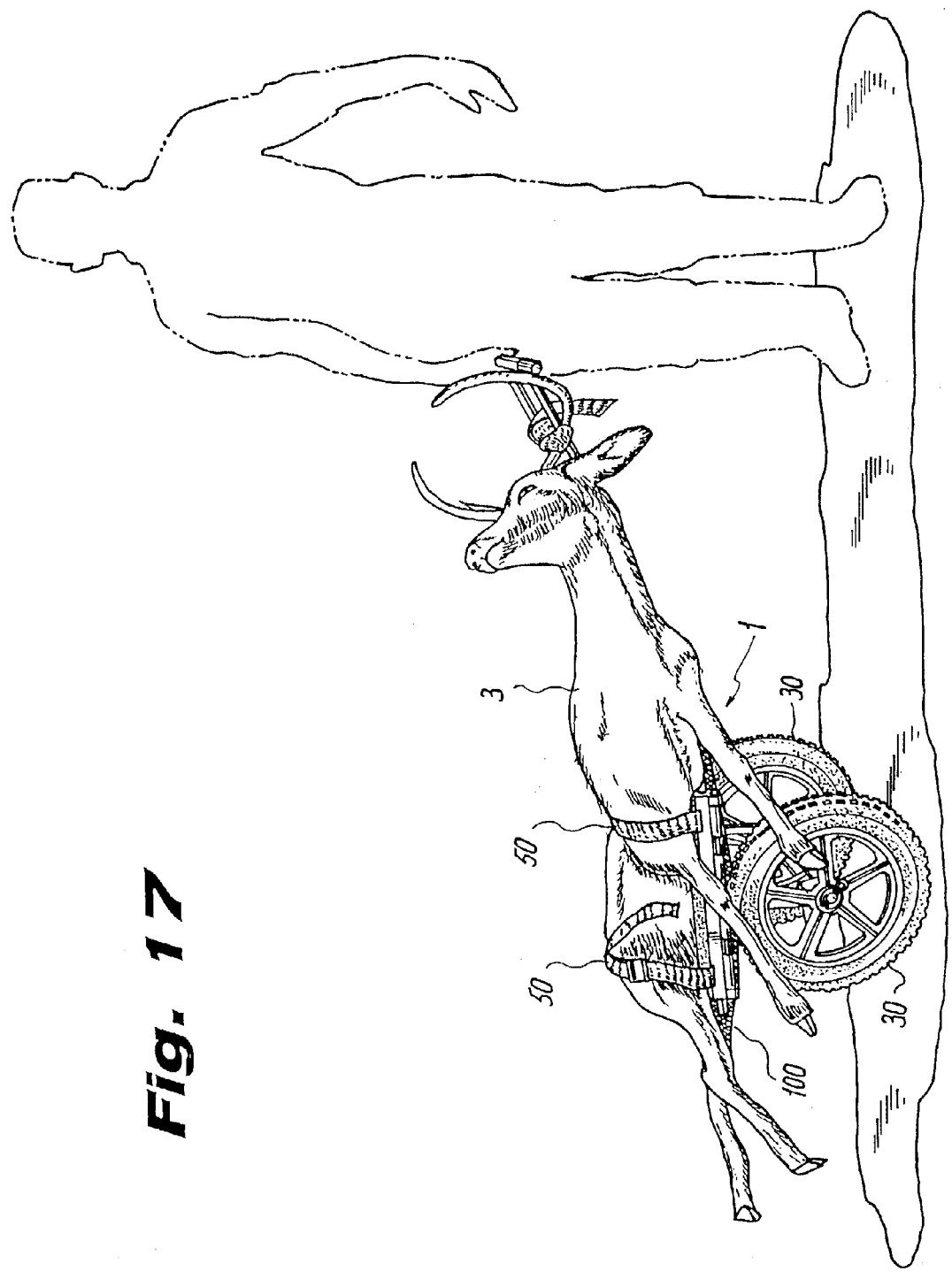
FIG. 17 is a perspective view of the gaming cart, with a deer fastened for transport.

To carry game 3, as shown in FIG. 17, or to carry an injured person in a rescue operation, FIG. 12 shows portable cart 1 having fabric stretcher 100 stretched tautly between horizontal load members 10 and preferably mounted over and around front and rear U-shaped brackets 60 and 70 of frame 55, by threading brackets 60, 70 through fasteners such as sewn-in loops 102 of fabric stretcher 100, which may alternatively be made of plastic or other taut load bearing material. Other types of fasteners can be used. For example, FIG. 14 shows that loop 102a is openable, and closed by fastener, such as zipper fastener 102b.

As also shown in FIG. 12, handle 80 may include a pair of posts extending obliquely off of a horizontal axis of portable cart 1, wherein a head rest cushion 85 extends between the posts to support the head and neck of an injured person being transported upon stretcher 100.

FIGS. 18–20 show that to carry cargo, hollow fabric cargo well 110 is attached in the same manner to frame 55. Hollow cargo well 110 may also alternatively be made of plastic or other taut load bearing material, and covered by cover 112. FIGS. 18 and 19 also show wider wheels 130 for use on sand or granular terrain.

Assembly and Disassembly

The various embodiments of the multiple-purpose portable cart can be quickly and easily assembled and disassembled. For example, for making a canoe cart from the disassembled portable cart 1, wheel-retaining members, such as cotter pins 36, are taken out of axle members 32 in their stored position, and wheels 30 come out. Axle members 32 are then removed from between vertical struts 20. The axle members 32 are then clamped in a horizontal use position into receptacles 33 of rigid axle connector 34. Axle members are inserted between vertical struts 20 and locked in place. Wheels 30 are placed upon axle members 32 and secured by cotter pins 36. Kickstand 40 is loosened from its rest position and placed in place in receptacles within vertical struts 20. Canoe supporting cushions 13 are installed upon horizontal load supports 10 to support a canoe or boat thereupon. Straps 50 hold the canoe or boat installed upon cushions 13 in a secure transportable position.

To convert portable cart 1 into a game cart as in FIG. 17 or a rescue cart as in FIG. 12, kickstands 40 are removed and fabric stretcher 100 is installed on U-shaped frame members 60, 70 of frame 55 frames by fasteners such as sewn loops 102 thereof. U-shaped frame members 60, 70 are placed on horizontal load supports 10, and kickstand members 40 are installed as braces for fabric stretcher 100. Straps 50 are then installed to securely hold game or an injured party upon stretcher 100. Then handle 80 is installed upon U-shaped bracket 60 or 70 of frame 55 to pull or push portable cart 1.

To convert portable cart 1 into a wagon to haul cargo, as in FIGS. 18 and 19, fabric stretcher 100 is removed and hollow well 110 is installed over U-shaped members 60, 70 of frame 55.

To make the portable chart 1 portable again, the components are disassembled in reverse into bag 120. Strap or straps 50 are used as a carry handle or for backpack shoulder loops.

Figure 23:
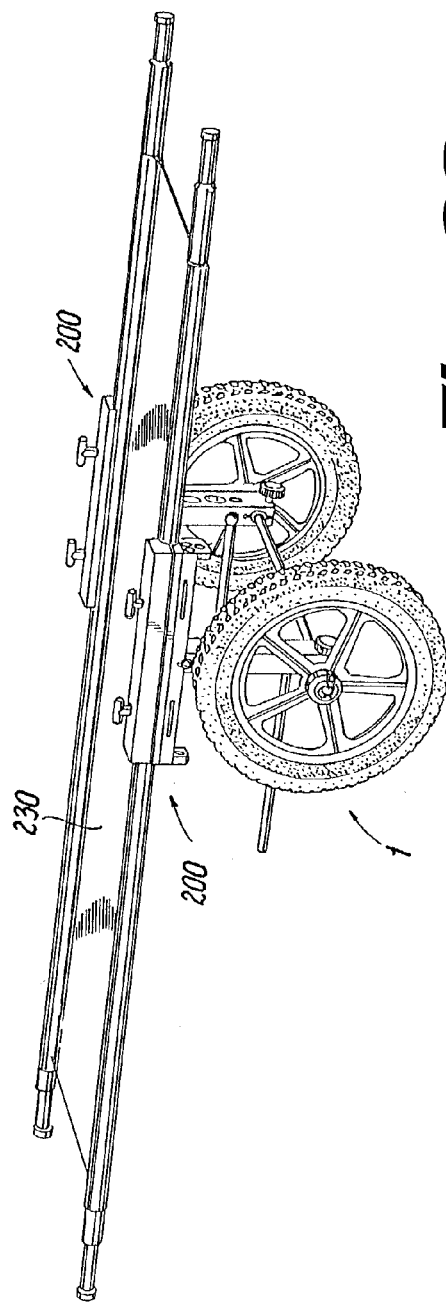
FIG. 23 is a perspective view of the portable cart of the present invention, showing the clamp as in FIGS. 21 and 22 carrying a rescue stretcher.

While the rescue stretcher shown in FIG. 12 has its own customized stretcher 100, in another embodiment shown in FIGS. 21–24, to convert portable cart 1 to a retrofit disabled person-bearing transportable carrier cart for search and rescue operations, using conventional railed stretcher 230, support cushions 13 are removable from horizontal load supports 10 and replaced by clamping assembly 200. Clamping assembly 200 includes lower jaw 202, and upper jaw 204. While different jaw configurations can be used, the embodiment shown in FIGS. 21–24 shows each having longitudinally extending recesses 206 and 208 therein to grip perimeter frame rails of a load supporting transportable carrier, such as conventional railed stretcher 230 therebetween, as shown in FIG. 23.

Lower jaw 202 of clamping assembly 200 includes an engaging surface 210 with threaded studs 212 which are inserted into through-holes 214 of load supports 10, and permanently locked with nuts 216. Upper jaw 204 is provided with a pair of oblong through-slots, 218, to allow upper jaw 204 to slide on upper surface of lower jaw 202, when threaded T-handles 220 are loosened. As shown by the arrows in FIG. 22 this sliding action allows for quick removal of any stretcher frame rail secured between jaw assembly 200.

Figure 24:
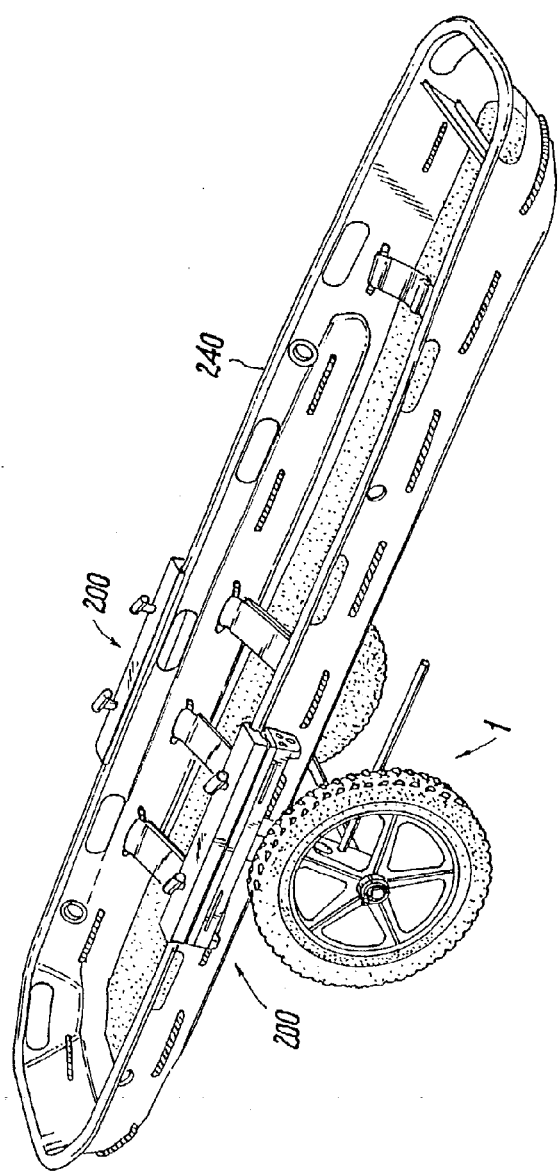
FIG. 24 is a perspective view of the portable cart carrying a Stokes-type personal rescue carrier.

FIGS. 23 and 24 are perspective views of a typical stretcher 230, and a Stokes-type rescue basket 240, securely clamped to portable cart 1 utilizing the previously described clamping assembly 200.

Figure 25:
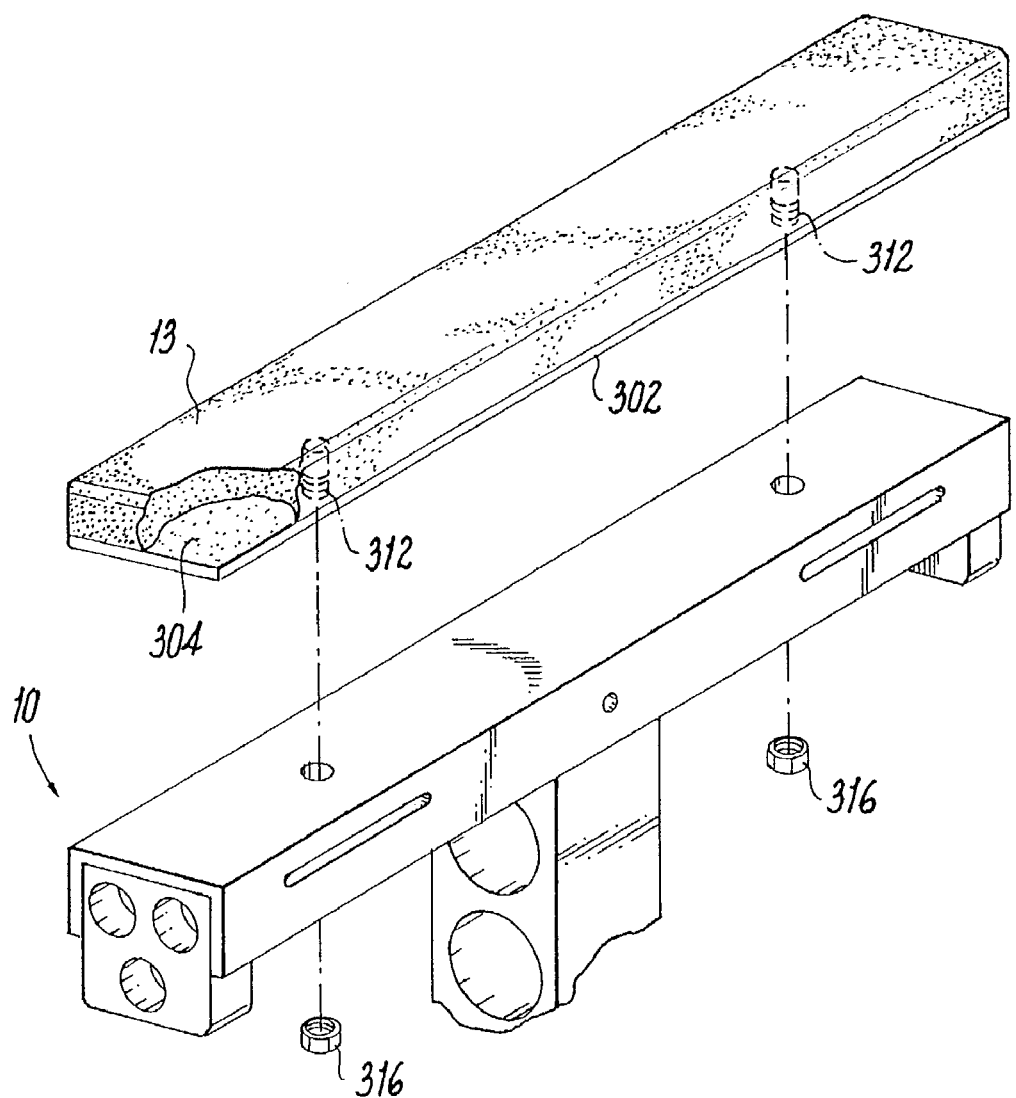
FIG. 25 is an exploded view of components of a further alternate embodiment for a support for removal of a boat support cushion therefrom.

As shown in FIG. 25 in this embodiment, instead of being permanently attached to each horizontal load support 10, removable support cushion 13 is permanently attached to removable plate 302 with an adhesive 304. This cushion assembly is removably attachable by nuts 316 and threaded studs 312, to each horizontal load support 10.

Figure 26:
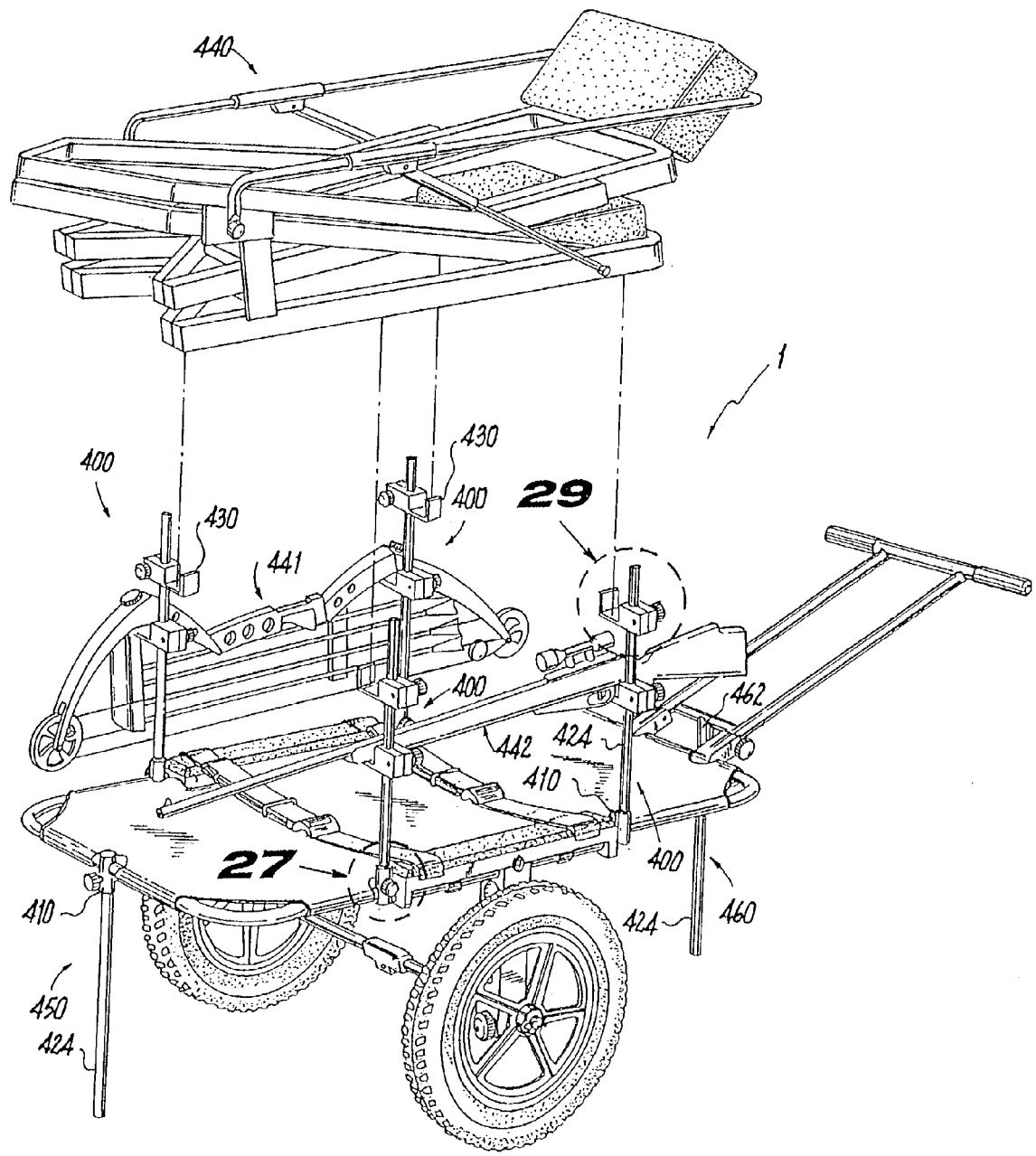
FIG. 26 is a perspective view of an alternate embodiment for a hunting cart with an accessory racking system for transport of hunting gear, such as a tree stand chair, archery implements and firearms thereon.

FIG. 26 illustrates portable cart 1, outfitted with a plurality of racking assemblies 400, each comprising a rail clamp 410, an upstanding post 424, and a hanger clamp 430. Rack assembly 400, when used in conjunction with additional rack assemblies 400, allows for transportation and quick removal of essential hunting gear such as a chair stand 440, archery equipment 441, and rifle 442. Other related items such as knapsacks and bedrolls may be supported by rack assembly 400, as well. Rack assembly 400 is easily disassembled from cart 1 upon reaching a chosen destination, and the components are conveniently transported within cart 1's storage backpack, such as carry bag 120 shown in FIG. 1.

Also illustrated in FIG. 26 are stabilizing assemblies 450 and 460. Assembly 450 makes use of post 420, which is friction-fit into an inverted rail clamp 410. Assembly 460 comprises an inverted tubular sleeve 462, optionally permanently welded to the handle assembly crosspiece. Sleeve 462 accepts kickstand post 424 in a similar fashion to rail clamp 410. These assemblies 450 460 serve to brace the cart 1 when it is parked.

Figure 32:
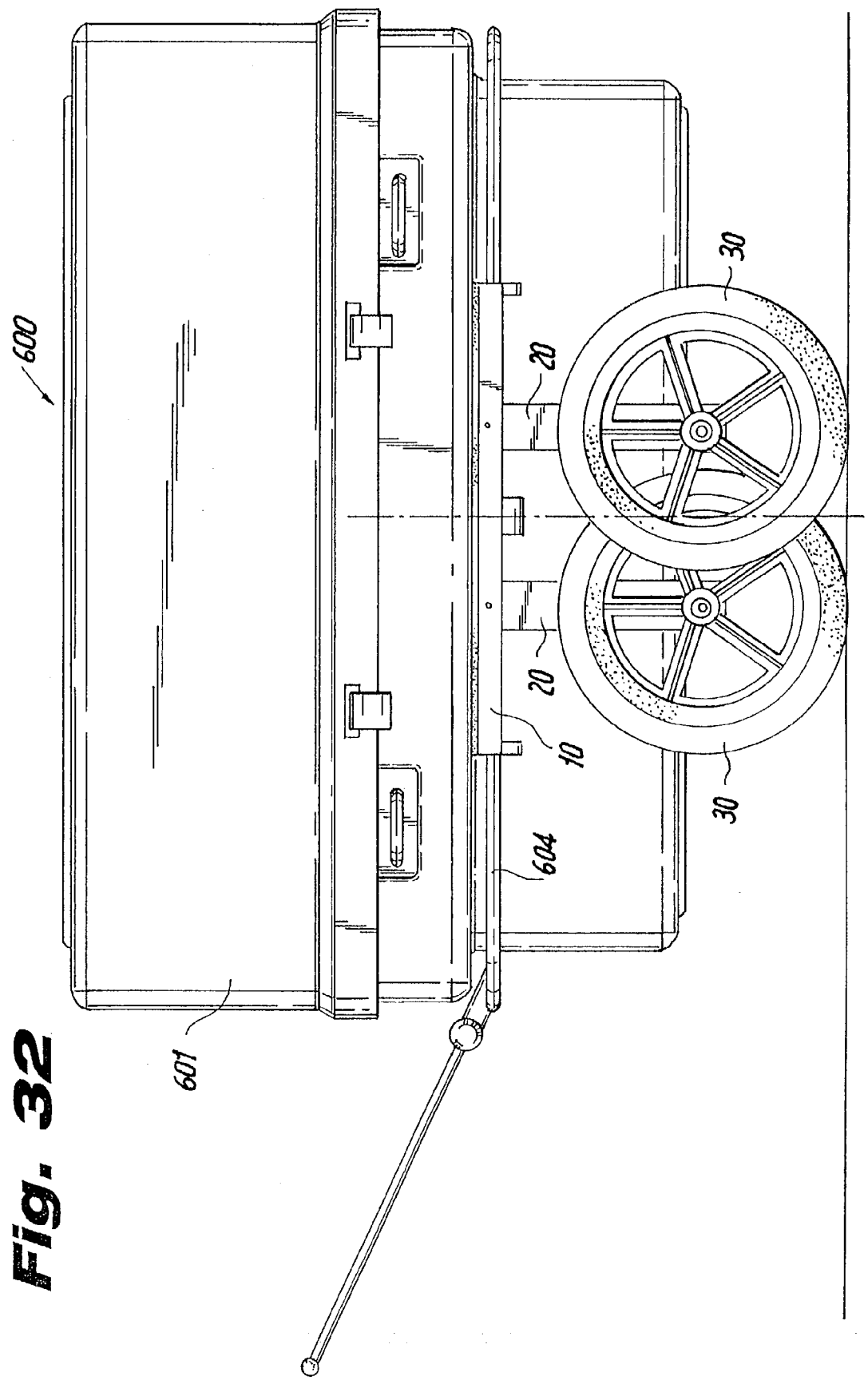
FIG. 32 is a side elevational view of an alternate embodiment of the portable cart of this invention with four wheels, shown with a covered cargo-hauling bin.
Figure 32E:
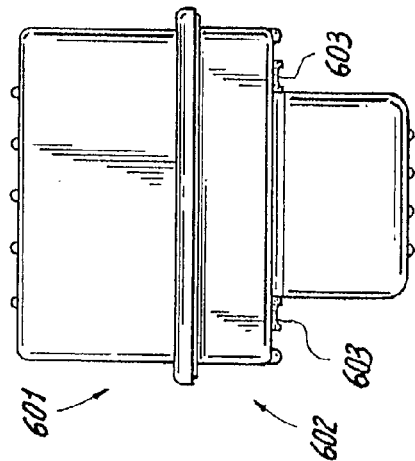
FIG. 32E is a front elevational view of the cover and bin as in FIG. 32.
Figure 32F:
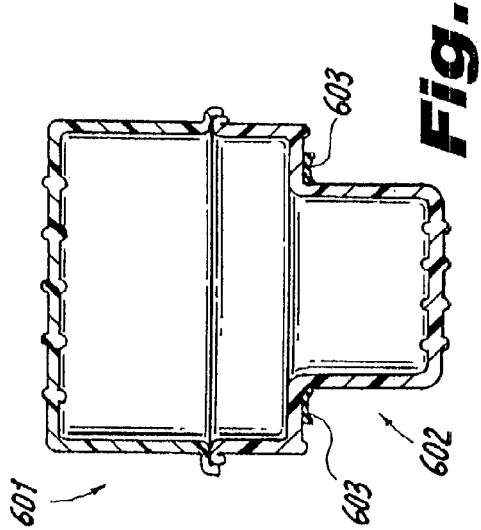
FIG. 32F is a front cross-sectional view thereof, taken along lines "32F—32F" of FIG. 32D.
Figure 32D:
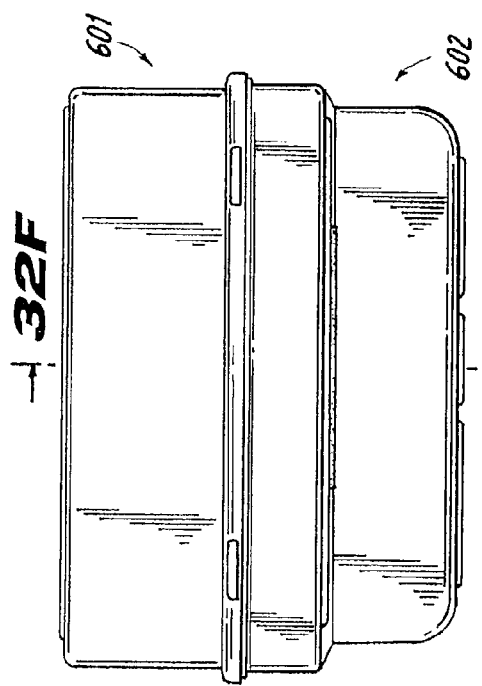
FIG. 32D is a side elevational view of the cover and bin as in FIG. 32.
Figure 32G:
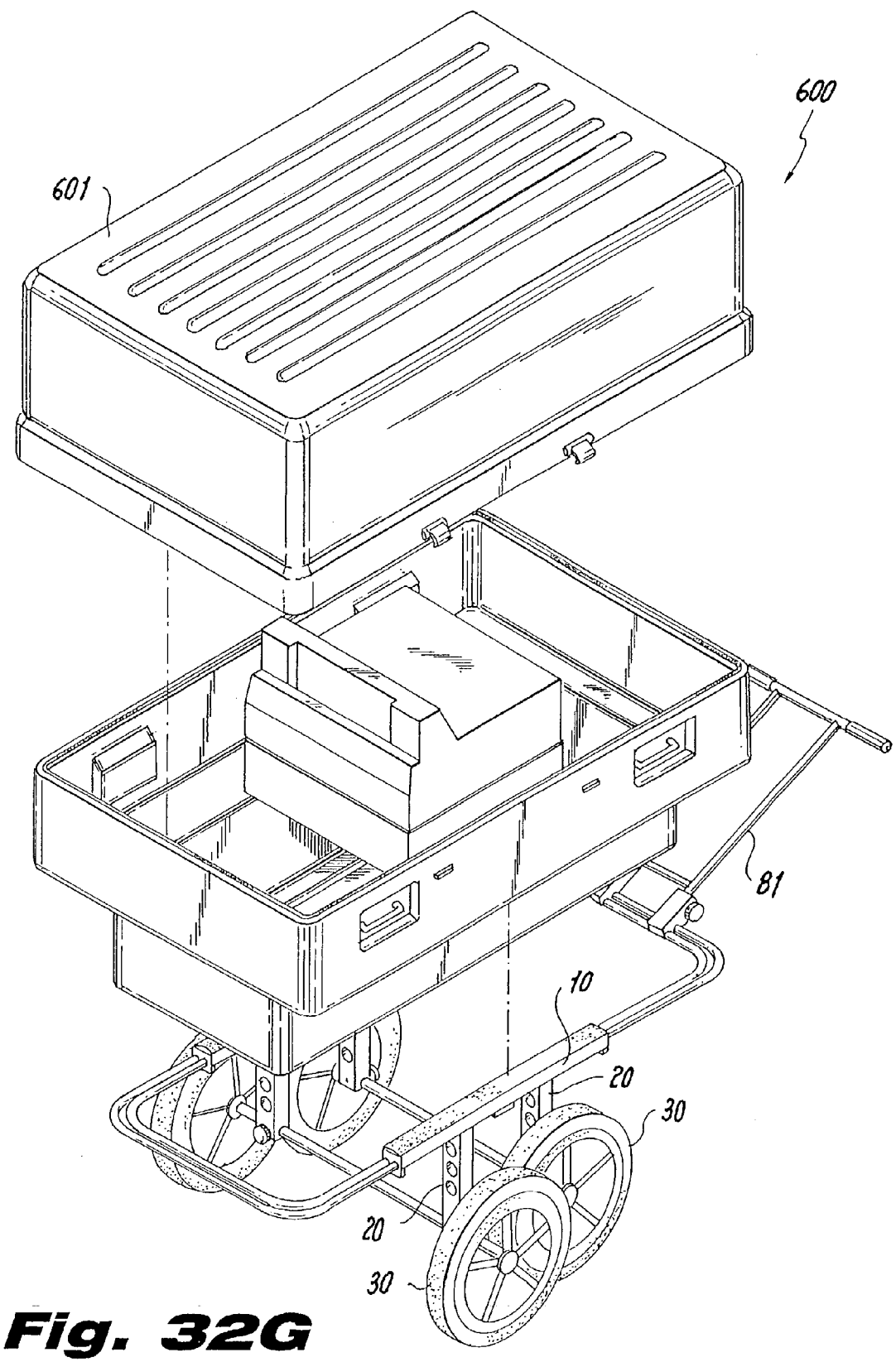
FIG. 32G is an exploded perspective view thereof.

Moreover, kickstand post 424 may be used with any embodiment having a handle, such as handle 80 of FIGS. 12 and 17–19, or handle 81 of FIGS. 32 and 33.

Figure 27:
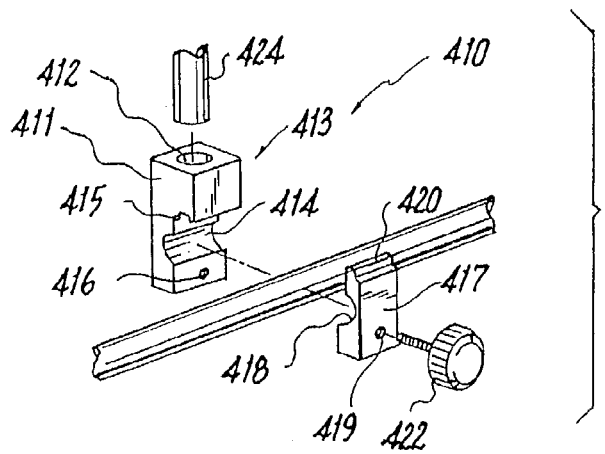
FIG. 27 is an exploded detail view of a quick release clamp for rail fastening to the cart shown in FIG. 26.

Turning to FIG. 27, which is highlighted in FIG. 26, an exploded perspective close-up detail view of rail clamp 410 is presented. Clamping block 411 is provided with a bore 412 to receive post 424, an attachment face 413 including a semi bore 414, and notch 415, and threaded bore 416. Plate 417 includes semi bore 418, through hole 419, and protruding rib 420.

Figure 28:
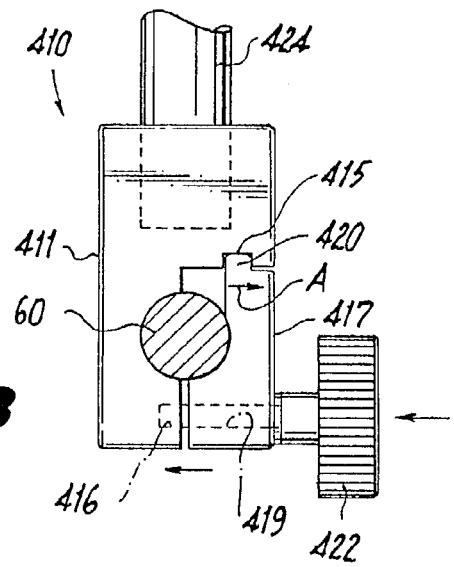
FIG. 28 is an assembled elevational view of the clamp of FIG. 27 attached to a rail.

As shown in FIG. 28, when threaded knob 422 is inserted into hole 419 of plate 417 and tightened into threaded bore 416 of block 411, clamping is achieved against frame member 60. Rib 420 is secured within notch 415 by a camming action in the direction of arrow "A".

Figure 29:
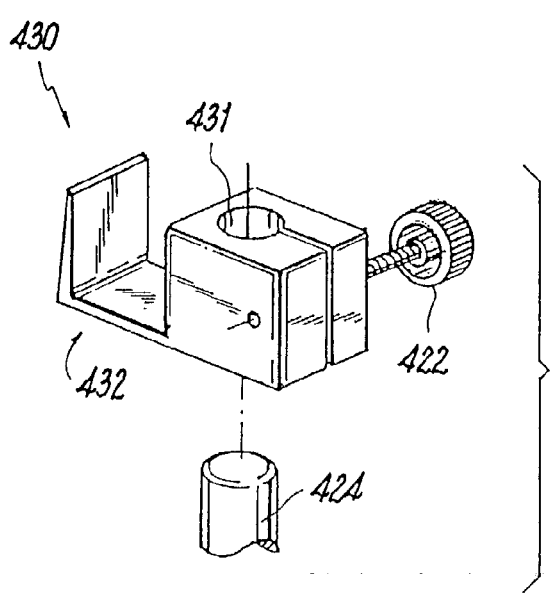
FIG. 29 is an exploded perspective view of a typical clamp for gear support for the cart as in FIG. 26.

FIG. 29 shows cantilevered hanger clamp 430, poised to slide down upstanding post 424. Hanger clamp 430 is provided with a bore 431, which is notched in a similar manner to clamping receptacles 71 of the handle assembly. The notch separates the body of hanger clamp 430 into two walls. Threaded knob 422 will compress the walls surrounding the notch, thereby tightening bore 431 around post 424. L-shaped region 432 is integrally formed with the body of the hanger clamp, and provides a strong and durable support for transporting hunting or other gear.

Figure 30:
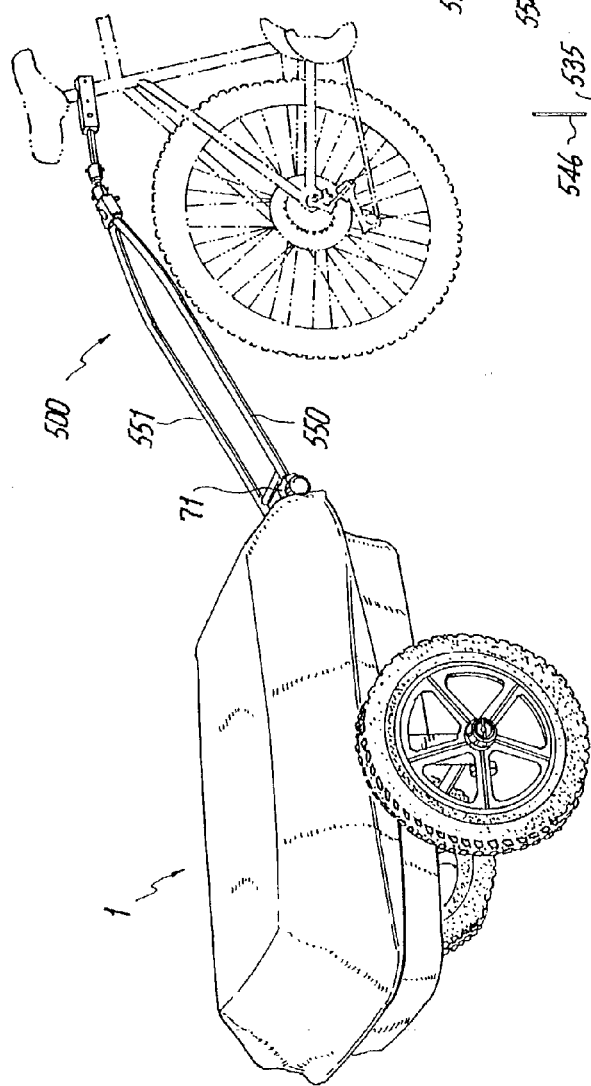
FIG. 30 is a perspective view of an anti-tipping attachment for connecting a bicycle to the portable cart of the present invention.

FIG. 30 is a perspective view of an anti-tipping linkage 500, which couples cart 1 to a bicycle. Linkage 500 counteracts cart rollover caused by centrifugal force as the bicycle negotiates turns.

Figure 31:
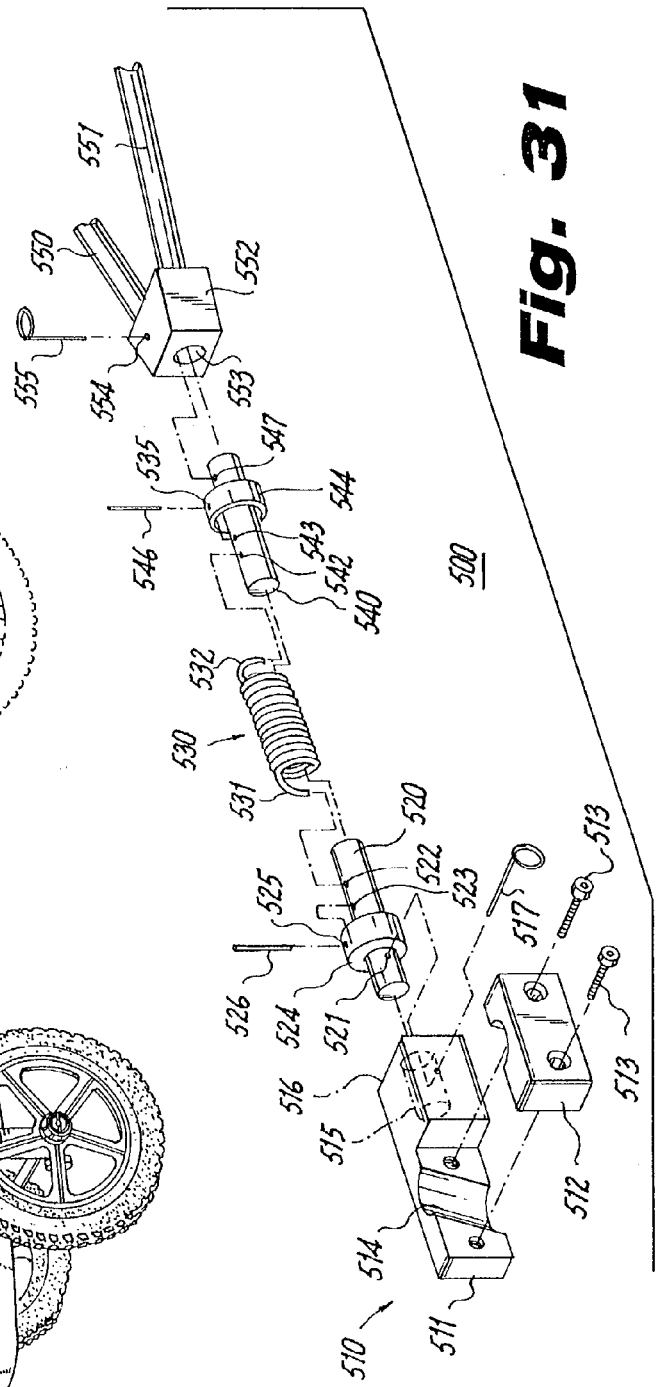
FIG. 31 is an exploded perspective view of the components of FIG. 30.

FIG. 31 illustrates the components of linkage 500. Bicycle seat-stem compression clamp 510 is formed of a body portion 511, and plate 512, fastened by screws 513. Bore 514 is angled so that clamp 510 remains perpendicular when installed on a typical bicycle seat-stem. Clamp 510 is provided with a bore 515 on rear face 516, which accepts a shaft 520. Pin 517 passes through clamp and fixes shaft 520 via a through-bore. Shaft 520 includes through-bore 522 at its distal end. Another through-bore 523 is provided slightly proximal of aperture 522. When shaft 520 is inserted into coil spring 530, hooked leg 531 of the spring will fit into bore 522. A sliding collar 524 will then extend over leg 531 to prevent pull-out, and a pin 526 will be fitted into collar hole 525, and into bore 523 of the shaft 520, thereby securing the collar to the shaft and preventing removal of the coil spring.

A shaft 540 is provided for the opposite end of coil spring 530. Hooked leg 532 fits into bore 542 of the shaft, and collar 544 slides over and is fixed by pin 546, fitted into collar hole 535 and shaft bore 543.

Support rails 550 and 551 are fixed to handle clamps 71 of cart 1. The rails are bent into an inverted V configuration, and permanently affixed to block 552. Block 552 is provided with bore 553, into which the free end of shaft 540 is fitted. Pin 555 is inserted into through bore 554 of block 552, and passes through bore 547 of shaft 540, creating the continuous, secure anti-tipping linkage 500 between cart 1 and a bicycle. It is understood that during maneuvers of the bicycle, there will be no problems associated with a typical universal or pivot joint; the coil spring will absorb and disperse any rotational stresses, and will react as a 360° "living hinge".

FIGS. 32A–32G, 33 and 33A show an alternate embodiment 600 of the portable cart using four wheels 30 in an overlapped configuration. A hard molded cover 601 is illustrated although any cover or no cover can be used as well. Cover 601 covers bin 602 with lower overlapping edge cap 601a fitting over peripheral shoulder 602a of bin 602. Bin 602 also has longitudinally extending concave channels 603, which rest upon rails 604 of cart 600 of FIG. 32. Downward pressure of the weight of bin 602 and its contents helps stabilize bin 602 upon rails 604, which may be optionally covered with rubber or other resilient linearly extending cushions.

Although FIG. 32 illustrates portable cart 600 with covered bin 602, portable cart 600 can be used with other embodiments, such as, for example, boat cushions 13 shown in FIG. 4, framed rail stretchers 100 as in FIG. 12, the game cart of FIG. 17, the cargo cart of FIG. 18, the conventional rescue carriers of FIGS. 23 and 24 or the gear rack of FIG. 26, among others.

FIG. 33 shows a perspective view of the frame of cart 600. Long axle 606 attaches front wheels 30 while short axle 605 attaches rear wheels 30 through respective vertical support pairs 20. The use of four wheels doubles the carrying capacity of the cart of this invention while the overlapped positioning of the wheels maintains a short wheelbase for compactness and for maneuverability such as turning with fixed axles and the ability to easily climb ledges. For durability, the rails 604 may be a double pair of parallel rails.

Double axled cart 600 has increased maneuverability, since user pushing upon an optional handle 81 enables user to lift the farther away, distal pair of wheels 30 off the ground, and the user pulling upward of handle 81 raises the nearer proximal wheels 30 off the ground.

FIGS. 34 through 39 are concerned with an alternate embodiment of the horizontal load support member 10. The alternate embodiment 610 has an integral T-slot channel 611 in its top surface to facilitate easy installation and removal of a variety of attachments, such as cushions 615 shown in FIGS. 35–36, clamps 620, 630, 640, shown in FIGS. 37–39, or platform 1450 shown in FIG. 57. Load member 610 can be conveniently extruded of aluminum or magnesium; it can be used either with the two-wheel cart 1 or the four-wheeled embodiment 600.

Figure 36:
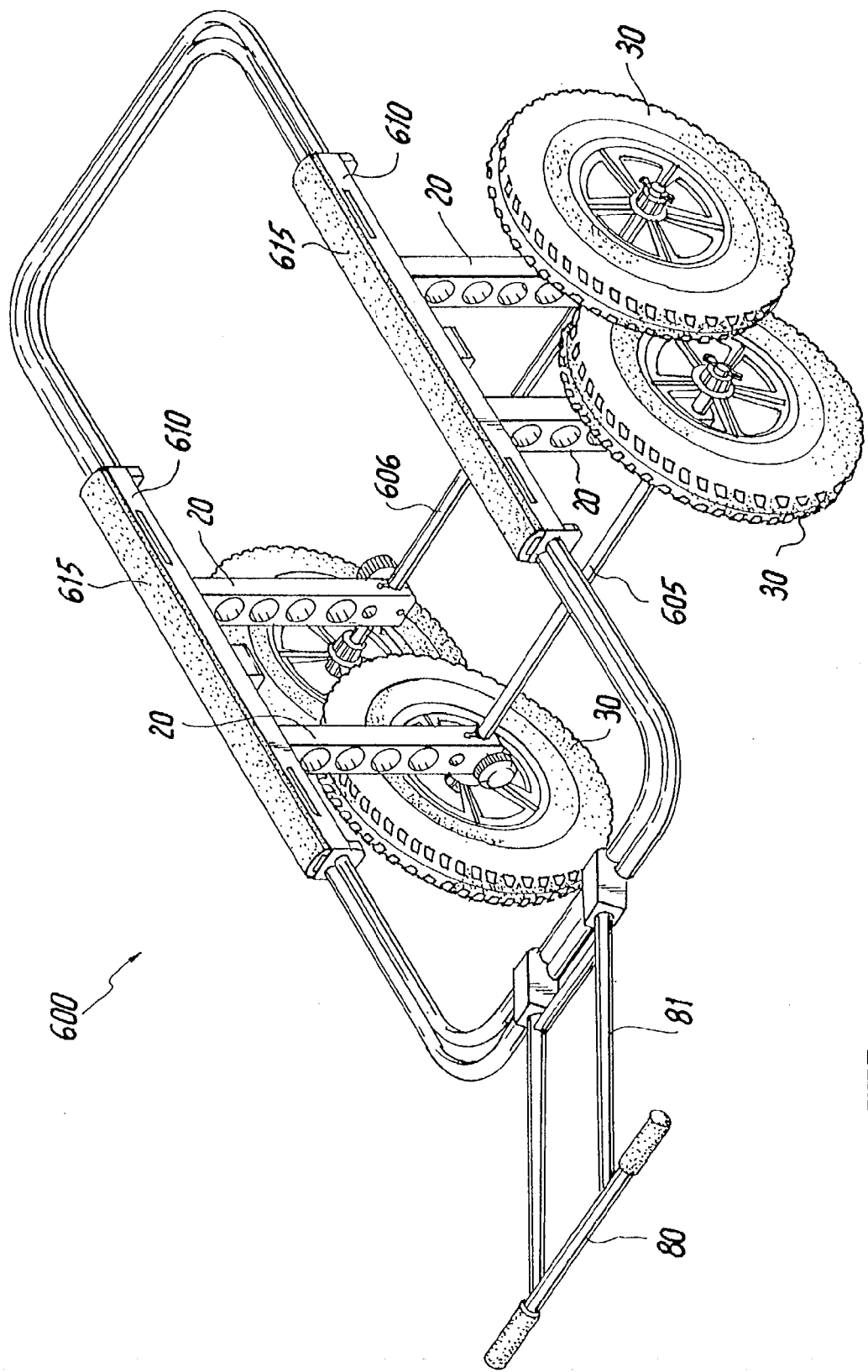
FIG. 36 is a perspective view of the embodiment for an assembled cart with four wheels further incorporating horizontal support members with a T-slot.

FIG. 35 shows a resilient cushion 615 installed in the T-slot 611 of support member 610. This cushion 615 can be extruded of a variety of rubber or thermoplastic elastomers and serves the same purpose as cushion member 13 described above. A perspective view of FIG. 36 shows cushions 615 installed on a four-wheel cart 600.

As described above, clamp assembly 200 is used to convert portable cart 1 to a disabled person-bearing transportable carrier cart. Three separate alternate embodiments of clamp assembly 200 are presented; all are compatible with the use of horizontal support member 610.

Figure 37:
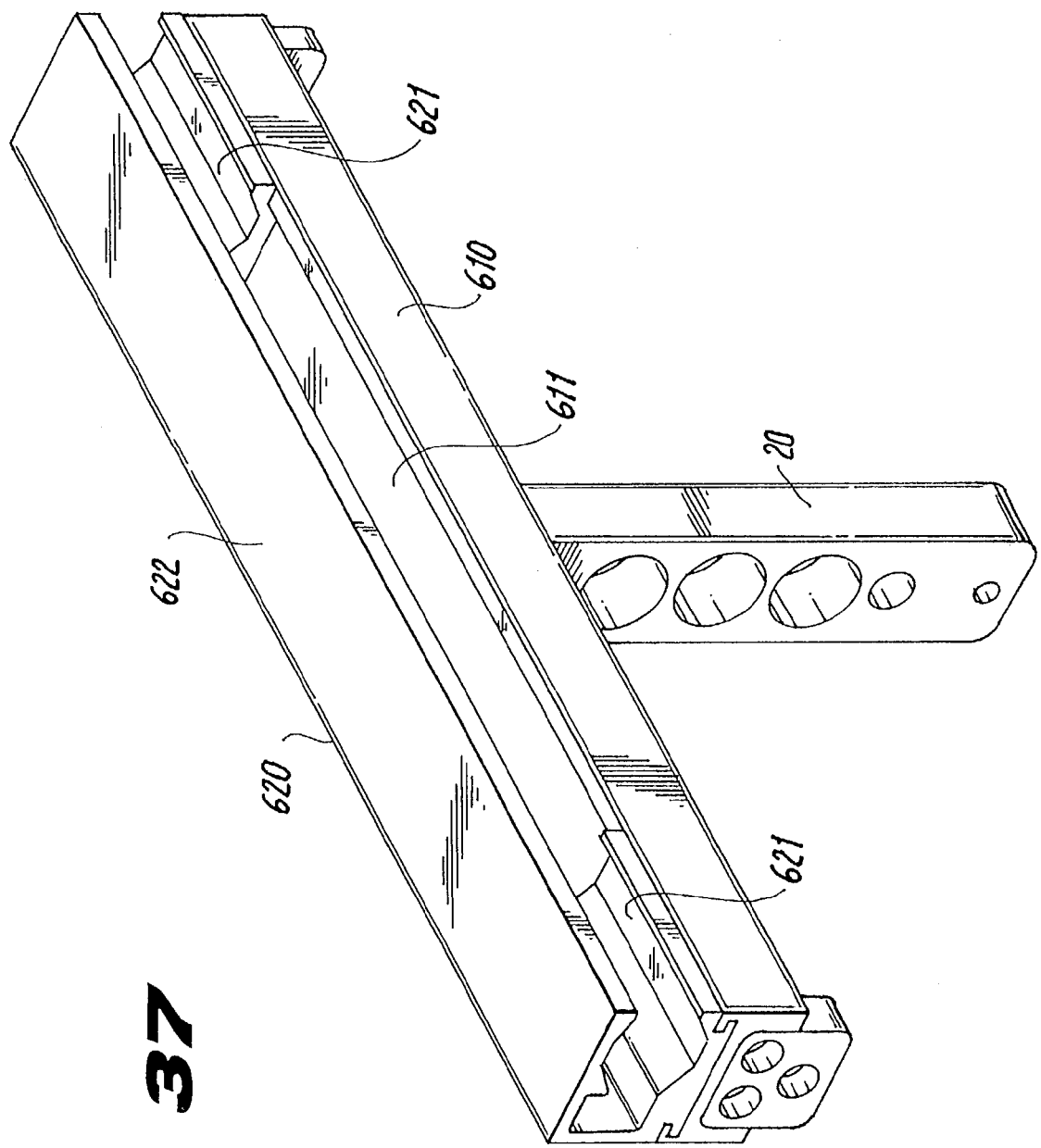
FIG. 37 is a perspective view of a horizontal support member with a clamp member having two short T-slot engaging members and a full-length top section.

FIG. 37 shows a one-piece clamp 620 with full width top section 622 and short end pieces 621, which mate with, and slip into the T-slot 611 of horizontal support member 610.

Figure 38:
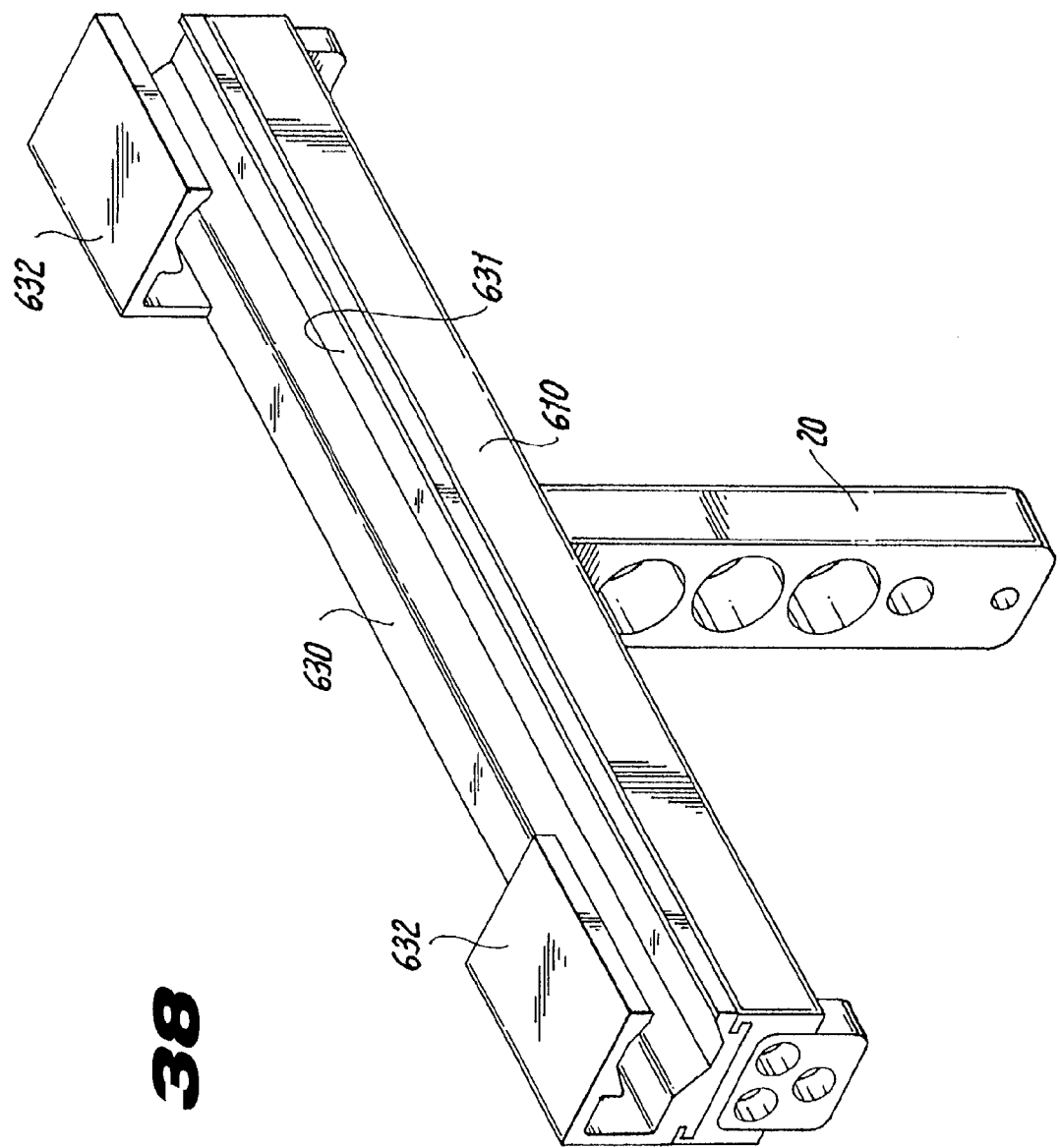
FIG. 38 is a perspective view of a horizontal support member with a clamp member having a full-length T-slot engaging bottom member and two short clamping top members.

FIG. 38 shows clamp 630 with a full width bottom member 631 which mates with and slides into T-slot 611 of horizontal support 610.

Figure 39:
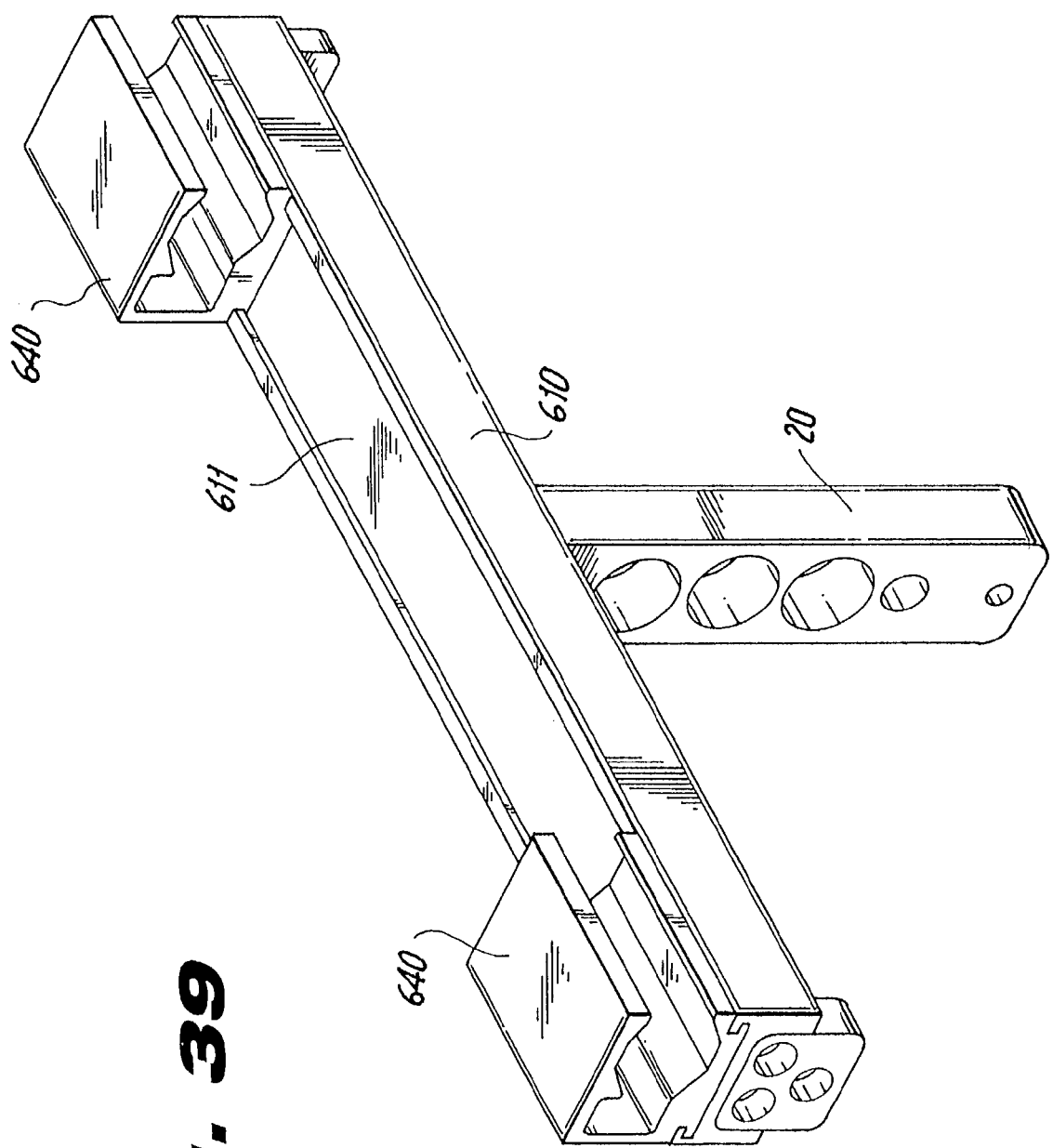
FIG. 39 is a perspective view of a horizontal support member with two short identical clamping members installed in the T-slots at the extreme ends.

FIG. 39 shows another alternate embodiment consisting of two short identical clamp members 640 which are inserted into the T-slots 611 of member 610 at the two extreme ends.

In all cases, the short clamping sections can be sized to offer spring-like gripping action on the tubular members, or fasteners, such as thumbscrews or ball plungers (not shown) can be used for retention.

FIGS. 40–50 show alternate embodiments for converting a conventional hand carried, railed medical rescue stretcher to a lightweight wheeled version.

Figure 42:
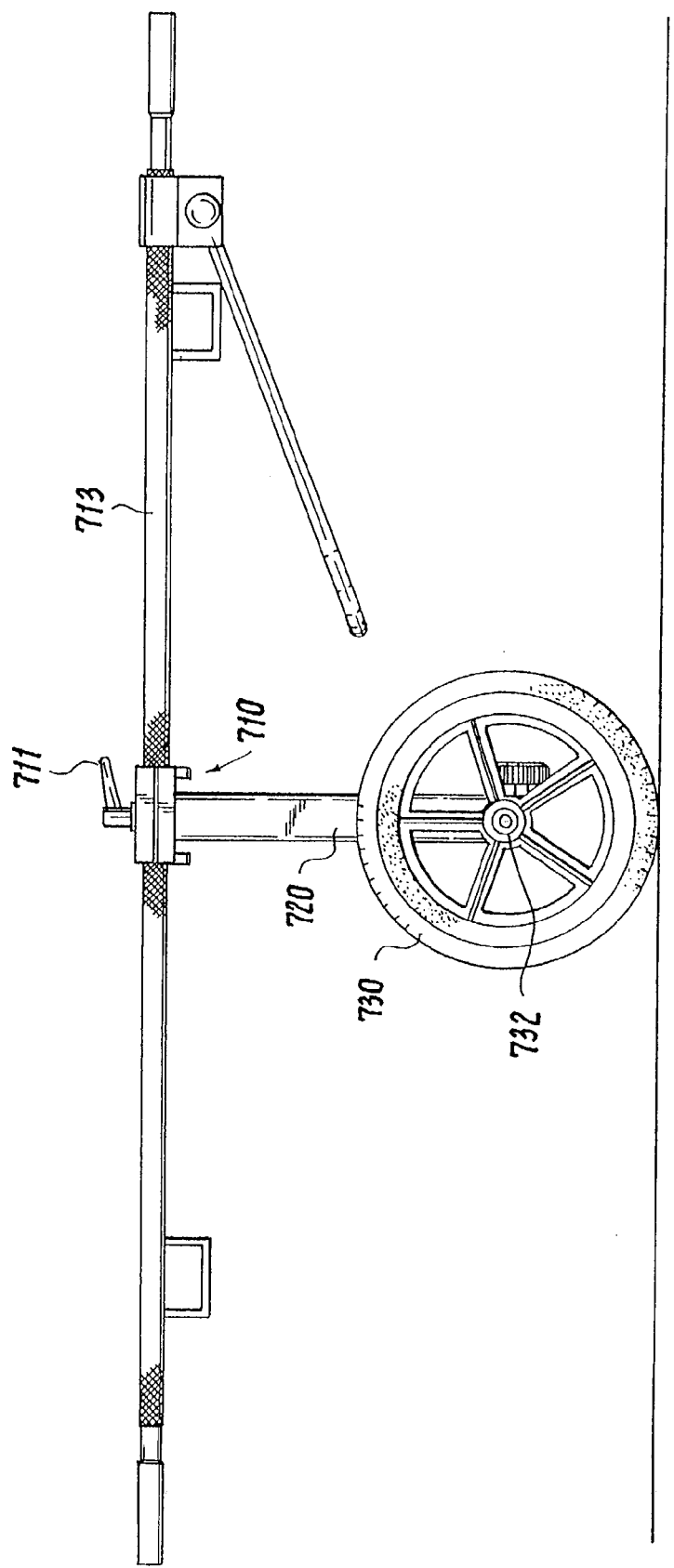
FIG. 42 is a side elevational view of the rescue carrier cart as in FIG. 40, shown with the kickstand pivoted in a transportable position of rest.

For example, FIGS. 40–42 show shortened horizontal support members 710 with tightening members 711. Rails 713 are held either by clamps, such as shown in FIGS. 37–39, or alternatively through apertures in horizontal support members 710, as shown in FIG. 14. Horizontal support members 710 are demountably attached to vertical struts 720 having extending therethrough transverse axles 732 supporting wheels 730. Optional pivotable kickstand 740 is attached to rails 713 by clamp 800.

Figure 47:
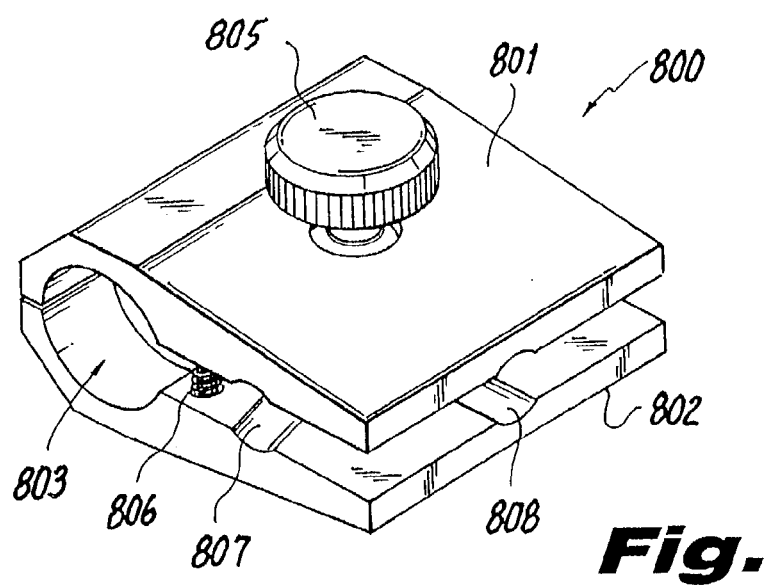
FIGS. 47, 47A, 47B, 48 and 49 show respective isometric, left side, top, front and right side views of the clamp used in the embodiments shown in FIGS. 40–46.
Figure 47A:
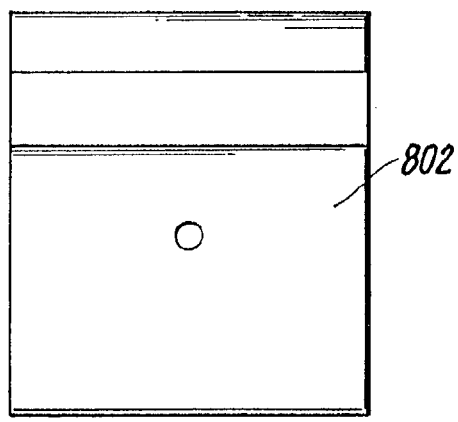
Figure 47B:
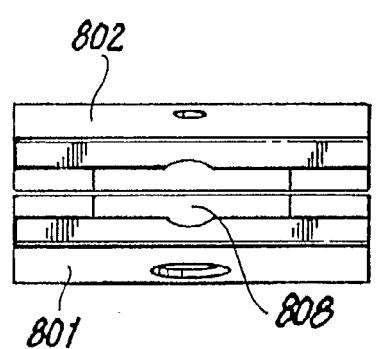
Figure 48:
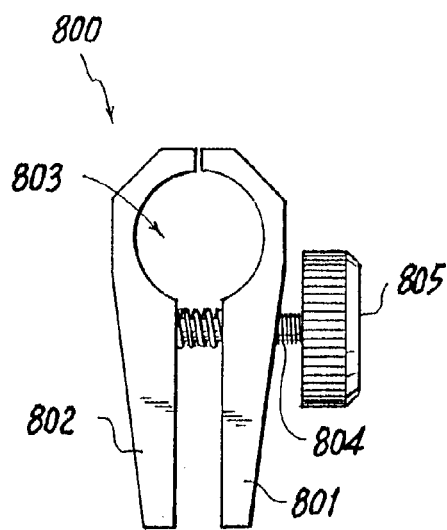
Figure 49:
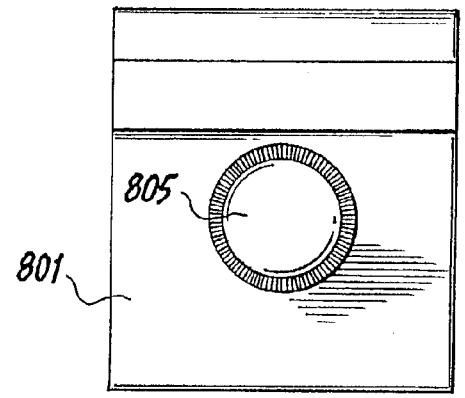
Figure 50:
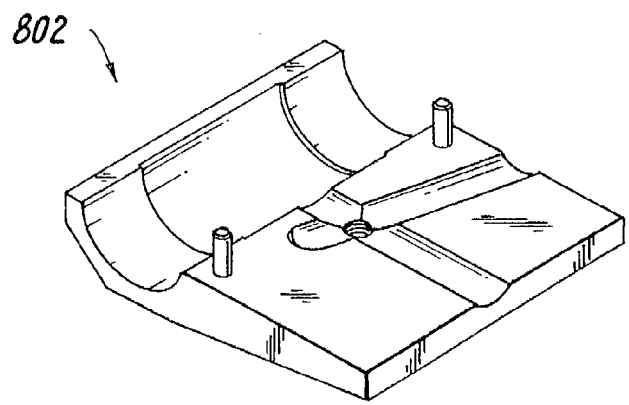
FIG. 50 is an isometric view of a half piece thereof, shown with spring pins.

As also shown in FIGS. 47–50, clamp 800 includes two jaws 801, 802 having aperture recess 803 for insertion of rails 713 therethrough. Clamp 800 is closed and tightened by fastener 804 operated by rotatable knob 805. Internal spring pins 806, as shown in FIG. 47, cooperate with fastener 804 and knob 805 to tighten clamp 800 about rail 713. Internal grooves 807, 808 accommodate kickstand 740 in the respective positions of support and rest, as shown in FIG. 40 and FIG. 42 respectively.

FIG. 43 shows an alternate embodiment for a military rescue carrier cart 900 with a profile set low to the ground, including shortened horizontal members 910 with tightening fasteners 911. Rails 913 are also held by clamps as in FIGS. 37–39, or alternately through apertures in horizontal support members 910, as in FIG. 14. Horizontal support members 910 are demountably attached to shortened vertical struts 920 to keep stretcher rails 913 close to the ground. Optional bent handle 945 is connected by clamps 800 disclosed in FIGS. 47–50, as discussed above.

Figure 45:
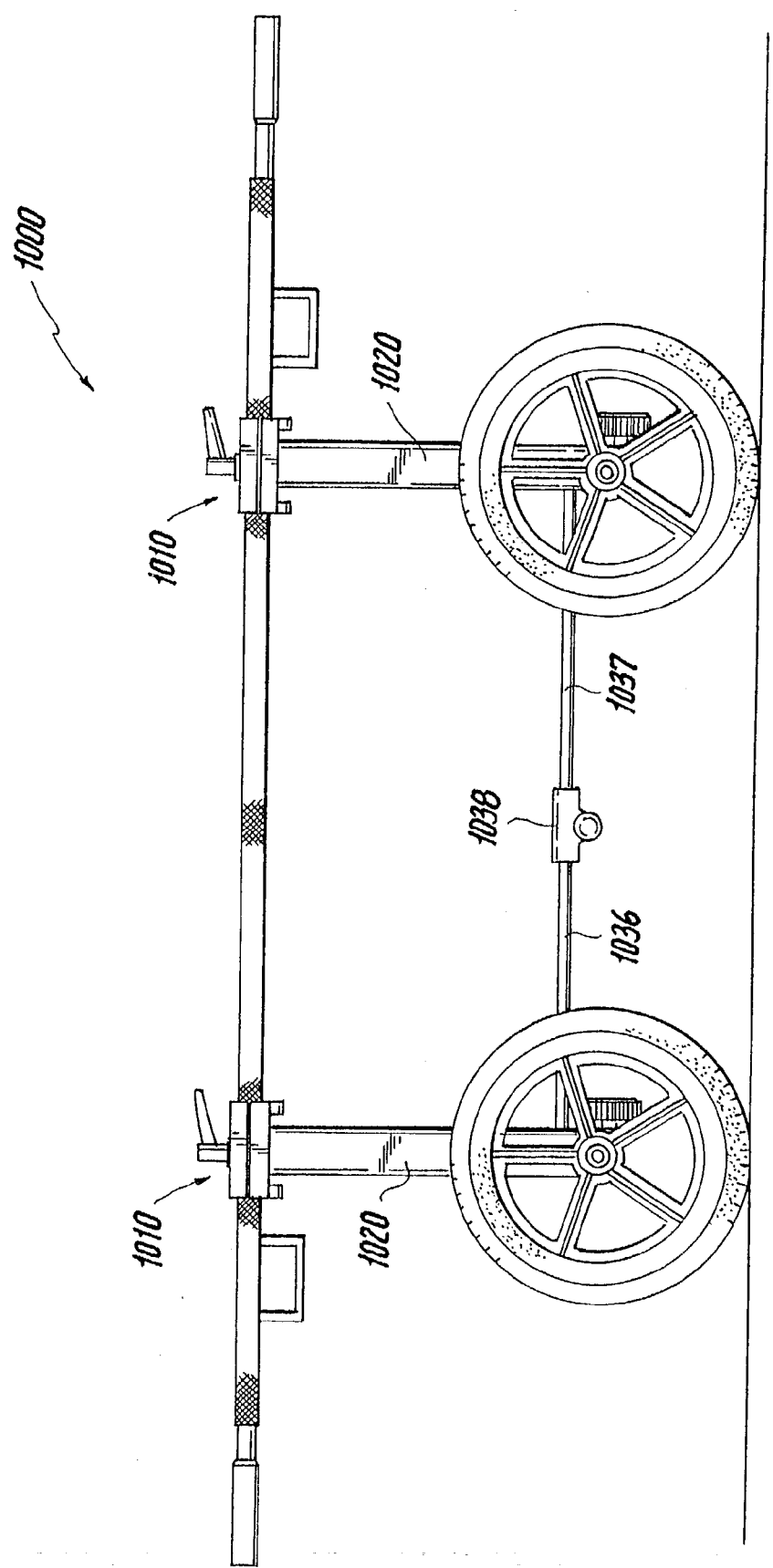
FIG. 45 is a side elevational view of an alternate embodiment for a four wheeled rescue carrier cart, shown with stretcher rails and with stabilizing tie rods, for use as a temporary stationary medical gurney.
Figure 46:
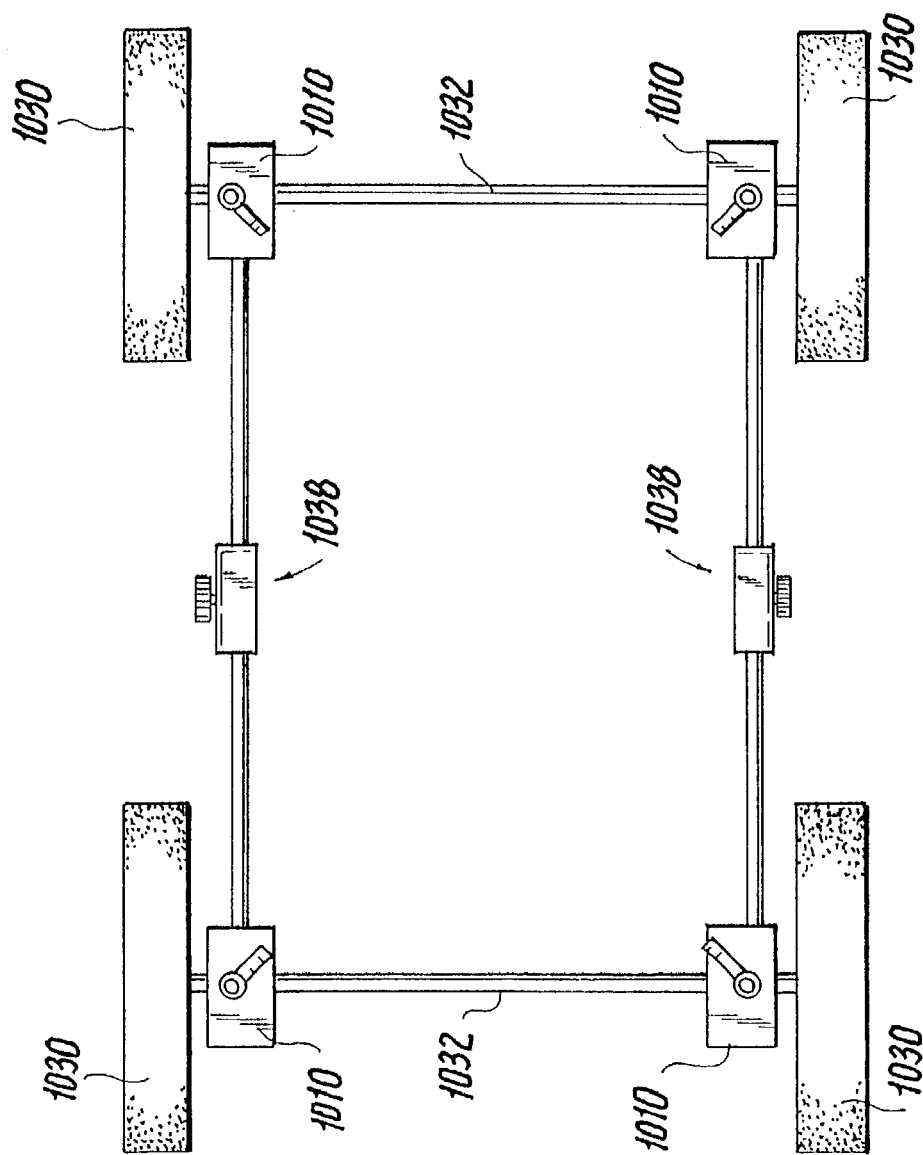
FIG. 46 is a top plan view thereof; shown without the stretcher rails.

FIGS. 45–46 show how the stretcher version shown in FIGS. 40–42 can be converted to a stationary medical gurney 1000. Rails 1013 are supported by horizontal support members 1010, which hare demountably attached to vertical struts 1020, having axles 1032 supporting wheels 1030. To stabilize gurney 1000, horizontally extending tie rods 1036, 1037 are joined by threaded clamp 1038 or other fastening means.

Figure 51:
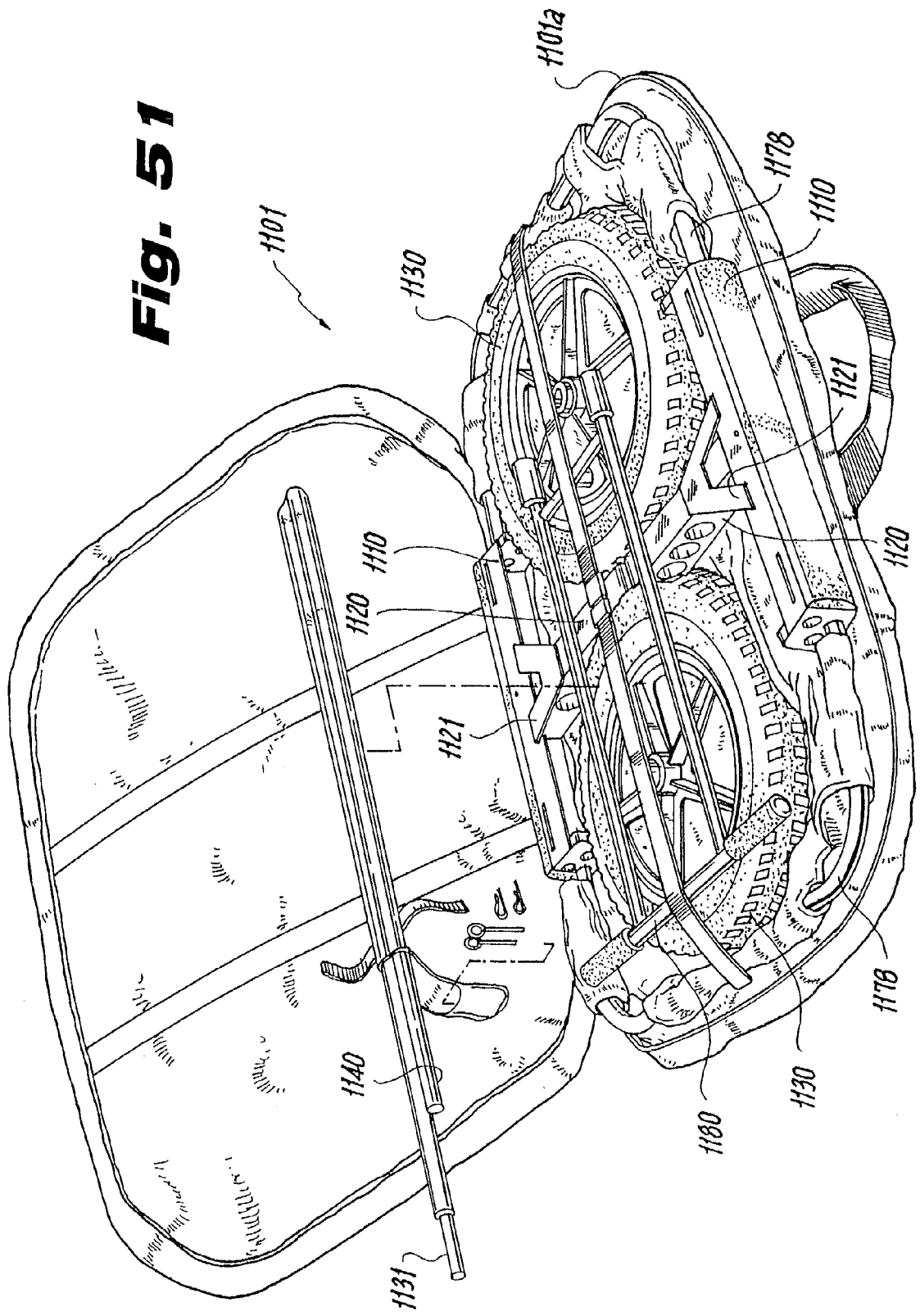
FIG. 51 is an isometric perspective view of a further embodiment for a disassembled, single axle cart, stored in a carry bag.
Figure 51A:
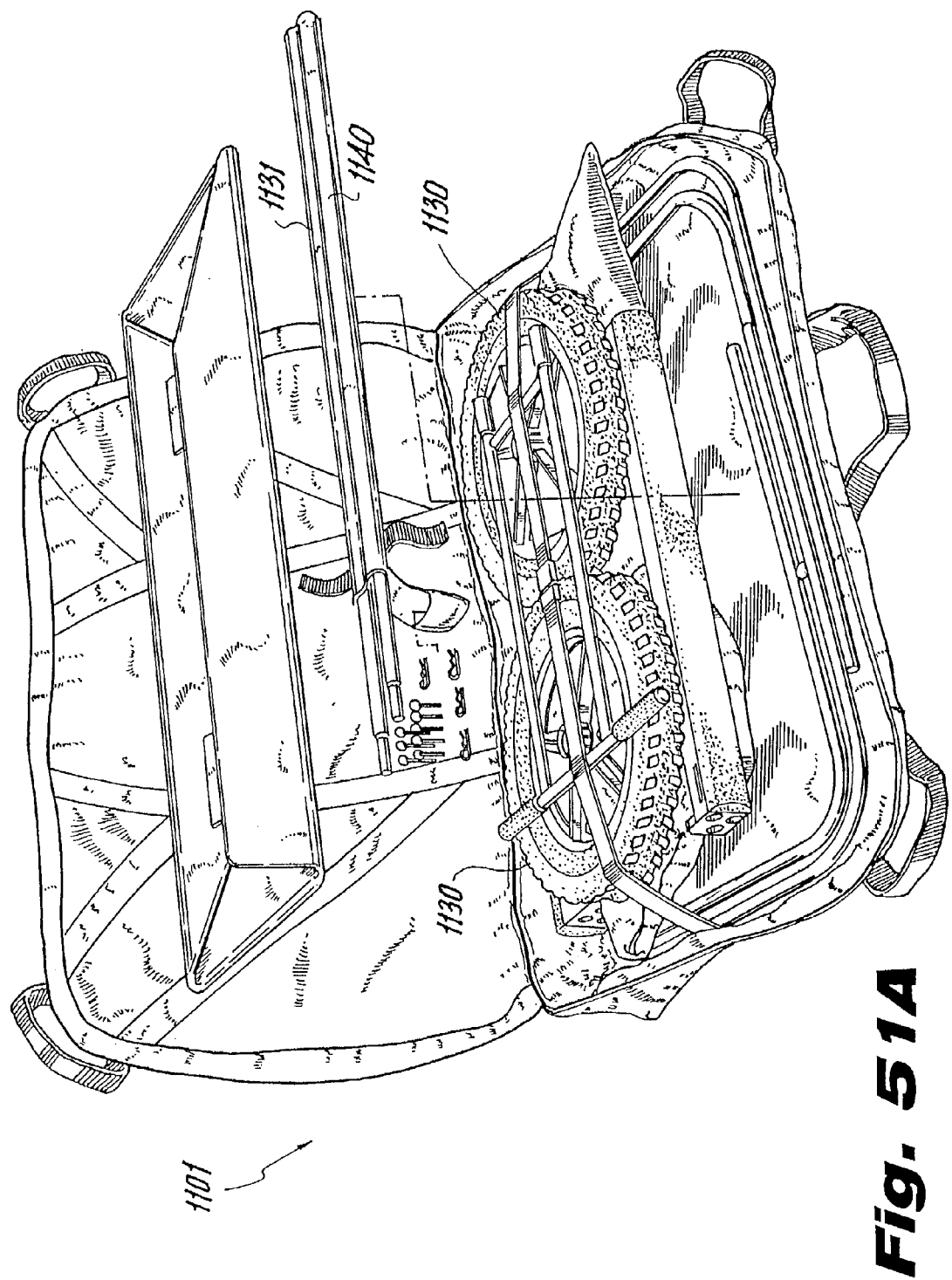
FIG. 51A is a further perspective view thereof.
Figure 53:
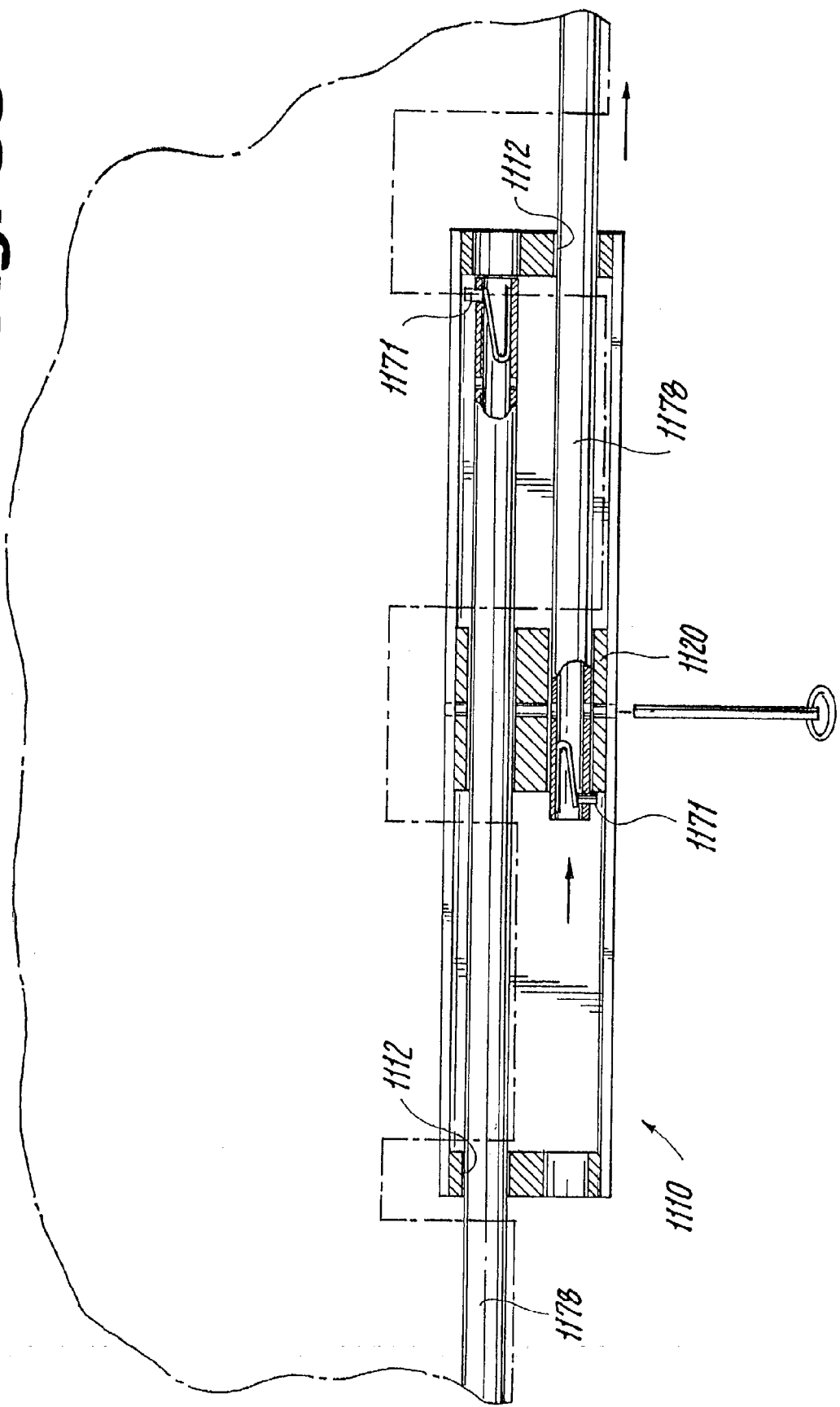
FIG. 53 is a close-up cutaway view of the spring stop member regulating outward movement of the optional rails of the cart of the present invention from a storage position to a position of use.

FIGS. 51–53 show a further embodiment for portable cart 1101 which folds down to a disassembled storage position as in FIG. 51 and which unfolds to an assembled position of use as in FIG. 52. Cart 1101 includes a pair of horizontal load support members 1110 laid parallel to each other, which rotate axially to move perpendicularly extending vertical struts 1120 outward from a position within a storage bag 1101a, where vertical struts 1120 face each other's distal ends, to a position of use 90 degrees perpendicular to the storage position, where vertical struts 1120 extend in the same plane but outward from horizontal load support members 1110.

In this embodiment shown in FIGS. 51–53, the resilient rails 1178 are engaged to horizontal supports 1110 such that when in a position of storage the rails 1178 are biased to return to their normal position of use, when released from the storage position, thus causing vertical struts 1120 attached to horizontal supports 1110 to pivot upward and bow, thus increasing the strength of the cart.

The same is true with other embodiments of the present invention. For example, placing a boat 2 upon cart 1 causes horizontal support members 10 and wheel axles 31 to bow, giving it the strength of an uncollapsible Roman arch. The same is true with respect to stretcher or cargo hauling embodiments shown in FIGS. 12, 17–19, 40–45 and 58–66, for example, wherein putting weight makes the carrier portion taut and bows the frame members into a position of strength. Also the multiple floating overlapping rails as in FIG. 14, for example, bow the rails and strengthen the cart with a load supported thereon.

Moreover, vertical struts 1120 can be further strengthened in place to horizontal supports 1110 by connecting braces, such as V-shaped braces 1121.

Wheels 1130 are held by axle 1131, which in a storage position is placed within the storage bag 1101a. To lengthen cart 1101, rails 1178 move away from each other within holes 1112 within horizontal supports 1110, and are stopped from further movement by spring stop buttons 1171.

Figure 54:
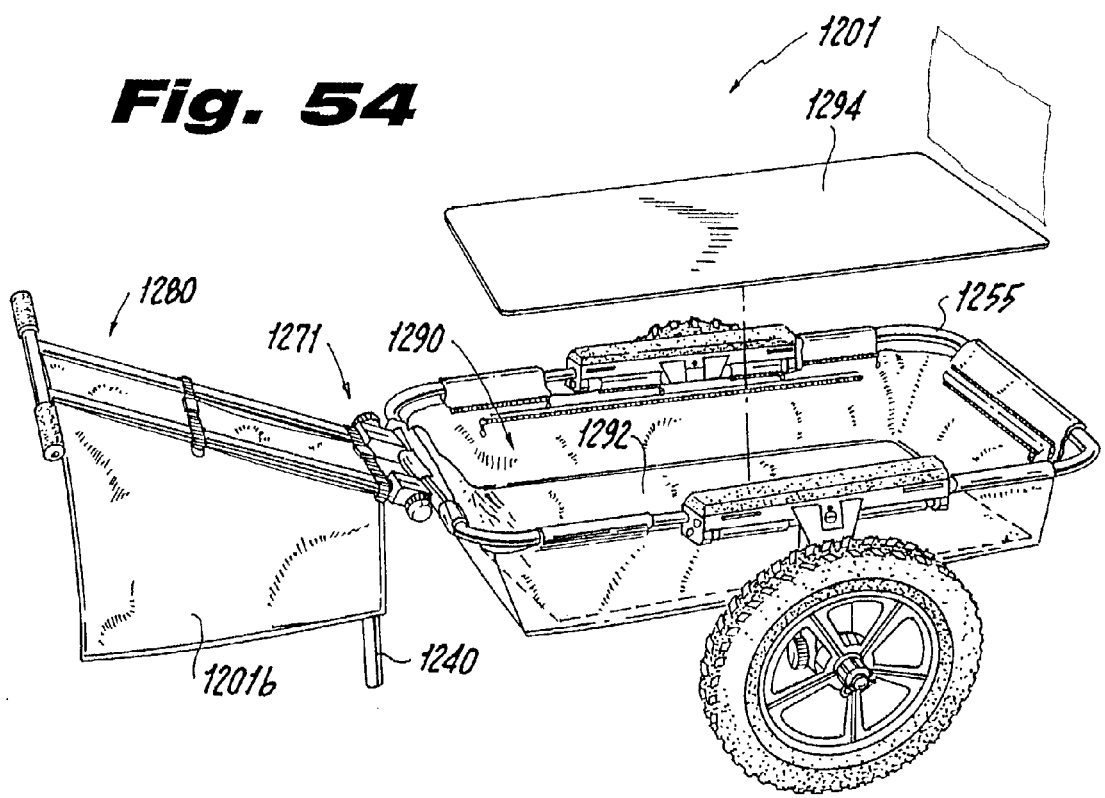
FIG. 54 is an overall perspective view in partial cutaway of the cart showing the wagon portion in its cargo-carrying configuration.
Figure 55:
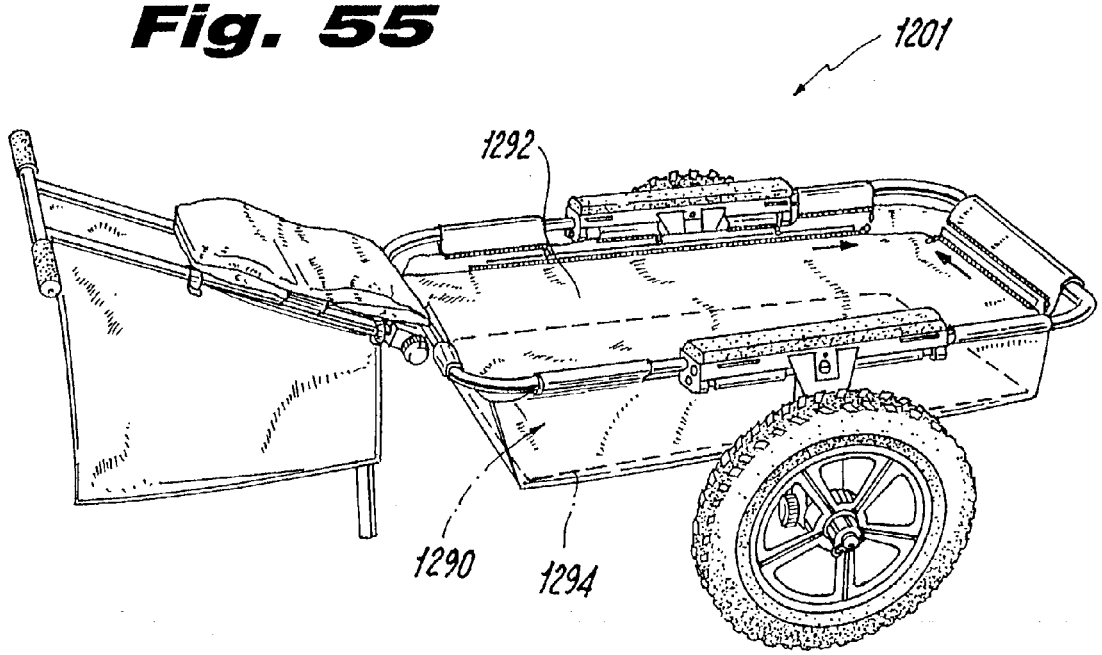
FIG. 55 is an overall perspective view of the cart of FIG. 54, shown in its rescue stretcher configuration.

FIGS. 54–55 show portable cart 1201 which can be converted from a cargo hauling wagon configuration with cargo well 1290 attached to frame 1255, to a rescue stretcher with taut rescue canvas or other stretcher 1292 when stretcher 1292, which sits loosely above hollow well 1290 during the cargo hauling configuration, but which becomes taut when peripheral fasteners, such as zippers 1296, snaps or the like tighten stretcher 1292 in place about frame 1255.

Optional kickstand 1240 or handle 1280 may be attached to cart 1201 by joints 1271. A further accessory arm bag 1201b may be draped down from handle 1280 for further storage. An optional hard floor member 1294 may be provided below stretcher layer 1292 within cargo well 1290 for cargo hauling strength.

Figure 56:
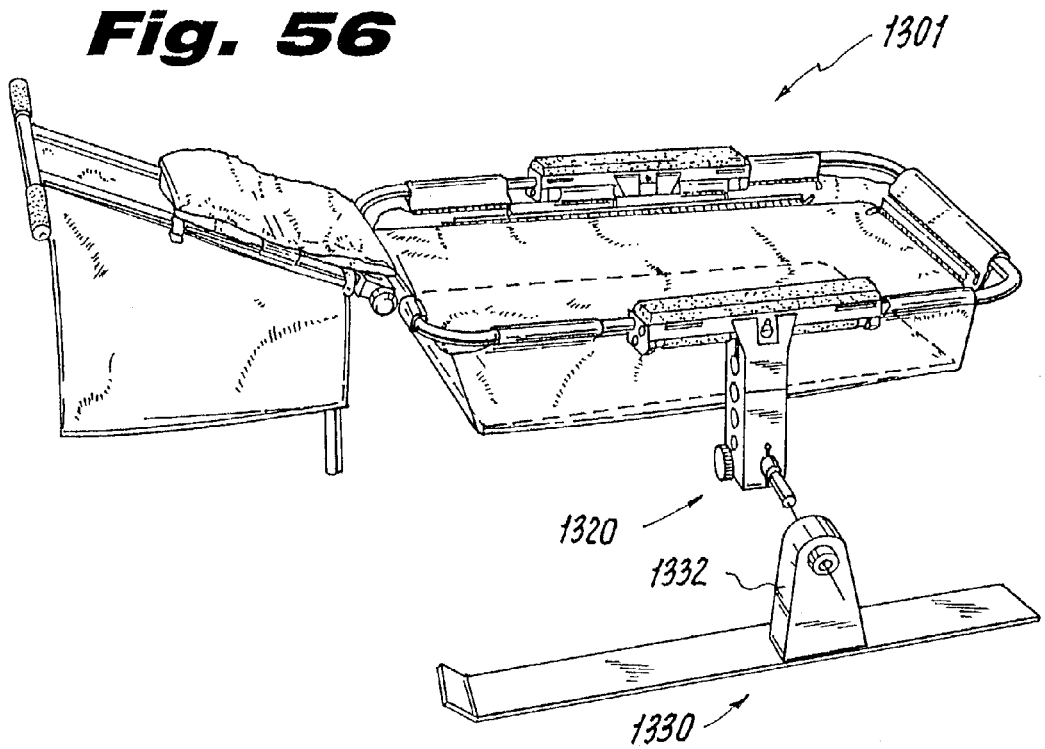
FIG. 56 shows a detail view of an optional ski attachment instead of wheels, for use in snow and winter environments.

FIG. 56 shows optional ski attachments 1330 for cart 1301, wherein ski portions 1331 are attached by braces 1332 to vertical struts 1320. The length of braces 1332 is equal to the radius of wheels 30 in previous embodiments.

Figure 57:
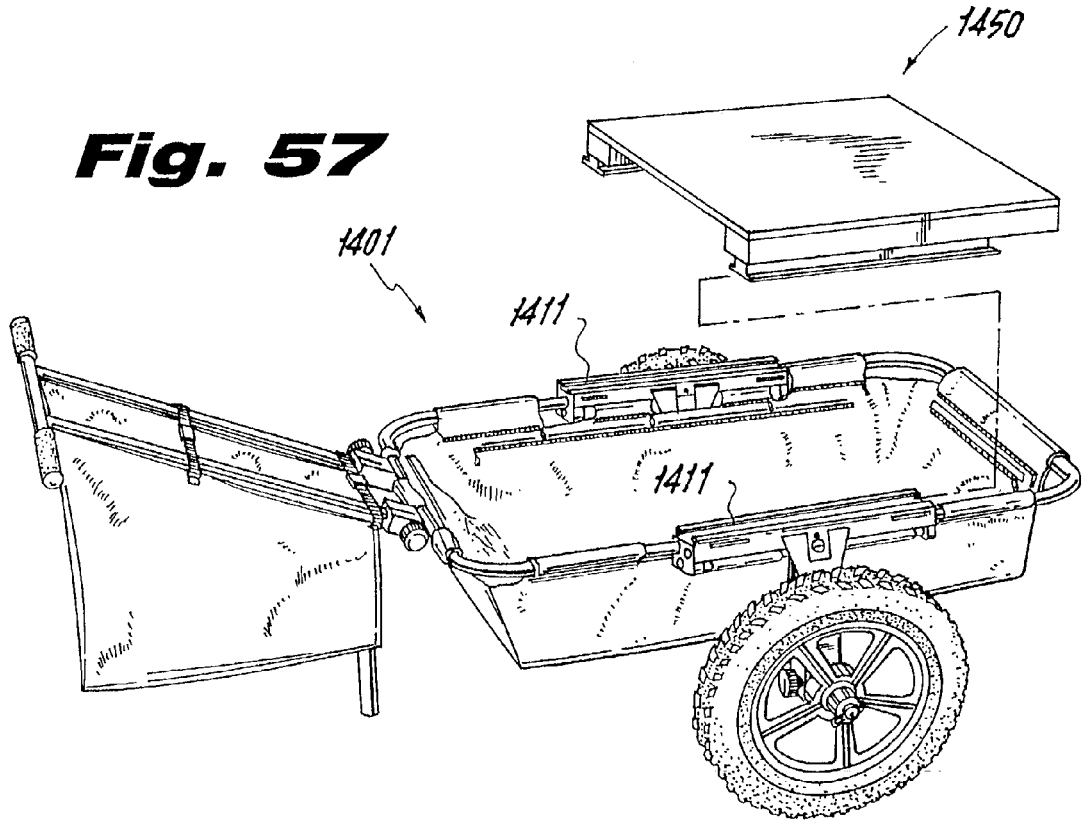
FIG. 57 shows a detail view of an optional platform base for supporting objects thereon.

FIG. 57 shows optional platform base 1450 for supporting object such as camera tripods, cooking devices, ordnance, etc. upon cart 1401. Platform base 1450 slides within channels 1411 and is secured in place by fasteners such as recessed hex nuts.

Figure 58:
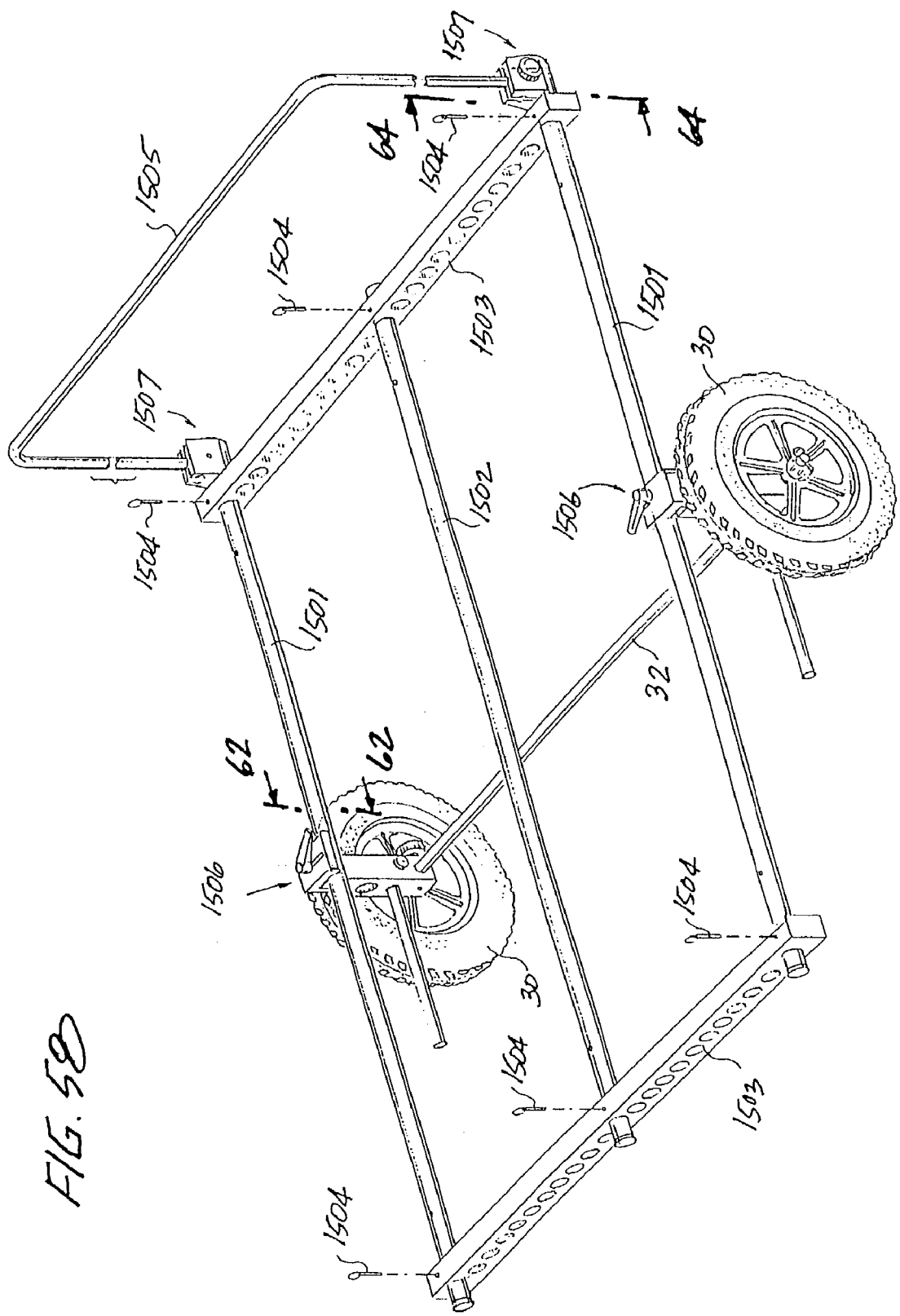
FIG. 58 is a perspective view of portable cart frame configured as a multi-victim stretcher.

FIG. 58 shows a portable cart frame of this invention configured as a cargo hauler or as a multi-victim stretcher. The cart includes two outer longitudinal horizontal parallel rigid load support frame members 1501 which are preferably tubular. The cart also may include an optional center frame member 1502, also preferably tubular, as well as optional transverse frame members 1503, overhead tube frame 1505, two vehicle actuators, such as wheels 30 and axle 32. It is contemplated that in snow conditions the vehicle actuators can alternatively be skis, such as shown in FIG. 56 herein.

Also as shown in FIG. 58, fasteners, such as cotter pins 1504 are used to attach horizontal support members 1501 and 1502 within holes, such as circular holes for tubular shaped horizontal support members in transverse members 1503.

Also as in FIG. 58, vertical struts having the wheel subassembly with wheel 30 are attached to outer horizontal support members 1501, such as tubes, with mechanisms 1506 which permit quick attachment and detachment. Attachment clamps 1507 secure overhead handle 1505 to outer ends of horizontal support members 1501.

Although not shown in the drawings, any of the embodiments herein shown in all the drawing FIGS. 1–70 may have vertical length adjustment means (not shown), such as a sleeve containing a telescoping shaft, the sleeve having a spring means for urging said shaft in a selectably extendable manner out of the sleeve and a lock for locking the telescoping shaft into a selected extended position.

Figure 59:
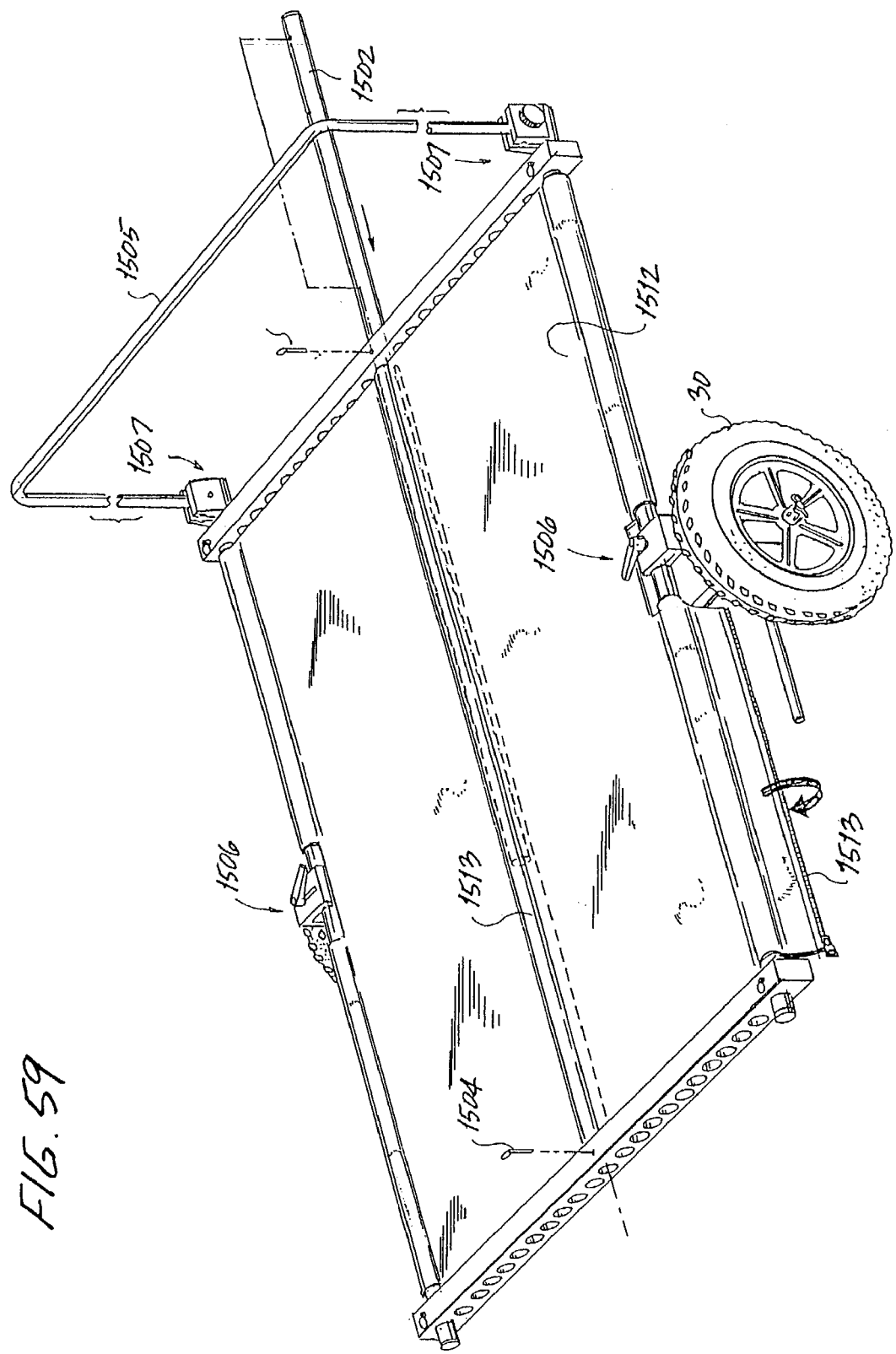
FIG. 59 is a perspective view of multi-victim stretcher using single fabric top surface cover.

FIG. 59 shows a single cargo or person hauling fabric top surface sheet 1512 which can be made of canvas or similar material. Sheet 1512 preferably has sewn longitudinal pockets at the outer edges to accept horizontal support members 1501 and a central pocket 1513 to accommodate optional central frame member 1502 when inserted in direction 1514 as shown. Optional apron sections 1513 can be flipped over the side edges.

Figure 60:
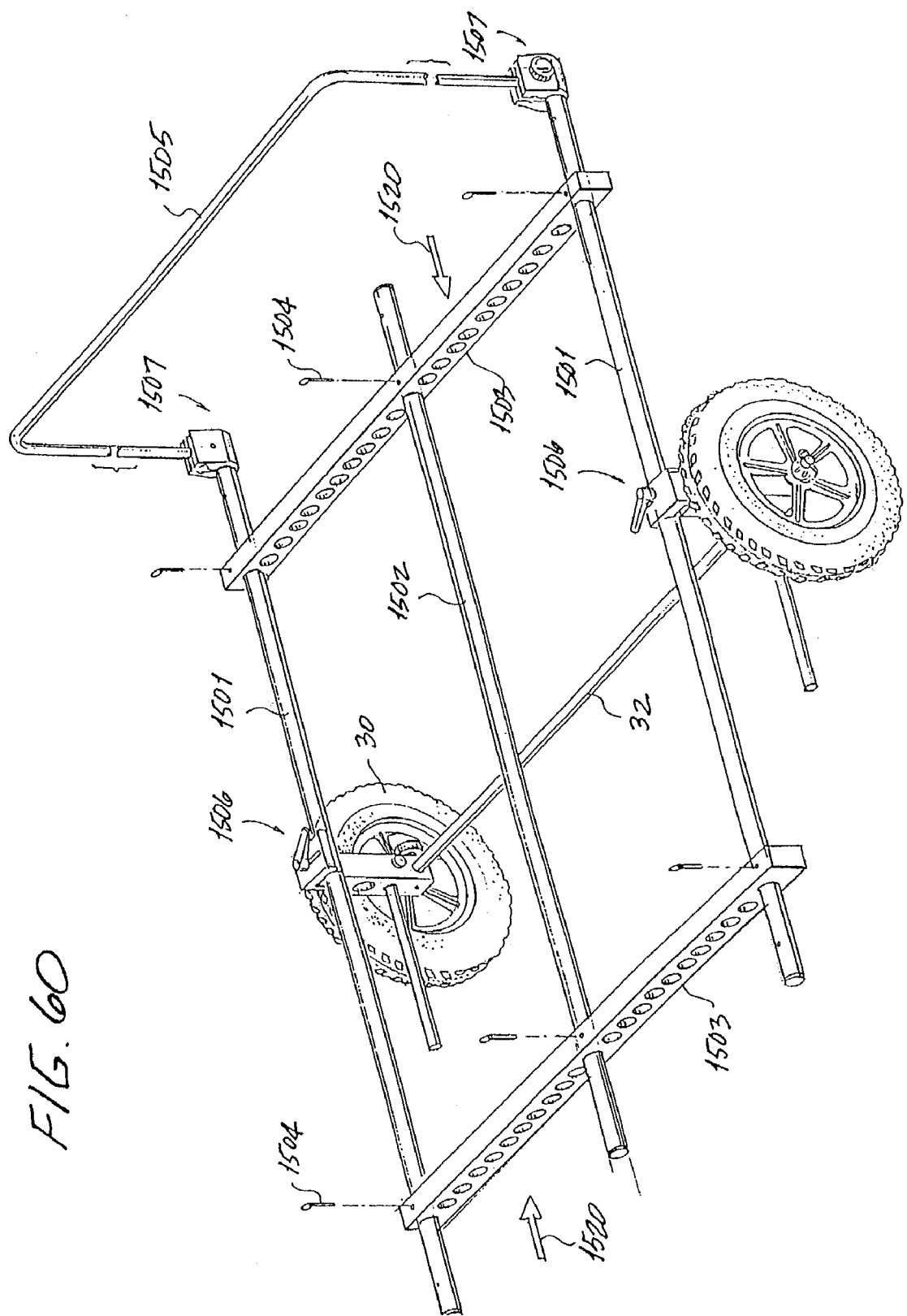
FIG. 60 is a perspective view of multi-victim cart frame reconfigured to accept separate stretchers.

FIG. 60 shows the frame of this cargo hauling or multi-victim cart readjusted to foreshorten the distance between transverse members 1503 by securing cotter pins 1504 in holes in horizontal support members 1501 and 1502 which are located farther in from the ends.

Figure 61:
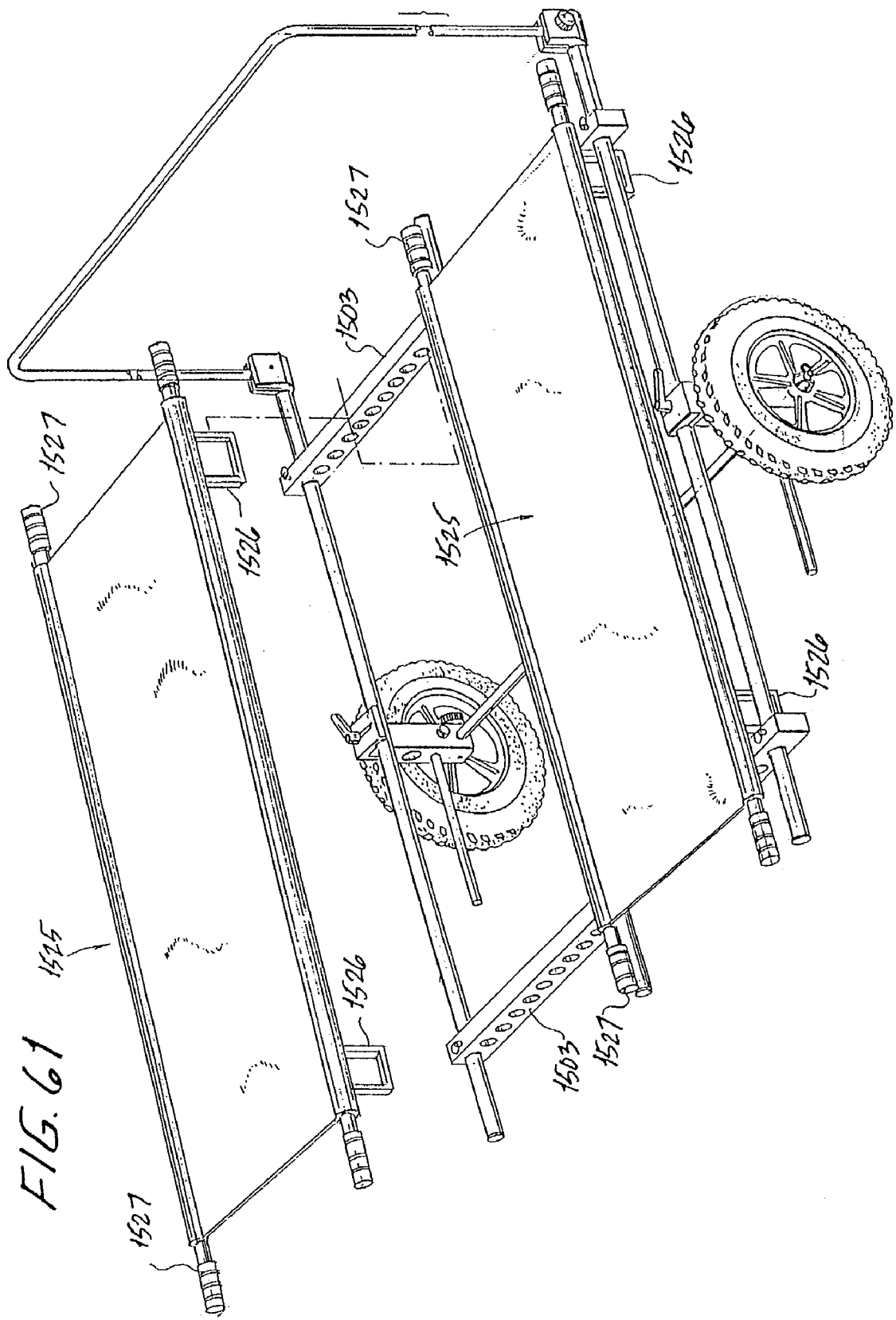
FIG. 61 is a perspective view of multi-victim stretcher using separate stretchers.

As shown in FIG. 61, this adjustment can be used to accommodate separate stretchers 1525 with locating extensions 1526 and handles 1527.

Figure 62:
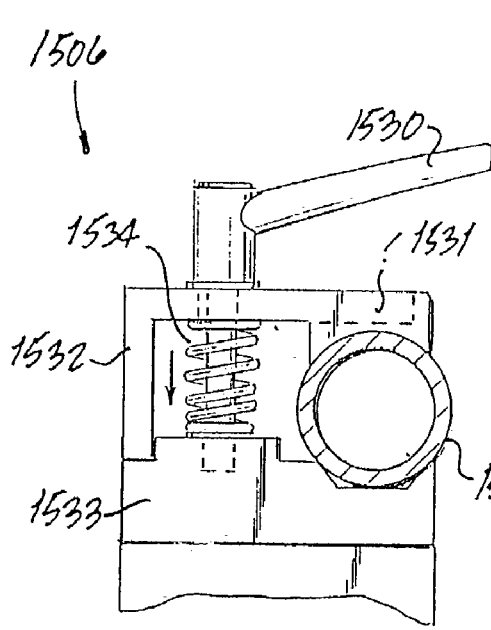
FIG. 62 is an end view of wheel subassembly attachment mechanism in engaged position.
Figure 63:
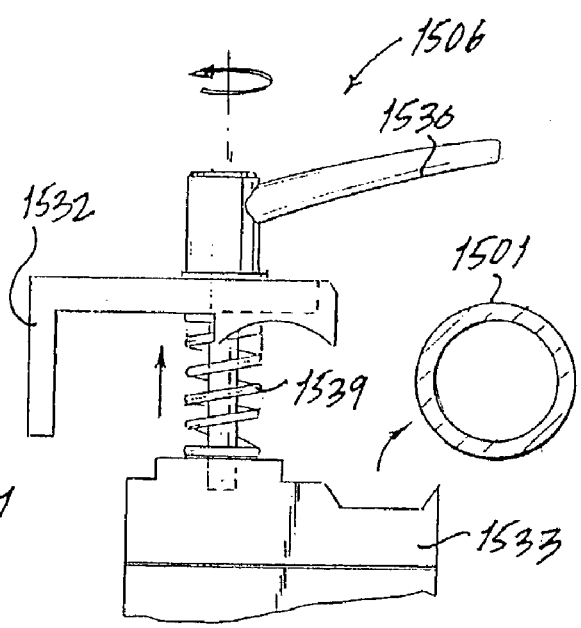
FIG. 63 is an end view of wheel subassembly attachment mechanism in disengaged position.

FIGS. 62 and 63 show end views of the quick disconnect/connect mechanisms 1506 (in viewing direction "62—62" in FIG. 58) with horizontal support member 1501 shown optional as tubular in cross section. Top clamping member 1532 has slot 1531 which permits it to slide from the locking position shown in FIG. 62 to the unlocked position of FIG. 63 thereby releasing side horizontal support member 1501 from the wheel 32 subassembly which continues below lower clamp jaw 1533.

In FIG. 62, spring 1534 is compressed since the locking shaft concentric with it has been threaded downward by turning handle 1530 in a clockwise direction.

In FIG. 63, handle 1530 has been turned about 180 degrees counter-clockwise thereby permitting spring 1534 to push up on top member 1532 releasing horizontal support member 1501.

Figure 64:
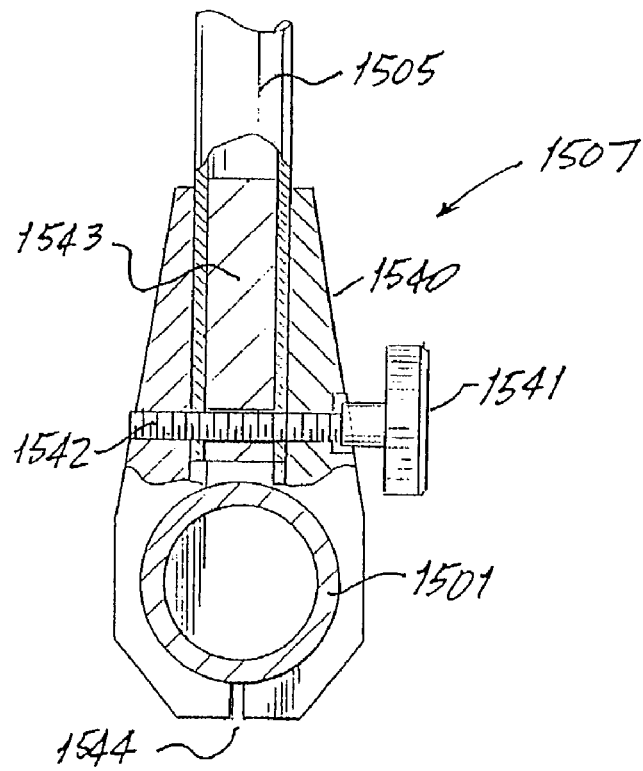
FIG. 64 is an end view of attachment clamp for tubular overhead bar.

FIG. 64 is a partial end cross section (in plane "64—64" of FIG. 58) of clamp 1507. The split 1544 in clamp body 1540 permits selective grasping of horizontal support member 1501 as per the clamping force from screw 1542 as applied through knob 1541. Stainless steel insert 1543 prevents collapse of the end of tube 1505 of the overhead assembly.

Figure 65:
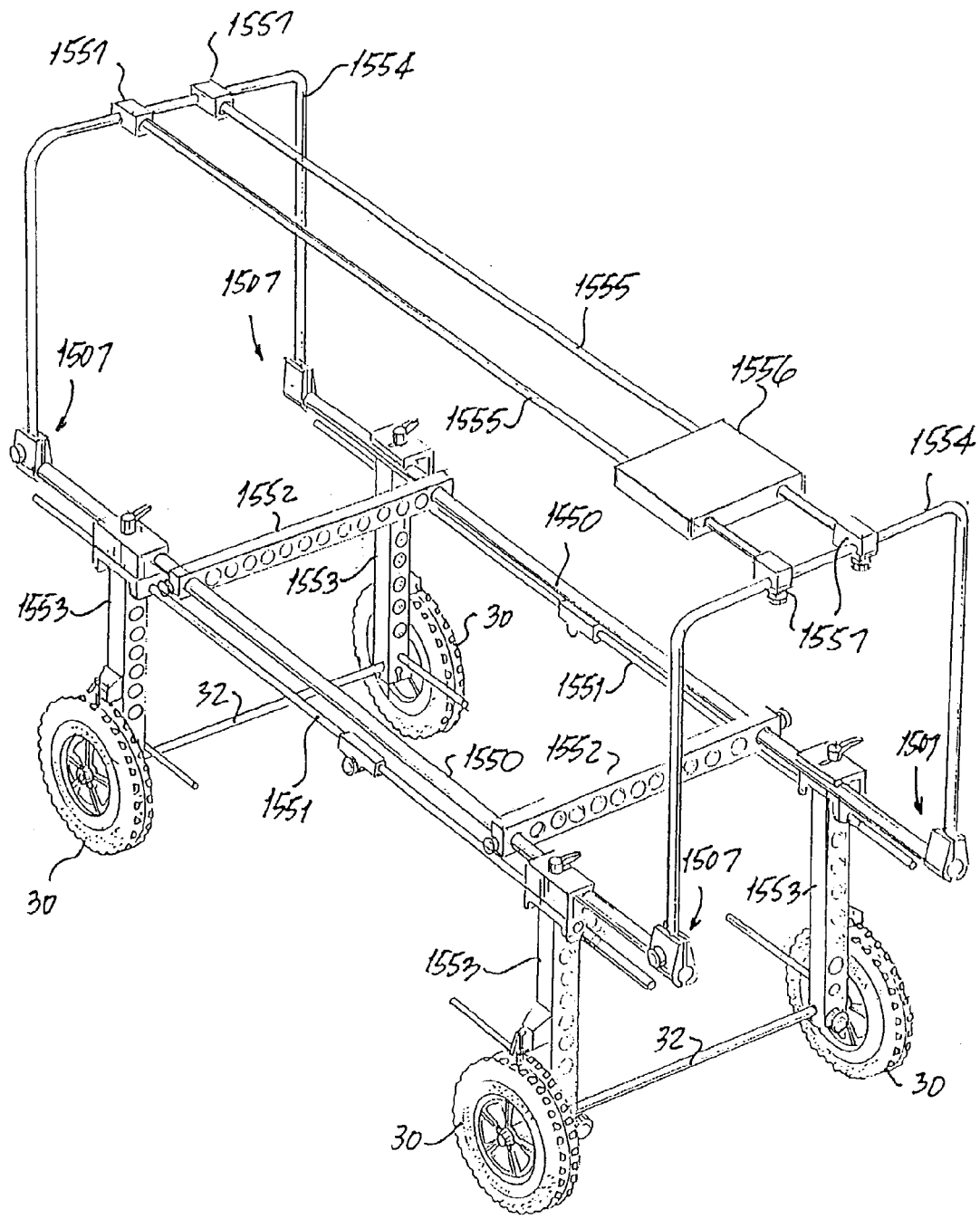
FIG. 65 is a perspective view of portable cart frame configured as an operating room table/gurney.

FIG. 65 shows yet another embodiment of the cart of this invention as a frame for a portable operating room table or a gurney. This portable operating room table/gurney includes side horizontal support members 1550, such as, for example, frame tubes, auxiliary side bars 1551, transverse frame members 1552, vertical struts 1553, overhead support frames 1554, overhead rails 1555, trolley 1556, and attachment clamps 1557. The portable operating room table/gurney rides on four wheels 30 with axles 32.

Figure 66:
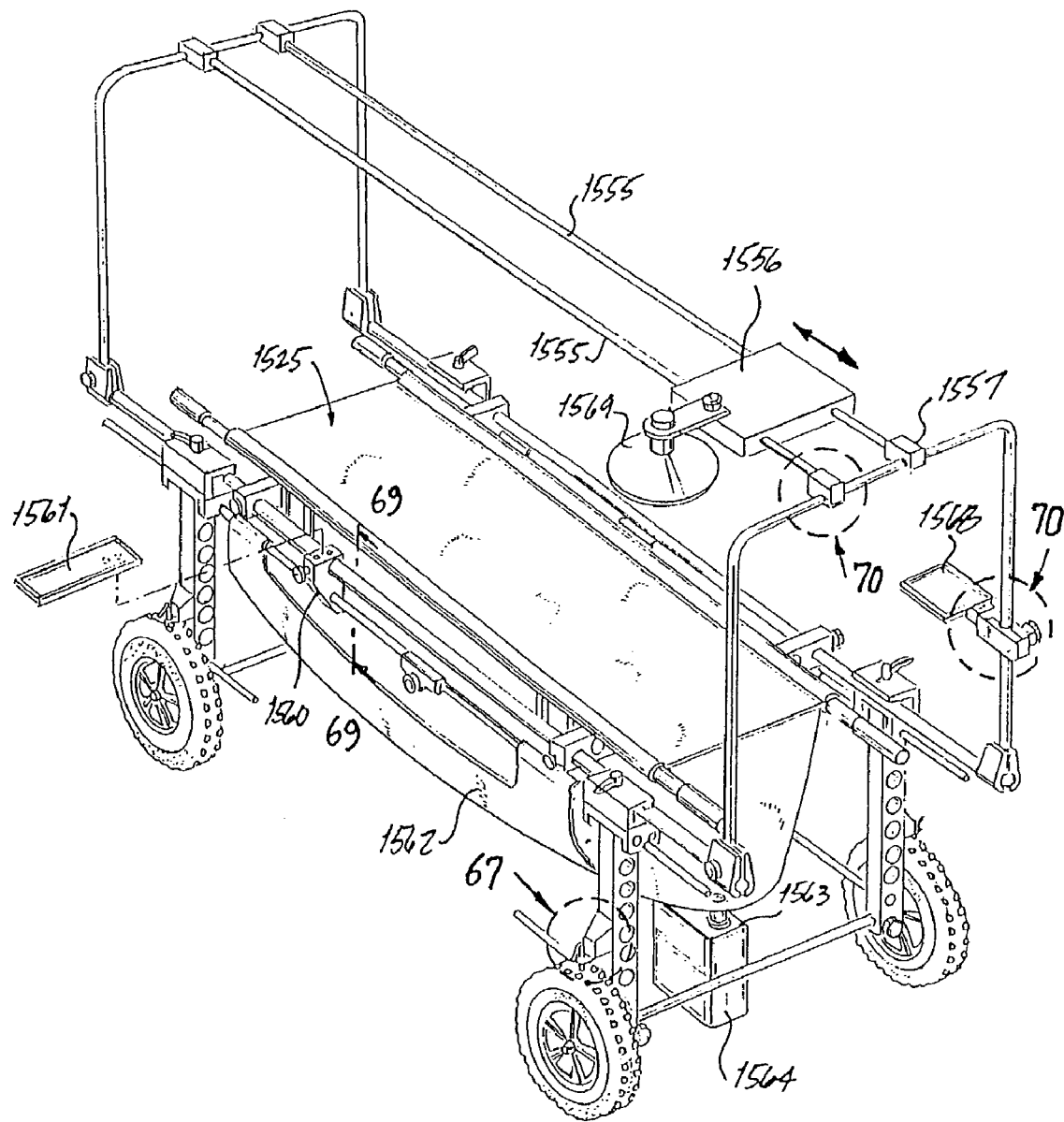
FIG. 66 is a perspective view of operating room table/gurney.

The fully configured gurney is shown in FIG. 66. Additional features shown include flexible fluid capture collection sling 1562, fluid collection tube 1563, fluid collection tank 1564, adjustable side clamp 1560, side rest or surgical instrument table 1561, wheel brakes 1558, and overhead accessory 1569 for attaching lights or other surgical accessories.

Figure 67:
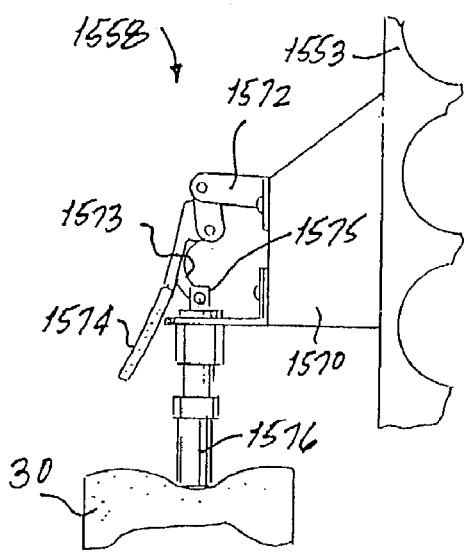
FIG. 67 is an end view of wheel brake mechanism in applied position.
Figure 68:
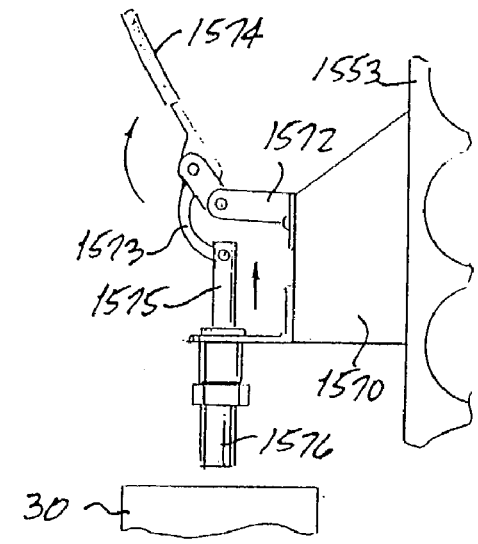
FIG. 68 is an end view of wheel brake in an off position.

FIGS. 67 and 68 show the construction and operation of wheel brake assembly 1558. Brake frame 1570 is rigidly attached to vertical strut 1553. Upper pivot frame 1572 works in conjunction with handle/link 1574, curved spring link 1573, and plunger shaft 1575 to form an "over-center" mechanism with two stable states, clamped or unclamped.

In FIG. 67, handle 1574 is pushed down into a snap-locked position pushing tip 1576 into contact with wheel 32 tire 1571 thereby contacting the top surface and deforming it to prevent wheel 32 from rotating.

FIG. 68 shows the "brake-off" position which is obtained by lifting handle 1574 past the center position thereby lifting tip 1576 out of contact with tire 1571.

Figure 69:
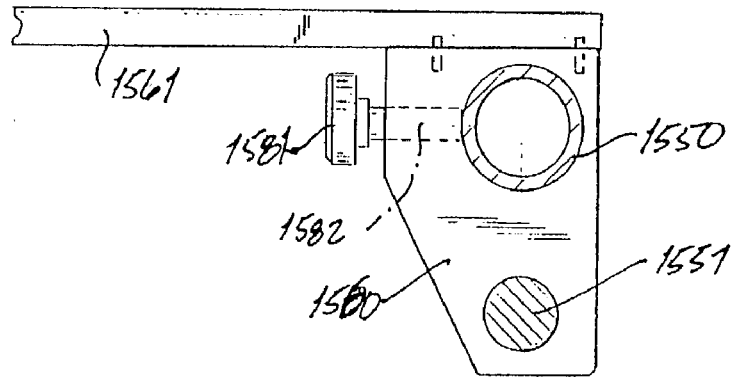
FIG. 69 is an end view of side rail adjustable clamp.

FIG. 69 is an end view of adjustable side clamp 1560 with side tube 1550 and auxiliary rod 1551 in cross section (see plane "69–69" in FIG. 66). Instrument table 1561 attached to clamp body 1580 can be moved longitudinally along tube 1561 and locked in place as desired by turning knob 1581 which impinges the end of screw 1582 against horizontal support member 1550.

FIG. 70 shows an exploded view of attachment clamp 1557 used in a variety of locations on overhead frames 1554. It includes main body 1590 with groove 1591, outer clamp member 1593 with lip 1593 and screw 1596 with knob 1595. In operation, lip 1593 pivots within groove 1591; tube 1554 is grasped by the concave surfaces of body 1590 and outer member 1593 as tightened by screw 1596. A tube end 1594 which can represent a tube 1555 or an accessory 1568 is inserted in the hole in the end of body 1590 and locked.

It is further noted that other modifications may be made to the present invention, without departing from the scope of the invention.

I claim:

1. A modular, user-configurable, re-useable, non-disposable cart that is collapsible for storage and transport and expandable for use in carrying a load, comprising:
    a modular load support frame that can be alternately assembled and dis-assembled, said modular frame being comprised of a pair of spaced and parallel horizontally disposed elongated rigid load support members;
    a vertically extending straight and rigid strut extending down from a midsection of each of said horizontal load support members;
    said load support members each having at least one convenient user-securable clamp on a top surface thereof spanning a substantial portion of the length of each of the horizontal load support members;
    said at least one convenient user-securable clamp being user-positionable and interchangeable with any other said at least one clamp;
    each said vertical strut having a lower end with an axle mounting means at said lower end;
    an axle extending through and joining both said axle mounting means, said axle having at least one vehicle movement actuator of a pair of vehicle movement actuators attached at opposite sides of said cart; said axle in joining and contacting both said movement actuators of said cart; said axle traversing through said respective struts; and
    a load carrier removably attached to said clamps.

2. The cart as in claim 1, wherein each said rigid horizontal support member comprises a horizontally extending rail extrusion having a longitudinally extending channel along said top surface, each said extrusion further having a pair of spaced apart inwardly and longitudinally extending cantilevered members extending partially over said channel and,
    said clamp holding a gripping assembly within said channel, said gripping assembly having a base, said base having respective horizontal members slidably insertable within said respective longitudinally extending channels.

3. The cart as in claim 1 wherein each clamp supports a rail of said load carrier.

4. The cart as in claim 3 wherein each said carrier rail is part of a rescue stretcher, said rescue stretcher having a stretcher fabric sheet extending between the carrier rails.

5. The cart as in claim 3 wherein each said carrier rail is a rail of a Stokes rescue carrier.

6. The cart as in claim 3 wherein said carrier rails support a hollow cargo bin thereon.

7. The cart as in claim 3 further comprising:
    at least one transverse frame member connecting said load support members.

8. The cart as in claim 7 wherein said load carrier is further supported by a center frame member extending between a pair of said at least one transverse frame members.

9. The cart as in claim 8 wherein said cart is re-adjustable to foreshorten the distance between said transverse frame members by said center frame member being slidable along said load support members, said transverse frame members being secured by fasteners attachable to said load support members.

10. The cart as in claim 3 wherein said load carrier is a medical victim carrying stretcher.

11. The cart as in claim 1 wherein said vehicle movement actuators are wheels.

12. The cart as in claim 1 wherein said vehicle movement actuators are a pair of wheels, and wherein both said wheels are held by said axle.

13. The cart as in claim 12 wherein said wheels are supported at opposite ends of said axle.

14. The cart as in claim 1 having a second axle supporting a pair of wheels.

15. The cart as in claim 14 where said wheels are staggered.

16. The cart as in claim 14 wherein one of said axles is a forward axle and the other axle is a rearward axle; said axles having respective ends for receiving alternately attachable and detachable wheels; said axles being attachable and alternately detachable to said axle mounting means at said lower end of said at least one vertical strut; and wherein
    said forward axle and said rearward axle are spaced apart by a distance smaller than the diameter of the smallest wheel attached to either said forward axle or said rearward axle; and wherein
    one of said axles comprises a length greater than the length of another of said axles, wherein the forward axle is longer than the rearward axle by a distance of at least twice the thickness of the thickest wheel attached to either said forward axle or said rearward axle.

17. The cart as in claim 1 wherein said clamp comprises a lower jaw cooperating with an upper jaw.

18. The cart as in claim 17 wherein said lower jaw of said clamp includes an engaging surface having threaded studs which are inserted into at least one through-hole of each said horizontal support member, each said stud being locked with a respective locking nut.

19. The cart as in claim 17 wherein said upper jaw is provided with a pair of oblong through-slots, wherein upon loosening of each said respective locking nut from each said threaded stud, said upper jaw slides on an upper surface of said lower jaw, permitting quick removal of a rail secured between said upper jaw and said lower jaw.

20. The cart as in claim 1 wherein said clamp includes a longitudinally extending recess gripping each said rail of said carrier.

21. The cart of claim 1, further comprising at least one user-deployable kick stand for stabilizing said cart in a fixed position.

22. The cart of claim 1 wherein each said movement actuator is a removable snow ski.

23. The cart as in claim 1 further comprising a removable platform attached to each said clamp, said platform supporting an object thereon.

24. The cart as in claim 23 wherein said platform has a pair of attachment members slidable within each of said clamps.

25. The cart of claim 1 wherein said cart is collapsible within a carry case without physical detachment of any components; and said cart having hinge means and spring means to assemble said cart for use upon opening said carry case;
    said cart folding down to a disassembled storage position and said cart unfolding to an assembled position of use.

26. The cart as in claim 25 wherein a pair of resilient rails engage said load support members such that when in a position of storage said resilient rails are biased to return to their normal position of use, when released from the storage position, thus causing each said vertical strut attached to said load support members to pivot upward.

27. The cart as in claim 1 wherein said axle is adjustable to increase its width.

28. The cart as in claim 1 wherein said load carrier is a single fabric sheet member.

29. The cart as in claim 28 wherein said load single fabric sheet member includes sewn longitudinal pockets at respective outer edges accepting said horizontal parallel rigid load support members therein.

30. The cart as in claim 1 further comprising a quick release clamp including a top clamping member having at least one slot permitting said clamp to slide from a locking position to an unlocked position, said quick release clamp having a compressible spring surrounding a locking shaft, said locking shaft being threaded downward by turning of a locking handle,
    wherein when said locking handle has been turned, said spring pushes up on said top clamping member, releasing one of said load support members from said quick release clamp.

31. The cart as in claim 1 further comprising a handle.

32. A cart collapsible for storage and transport and expandable for use in carrying a load, comprising:
    a modular load support frame that can be alternately assembled and dis-assembled, said modular frame being comprised of a pair of oppositely disposed rigid horizontal load support members, wherein each said rigid horizontal support member has extending downwardly therefrom a respective vertical strut;
    said horizontal load support members each having a removable clamp;
    each said vertical strut having a lower end with an axle mounting means at said lower end;
    a pair of axles extending through each said vertical strut, each said axle having at least one vehicle movement actuator of a pair of vehicle movement actuators attached at opposite sides of said cart;
    a carrier, said carrier attachable to said clamp, wherein said carrier supports a load thereupon; wherein
    one of said pair of axles is a forward axle and the other axle is a rearward axle; said axles having respective ends for receiving alternately attachable and detachable wheels; said axles being attachable and alternately detachable to said axle mounting means at said lower end of said at least one vertical strut; and wherein
    said forward axle and said rearward axle are spaced apart by a distance smaller than the diameter of the smallest wheel attached to either said forward axle or said rearward axle; and wherein
    one of said axles comprises a length greater than the length of another of said axles, wherein the forward axle is longer than the rearward axle by a distance of at least twice the thickness of the thickest wheel attached to either said forward axle or said rearward axle.

33. A cart collapsible for storage and transport and expandable for use in carrying a load, comprising:
    a modular load support frame that can be alternately assembled and dis-assembled, said modular frame being comprised of a pair of oppositely disposed rigid horizontal load support members, wherein each said rigid horizontal support member has extending downwardly therefrom a respective vertical strut;
    said horizontal load support members each having a removable clamp;
    each said vertical strut having a lower end with an axle mounting means at said lower end;
    at least one axle extending through each said vertical strut, each said axle having at least one vehicle movement actuator of a pair of vehicle movement actuators attached at opposite sides of said cart;
    a carrier, said carrier attachable to said clamp, wherein said carrier supports a load thereupon;
    an removable platform attached to each clamp, said removable platform supporting an object thereon; and
    said platform having a pair of attachment members slidable within said clamps attachable to said support members.

34. A cart collapsible for storage and transport and expandable for use in carrying a load, comprising:
    a modular load support frame that can be alternately assembled and dis-assembled, said modular frame being comprised of a pair of oppositely disposed rigid horizontal load support members, wherein each said rigid horizontal support member has extending downwardly therefrom a respective vertical strut;
    said horizontal load support members each having a removable clamp;
    each said vertical strut having a lower end with an axle mounting means at said lower end;
    at least one axle extending through each said vertical strut, each said axle having at least one vehicle movement actuator of a pair of vehicle movement actuators attached at opposite sides of said cart; and,
    a carrier, said carrier attachable to said clamp, wherein said carrier supports a load thereupon;
    said cart being collapsible within a carry case without physical detachment of any components; and said cart having hinge means and spring means to assemble said cart for use upon opening said carry case;
    said cart folding down to a disassembled storage position and said cart unfolding to an assembled position of use; and
    a pair of resilient rails engaging said load support members such that when in a position of storage said resilient rails are biased to return to their normal position of use, when released from the storage position, thus causing each said vertical strut attached to said load support members to pivot upward.

35. A cart collapsible for storage and transport and expandable for use in carrying a load, comprising:
    a modular load support frame that can be alternately assembled and dis-assembled, said modular frame being comprised of a pair of oppositely disposed rigid horizontal load support members, wherein each said rigid horizontal support member has extending downwardly therefrom a respective vertical strut;
    said horizontal load support members each having a removable clamp;

each said vertical strut having a lower end with an axle mounting means at said lower end;
at least one axle extending through each said vertical strut, each said axle having at least one vehicle movement actuator of a pair of vehicle movement actuators attached at opposite sides of said cart; and,
a carrier, said carrier attachable to said clamp, wherein said carrier supports a load thereupon;
a quick release clamp including a top clamping member having at least one slot permitting said clamp to slide from a locking position to an unlocked position, said quick release clamp having a compressible spring surrounding a locking shaft, said locking shaft being threaded downward by turning of a locking handle; and
wherein when said locking handle has been turned, said spring pushes up on said top clamping member, releasing a load support member from said quick release clamp.

* * * * *